United States Patent
Bull et al.

(10) Patent No.: US 12,179,397 B2
(45) Date of Patent: Dec. 31, 2024

(54) VALVE

(71) Applicant: Obrist Closures Switzerland GmbH, Reinach (CH)

(72) Inventors: Martin Bull, Norfolk (GB); Peter Pargen, Zell-Barl (DE)

(73) Assignee: Obrist Closures Switzerland GmbH, Reinach (CH)

( * ) Notice: Subject to any disclaimer, the term of this patent is extended or adjusted under 35 U.S.C. 154(b) by 435 days.

(21) Appl. No.: 17/600,784

(22) PCT Filed: Apr. 13, 2020

(86) PCT No.: PCT/EP2020/060364
§ 371 (c)(1),
(2) Date: Oct. 1, 2021

(87) PCT Pub. No.: WO2020/208252
PCT Pub. Date: Oct. 15, 2020

(65) Prior Publication Data
US 2022/0176600 A1   Jun. 9, 2022

(30) Foreign Application Priority Data

Apr. 11, 2019   (GB) .................................... 1905182

(51) Int. Cl.
| B29C 45/00 | (2006.01) |
| B29C 45/16 | (2006.01) |
| B65D 47/20 | (2006.01) |
| B29L 31/56 | (2006.01) |

(52) U.S. Cl.
CPC ...... B29C 45/0046 (2013.01); B29C 45/1676 (2013.01); B65D 47/2031 (2013.01); *B29C 2045/0027* (2013.01); *B29L 2031/56* (2013.01)

(58) Field of Classification Search
CPC .............. B29C 45/046; B29C 45/1676; B65D 47/2031
See application file for complete search history.

(56) References Cited

U.S. PATENT DOCUMENTS

| 4,754,892 | A | 7/1988 | Retief |
| 6,056,536 | A * | 5/2000 | Schad ................. B29C 45/1603 425/562 |
| 6,152,324 | A | 11/2000 | Baudin |
| 2003/0150498 | A1* | 8/2003 | Williams ............ F15B 13/0405 137/625.65 |

(Continued)

FOREIGN PATENT DOCUMENTS

| CN | 105899438 A | 8/2016 |
| JP | H09183445 A | 7/1997 |

(Continued)

OTHER PUBLICATIONS

Aug. 28, 2020—(WO) International Search Report and Written Opinion—Appl. No. PCT/EP2020/060364.

(Continued)

*Primary Examiner* — Kevin R Barss
(74) *Attorney, Agent, or Firm* — Banner & Witcoff, Ltd.

(57) ABSTRACT

A bi-injection moulded self-closing valve assembly is described. The assembly comprises a valve overmoulded on an insert. The overmoulded valve is injected using side gating of the mould.

17 Claims, 111 Drawing Sheets

Injection/Overmolding of a valve in TPE

(56) References Cited

U.S. PATENT DOCUMENTS

Figure 1:
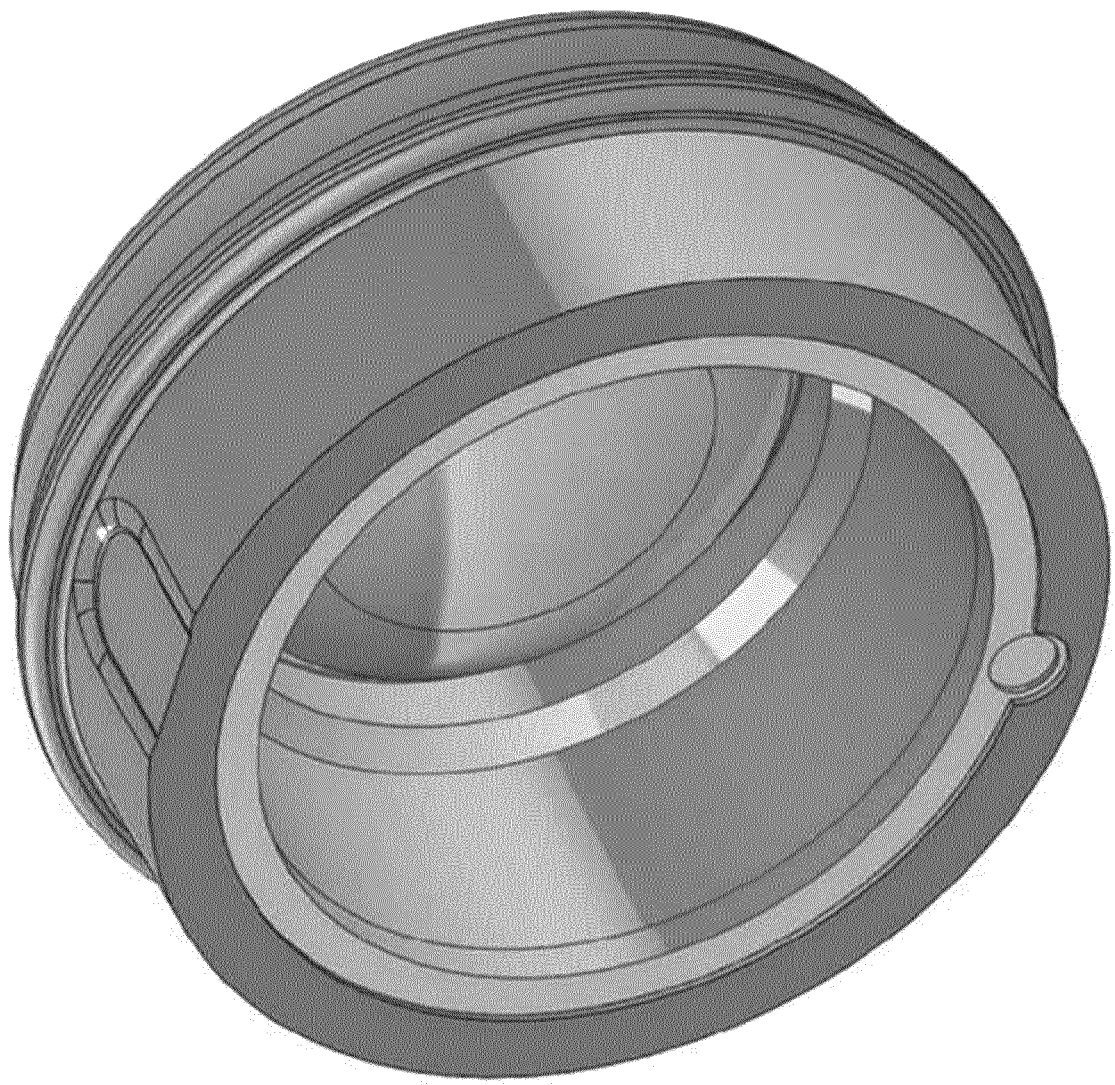

| | | | |
|---|---|---|---|
| 2004/0020533 A1* | 2/2004 | Engle | F16L 33/30 |
| | | | 137/202 |
| 2006/0081288 A1* | 4/2006 | Jacobsen | F16K 31/0665 |
| | | | 137/1 |
| 2007/0010791 A1* | 1/2007 | Drechsler | A61F 5/445 |
| | | | 604/327 |
| 2008/0283789 A1* | 11/2008 | Rubio | F16K 31/404 |
| | | | 251/324 |
| 2011/0186573 A1* | 8/2011 | Tardif | B65D 41/02 |
| | | | 220/260 |
| 2013/0200289 A1* | 8/2013 | Hoppe | F01L 1/34 |
| | | | 251/366 |
| 2014/0197583 A1* | 7/2014 | Schubert | C04B 35/634 |
| | | | 264/645 |
| 2014/0209644 A1* | 7/2014 | Socier | B65D 47/2031 |
| | | | 222/494 |
| 2015/0037113 A1* | 2/2015 | Maness | B60P 7/065 |
| | | | 137/232 |
| 2015/0300298 A1* | 10/2015 | Mellere | F02M 26/54 |
| | | | 251/129.11 |
| 2017/0275062 A1* | 9/2017 | Cudworth | F16K 15/144 |

FOREIGN PATENT DOCUMENTS

| | | |
|---|---|---|
| JP | 2004299783 A | 10/2004 |
| JP | 2015051789 A | 3/2015 |
| JP | 2022528918 A | 6/2022 |
| WO | 8606273 A1 | 11/1986 |
| WO | 2015092452 A1 | 6/2015 |

OTHER PUBLICATIONS

Georg Menges, "6 Design of Gates", Oct. 4, 2001, pp. 205-216, XP055722182, Retrieved from the Internet: URL: http://files hanser.de/Files/Article/ARTK_LPR_9783446212565_0001.pdf.

Sep. 15, 2024 (CN) Office Action—App. No. 202080027661.7.

\* cited by examiner

Injection/Overmolding of a valve in TPE

Example Injection conditions
- PP injection :
- TPE injection :
Figure 10

BEST AVAILABLE IMAGE

Flowfront velocity

*Flowfront velocity is regular, without significative variation*

Flow velocity

*Preferential flow in most massive area lead the filling*

Part solidification (1/7)

Part solidification (2/7)

2 : 0,65s after the end of filling

Part solidification beginning

Part solidification (3/7)

Part solidification (4/7)

Part solidification (5/7)

5 : 2s after the end of filling

Most of the part skin is solidificated

Part solidification (6/7)

Part solidification (7/7)

Underpacked or thickest areas

Underpacked areas:
> risks of sink marks/void bubbles (depending of frozen layer stiffness)
> Differentiel shrinkages
> Part warpage ✓ Example Injection conditions

PP injection:

| | | |
|---|---|---|
| Mold surface temperature | 30 | C |
| Melt temperature | 230 | C |

Filling control: Injection time — of 0.5 s [0:]

Velocity/pressure switch-over: By %volume filled — at 99.5 % [0:100]

Pack/holding control: Packing pressure vs time — Edit profile...

Cooling time: Specified — of 5 s [0:]

Packing pressure vs time:

| | Duration s [0:3600] | Packing pressure MPa [0:500] |
|---|---|---|
| 1 | 0.05 | 40 |
| 2 | 10 | 40 |

TPE injection:

| | | |
|---|---|---|
| Mold surface temperature | 30 | C |
| Melt temperature | 200 | C |

Filling control: Injection time — of 0.5 s [0:]

Velocity/pressure switch-over: By %volume filled — at 99.5 % [0:100]

Pack/holding control: Packing pressure vs time — Edit profile...

Cooling time: Specified — of 5 s [0:]

Packing pressure vs time:

| | Duration s [0:3600] | Packing pressure MPa [0:500] |
|---|---|---|
| 1 | 0.05 | 40 |
| 2 | 10 | 40 |

Figure 61

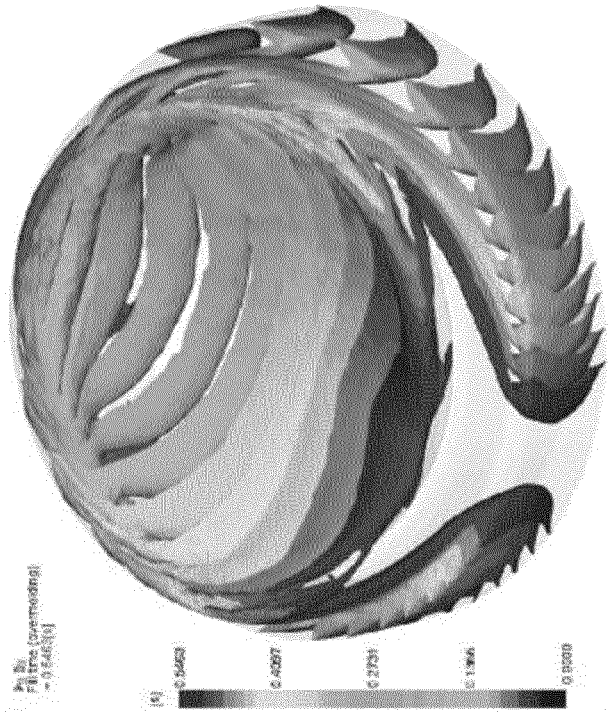
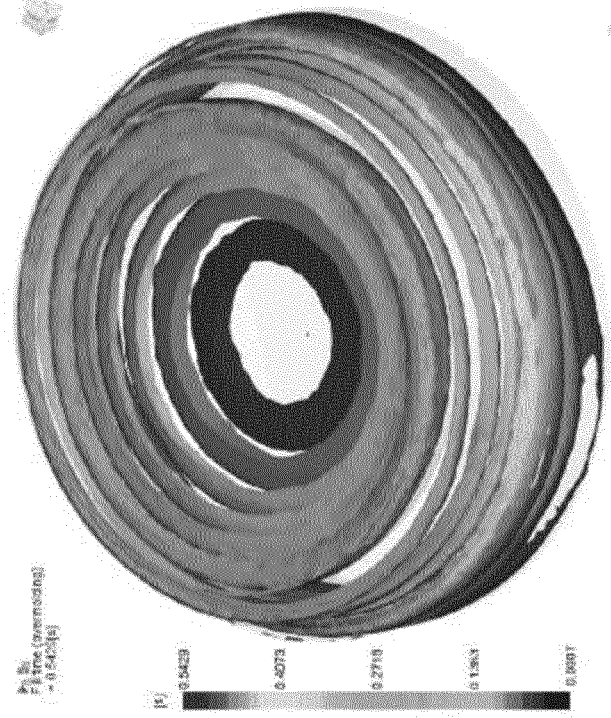
Figure 83

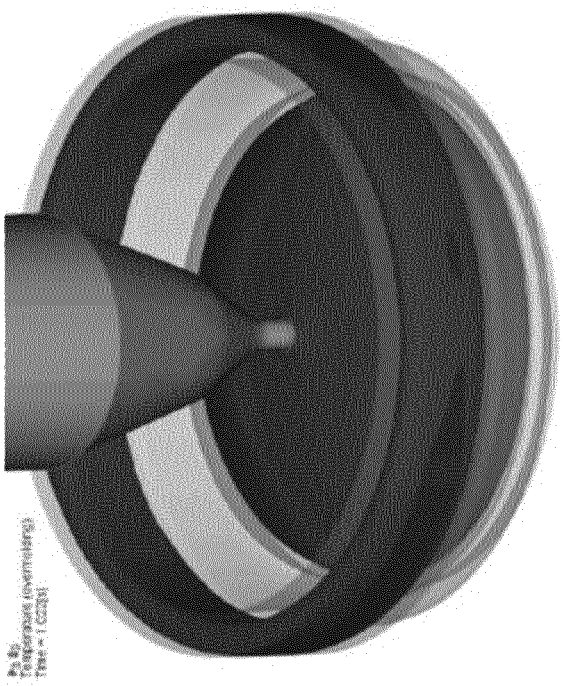
Figure 92

VALVE

CROSS-REFERENCE TO RELATED APPLICATIONS

This application is a U.S. National Stage application under 35 U.S.C. § 371 of International Application PCT/EP2020/060364 (published as WO 2020/208252 A1), filed Apr. 13, 2020, which claims the benefit of priority to U.K. Application No. 1905182.0, filed Apr. 11, 2019. Each of these prior applications is hereby incorporated by reference in its entirety.

The present invention relates generally to a valve and particularly, although not exclusively, to a self-closing valve and/or to a device for retaining a flexible valve.

Flexible valves come in many forms. For instance, WO-A-2004/026721 describes laminar-type flexible membrane valves, whereas EP-B-0545678 and EP-B-1005430 both describe silicon-based flexible valves which are non-laminar in shape.

The construction of non-laminar self-closing flexible valves may be generalised as comprising a concave or convex shaped head portion, with at least one slit, a side wall portion, and a flange. In this application the term "laminar" relates to forms which have a substantially uniform thickness with major surfaces being parallel to one-another. The term "non-laminar" relates to forms which have a thickness which varies and in which the shape does not have major surfaces which are parallel to one-another.

Non-laminar valves are often used in association with closures which are themselves used in association with containers holding such consumable products as liquid soap, ketchup and cosmetics. They have the quality that when a user applies pressure to the container walls (for example by squeezing) the head portion of the valve responds to this increased pressure within the container by opening outwards in the form of "petals". The fluid contained within the container then passes through the slit of the head portion of the valve. Further, the container walls are typically resilient such that when the user stops squeezing them they move back to their original shape thus increasing the volume within the container and accordingly reducing the pressure within the container. This reduced pressure sucks the open "petals" of the valve back to their original closed position. This self-closing property is aided by the concave shape of the valve head.

One problem with flexible valves is that because they are so supple they are accordingly quite difficult to handle and position within a closure during assembly. This slows down the assembly of the closures.

The present invention seeks to provide improvements in or relating to valves, self-closing valves, valve assemblies, valve sub-assemblies and closures therefore, and methods for forming the aforementioned.

An aspect of the present invention provides a self-closing valve assembly comprising a valve overmoulded on an insert, in which the insert is formed by lateral injection, and in which overmoulded valve is injected by: generally central injection; off-centre injection; or lateral injection.

An aspect provides a bi-injection moulded self-closing valve assembly, the assembly comprises a valve overmoulded on an insert, the overmoulded valve is injected using side gating of a mould.

The insert may include a side wall and the injection point is located on one end of the side wall.

The valve may include a side wall and the injection point is located on one end of the side wall.

The valve may include a valve head and the injection point may be located generally centrally on the head.

The valve may include a valve head (for example a generally circular head) and the injection point may be located in an off-centre position on the head.

The valve may include a valve head in which one or more slit lines are to be formed, and in which the valve injection point is located away from the slitting line/s.

The insert may be a retaining ring. The ring may be adapted, for example, to be fitted into a dispensing closure. It may have a snap bead or the like for engaging on a closure.

The valve may be formed from a thermoplastic elastomer (TPE) material. Thermoplastic elastomers (TPE), sometimes referred to as thermoplastic rubbers, are a class of copolymers or a physical mix of polymers (usually a plastic and a rubber) that consist of materials with both thermoplastic and elastomeric properties.

The insert may, for example, be formed from polypropylene.

The present invention also provides a bi-injected valve sub-assembly comprising a side gated polypropylene ring and a side gated TPE valve.

The present invention also provides a bi-injected valve sub-assembly comprising a side gated polypropylene ring and a centre gated TPE valve.

The present invention also provides a bi-injected valve sub-assembly comprising a side gated polypropylene ring and an off-centre gated TPE valve.

The present invention also provides a self-closing valve comprising an injection moulded body formed from a TPE material, the body includes a peripheral sidewall and a central valve head, in which the injection gate for the body is formed away from the centre of the valve head.

Due to side gating, for example, the stress levels in the TPE may be reduced and slitting can thereby be improved.

The injection gate may be formed in the peripheral sidewall, for example at a "lower" end.

The present invention also provides a valve sub-assembly, comprising a self-closing valve and an outer retaining ring, the sub-assembly is formed by a bi-injection moulding process, the ring is injected using a side gated injection process and the valve is injected using a side gated injection process.

The present invention also provides a valve or valve sub-assembly as described herein in combination with a dispensing closure.

The present invention also provides a method of forming a valve sub-assembly of the type comprising an insert and a valve, comprising the steps of injection moulding the insert using a lateral gate and overmoulding the valve using a lateral gate.

The present invention also provides a mould for forming a sub-assembly as described herein, for example a side gated mould.

The present invention also provides a method of forming a self-closing valve of the type comprising a central valve head and a peripheral wall, comprising the steps of injection moulding the valve with an off-centre injection gate.

Methods of the present invention may also comprise the step of slitting the valve.

Example Injection Conditions
PP Injection:
Mould temperature approximately 30 degrees C.
Melt temperature approximately 230 degrees C.
Injection time: 0.5 seconds.
Cooling time: 5 seconds.

TPE Injection:
Mould temperature approximately 30 degrees C.
Melt temperature approximately 230 degrees C.
Injection time: 0.5 seconds.
Cooling time: 5 seconds.

Skis may be formed so as not to coincide with the injection gate vestige thereon.

The present invention also provides a mould for forming a valve as described herein, for example a side gated mould.

Some aspects and embodiments relate to both side gated PP ring & side gated TPE (to improve slitting quality), as discussed in more detail below.

Valve assemblies (valve plus ring) may be formed by a multi-material injection moulding process such as multi-component injection moulding process (also referred to a co-injection), multi-shot injection moulding (also referred to as sequential injection moulding), or over-moulding.

There are benefits of using the side (lateral) gate vs central gating, as discussed in more detail below.

Some embodiments relate to a method and device formed by off centre and direct feeding of the TPE valve and to side gating of the PP outer ring.

Off-centre gating, for example side gating, produces less inner stress of the TPE which results in better slitting.

Some aspects and embodiments relate to a process which leads to TPE valves (possibly in combination with an outer ring) which exhibit less inner stress and hence provides a high quality valve (less leakage, more safe, better performance etc.), wherein slitting may also be improved.

Some aspects and embodiments relate to the side gating of the mould.

A centre gate can lead to slitting quality issues as you are slitting through the gate vestige which can vary in size and regularity from cavity to cavity and over time, so side gate has advantages.

The side gate does not generate internal material stresses which would lead to other issues.

The present invention also relates to a TPE valve and an overmoulded outer ring. The outer ring can be used to attached the valve/ring into/onto a closure.

A combination of the TPE valve design and the VSA design, obtained through overmoulding, may be provided.

The ring and/or outer ring may be combined with the top seal area between valve/closure.

Design features may be included to ensure we do not have a weld line on the valve headplate.

Also provided is a closure fitted with a valve and/or valve retaining device as described herein.

Different aspects and embodiments of the invention may be used separately or together.

Further particular and preferred aspects of the present invention are set out in the accompanying independent and dependent claims. Features of the dependent claims may be combined with the features of the independent claims as appropriate, and in combination other than those explicitly set out in the claims.

Non-limiting examples, explanations and supporting date relating to the present invention are shown in the accompanying drawings.

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

Figure 2C:
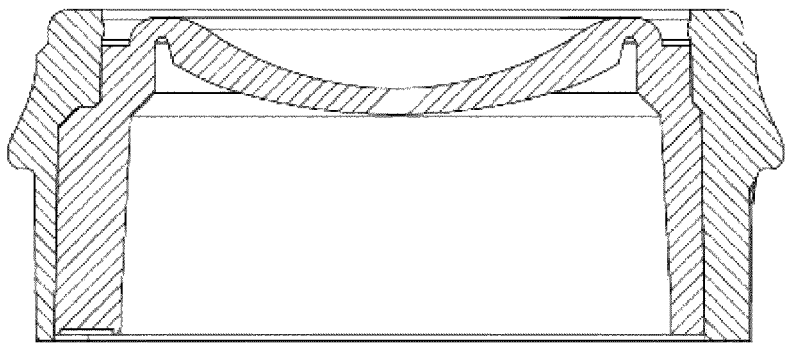
Figure 2B:
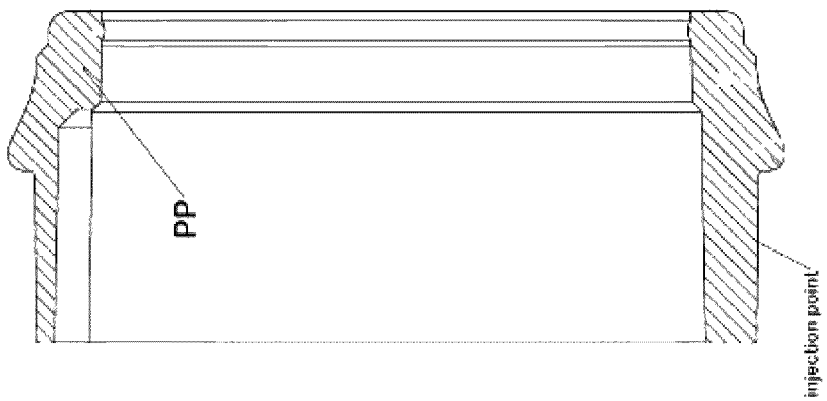
Figure 2A:
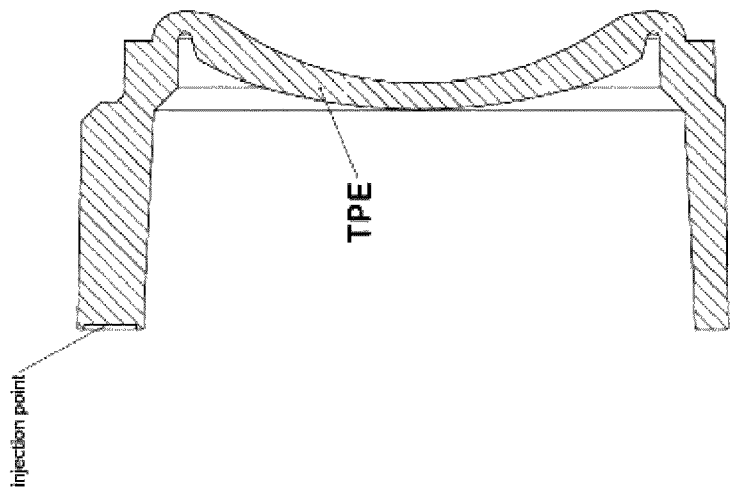
Figure 3:
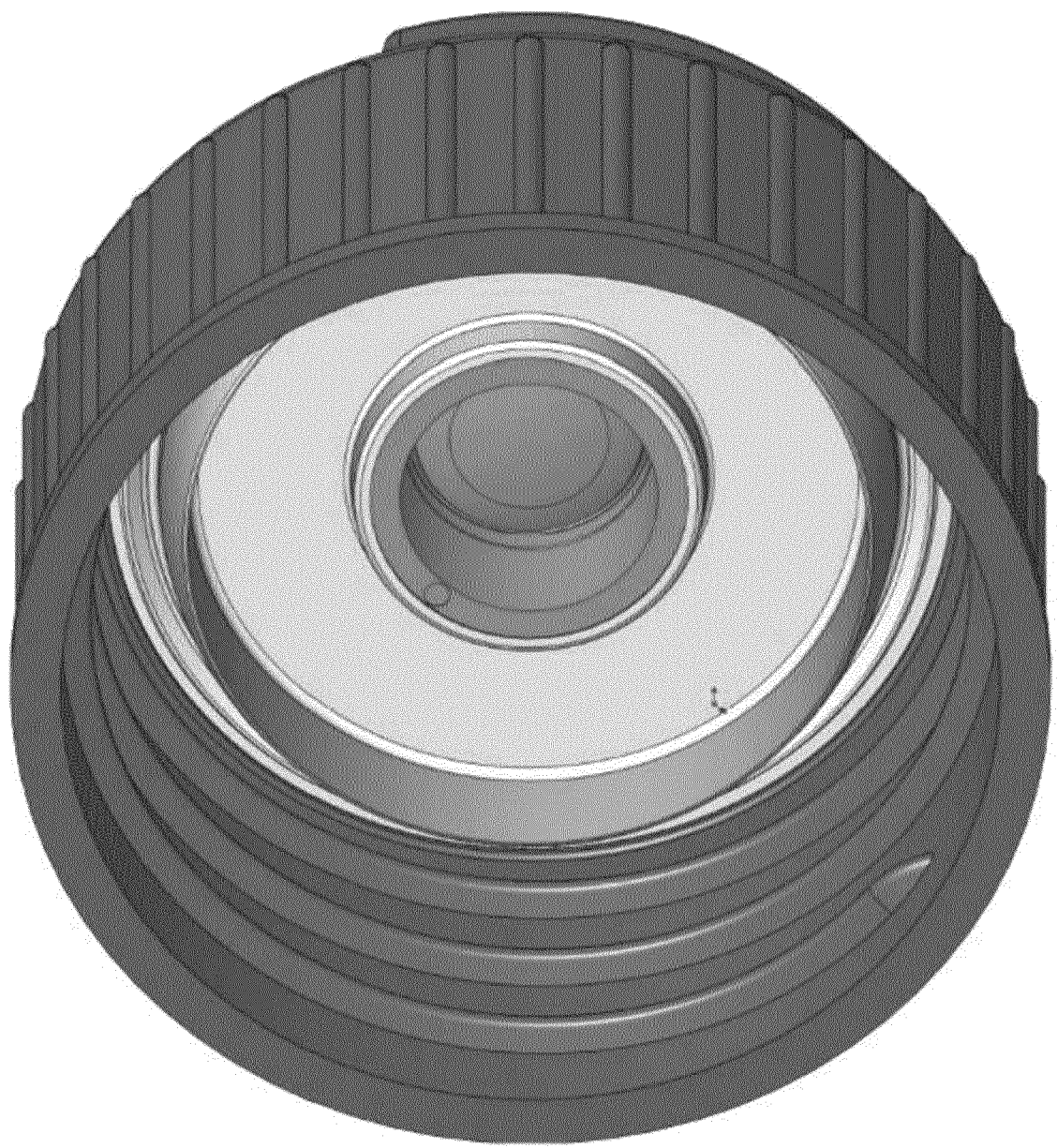
Figure 4:
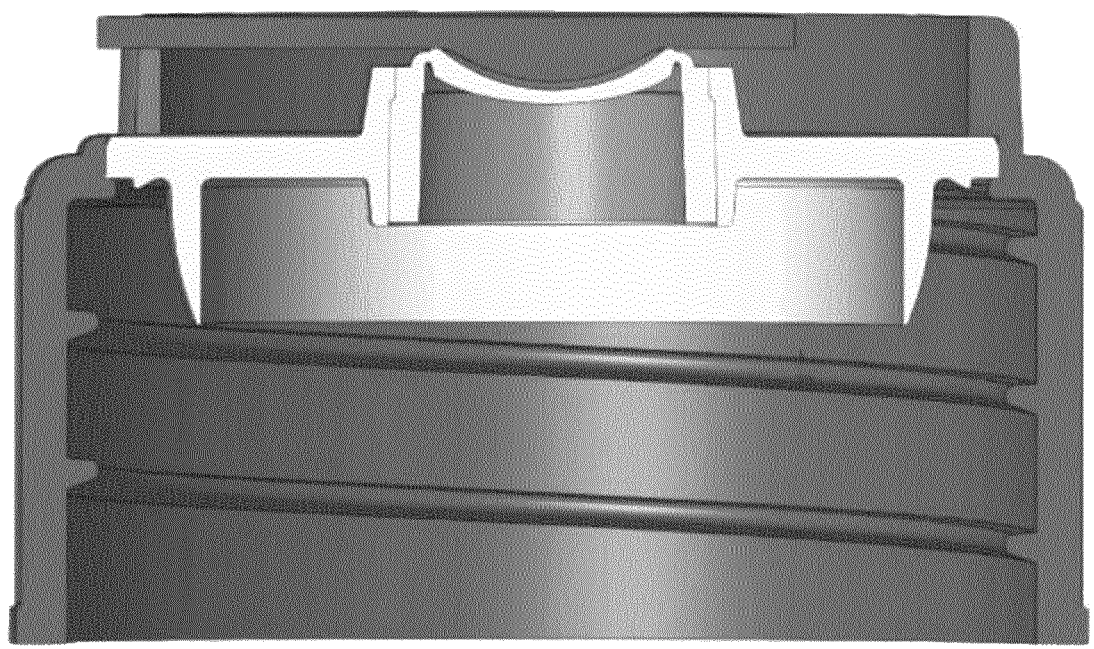
Figure 5:
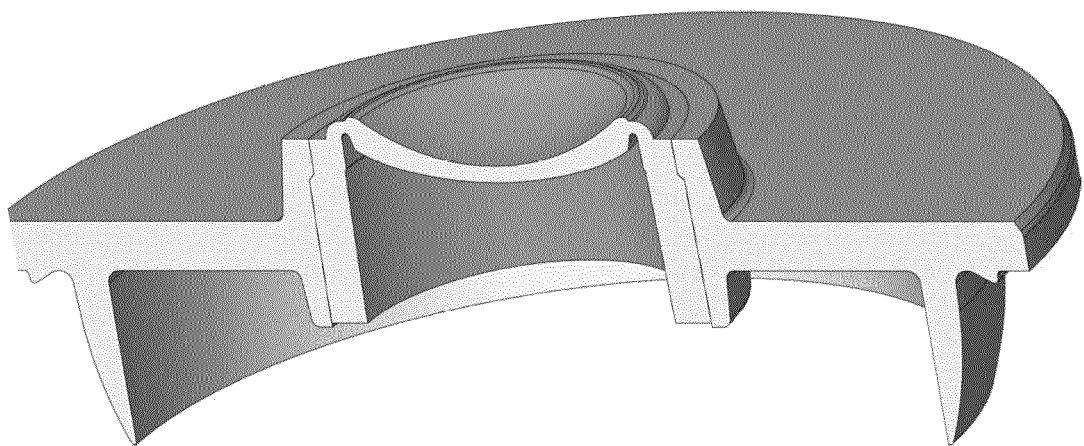
Figure 6:
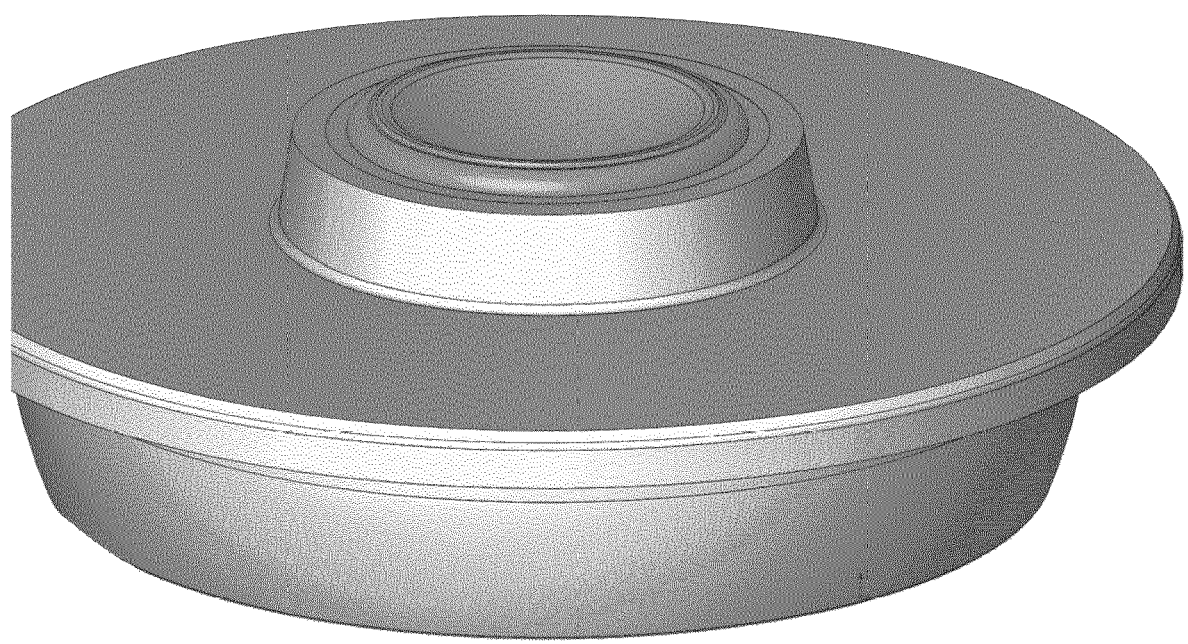
Figure 7:
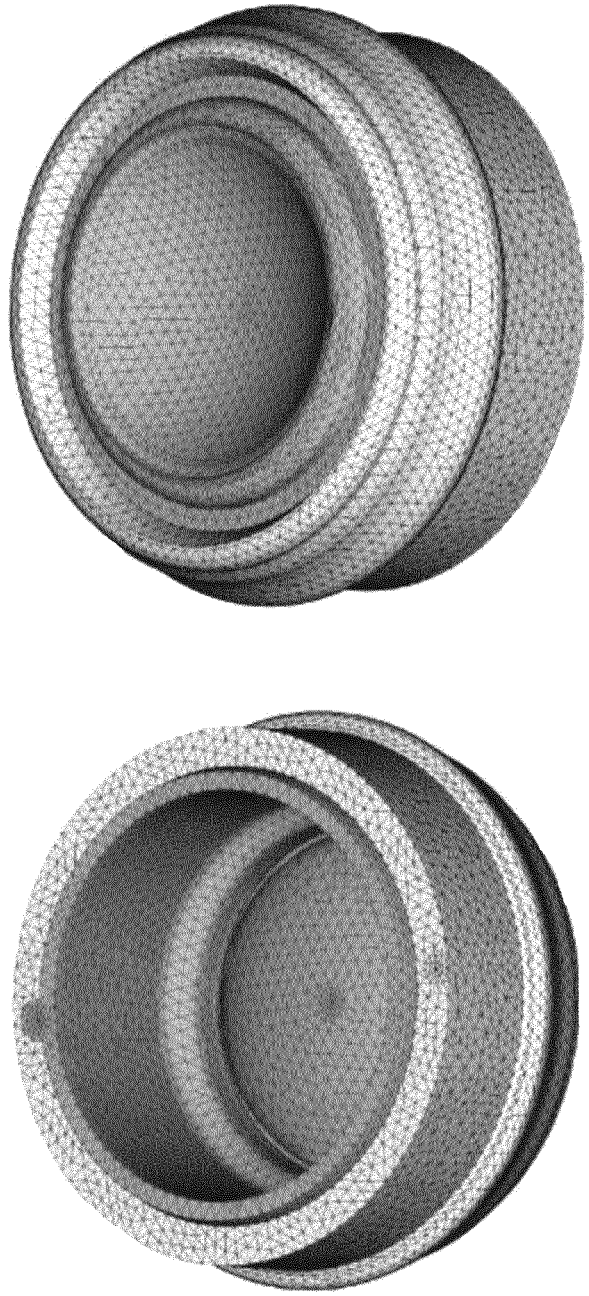
Figure 8:
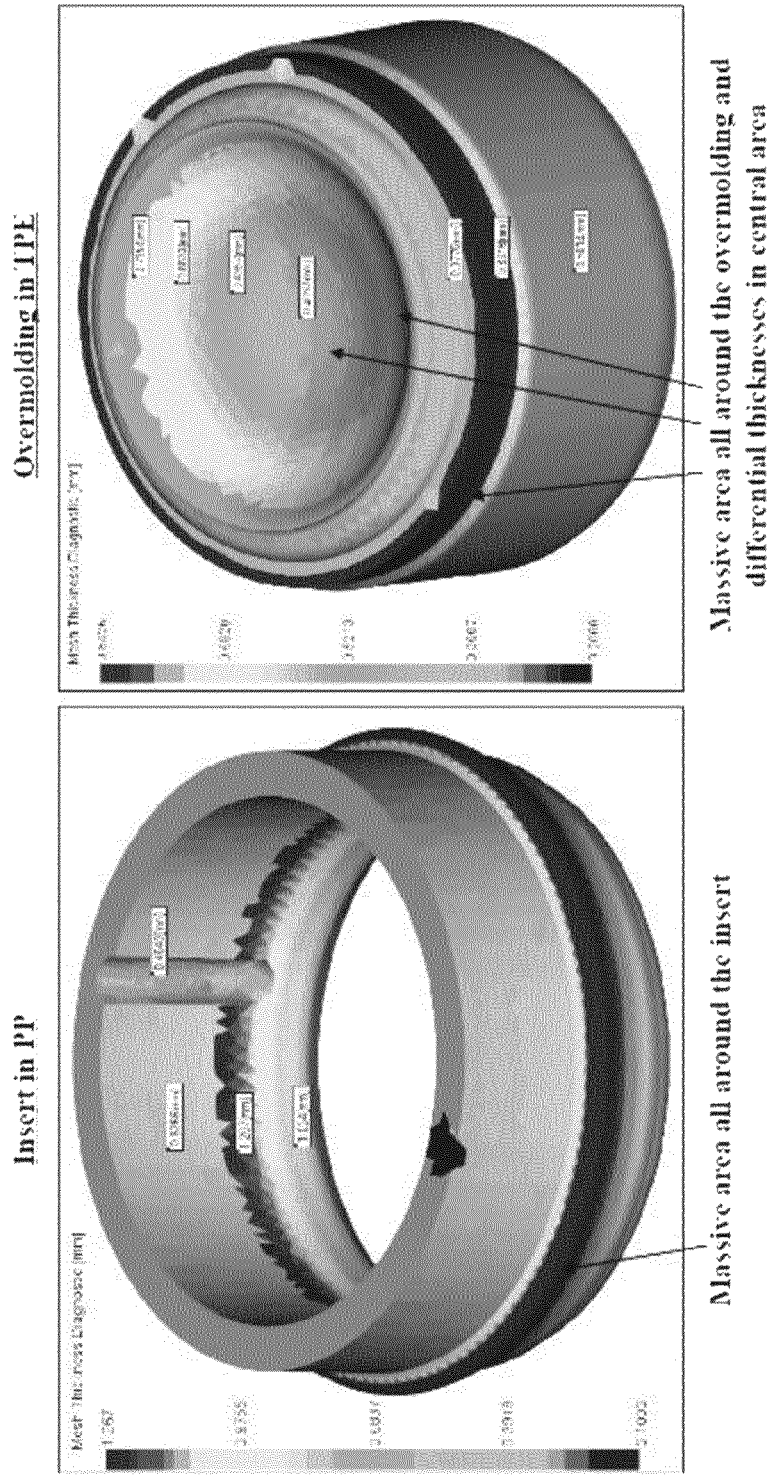
Figure 9:
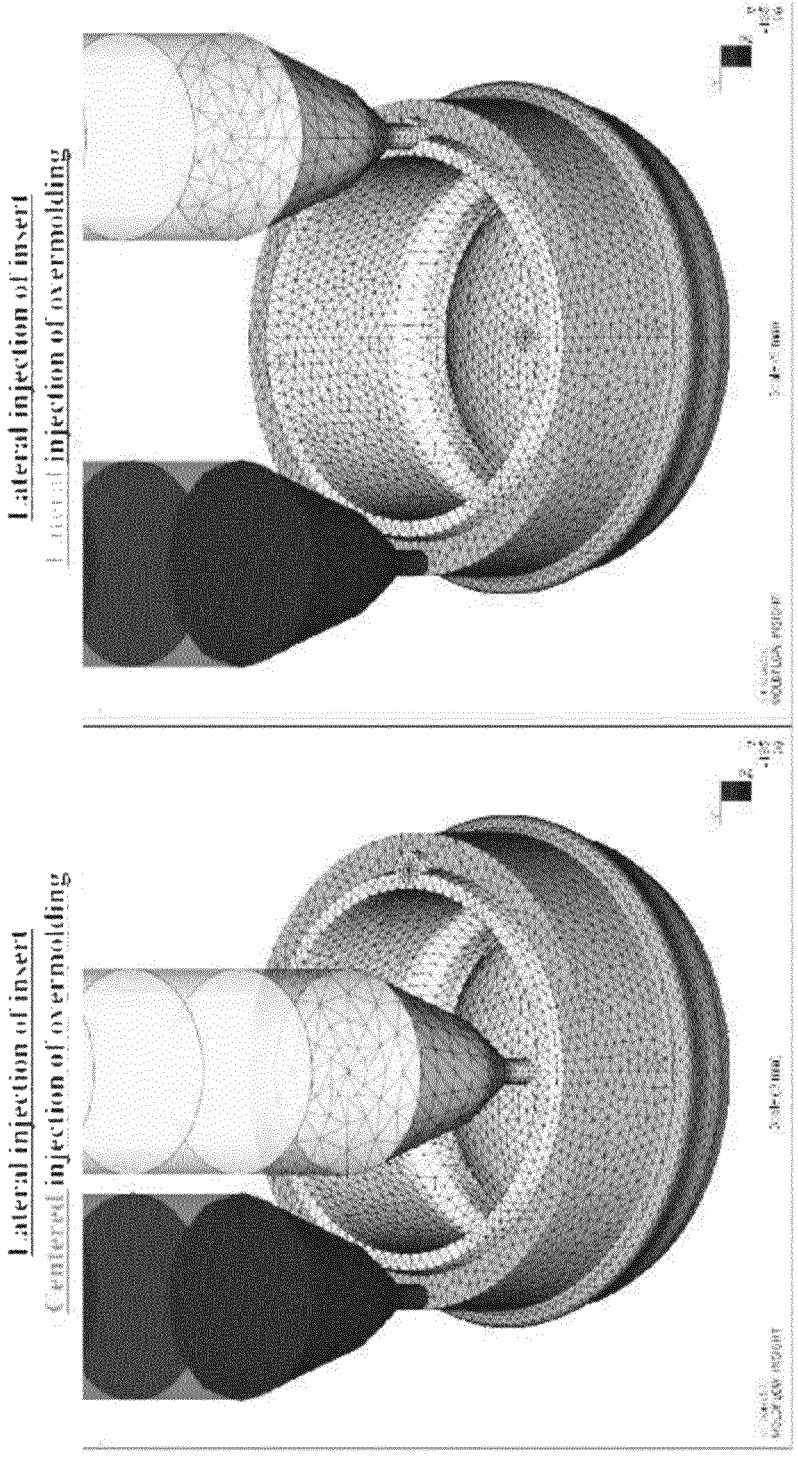
Figure 11:
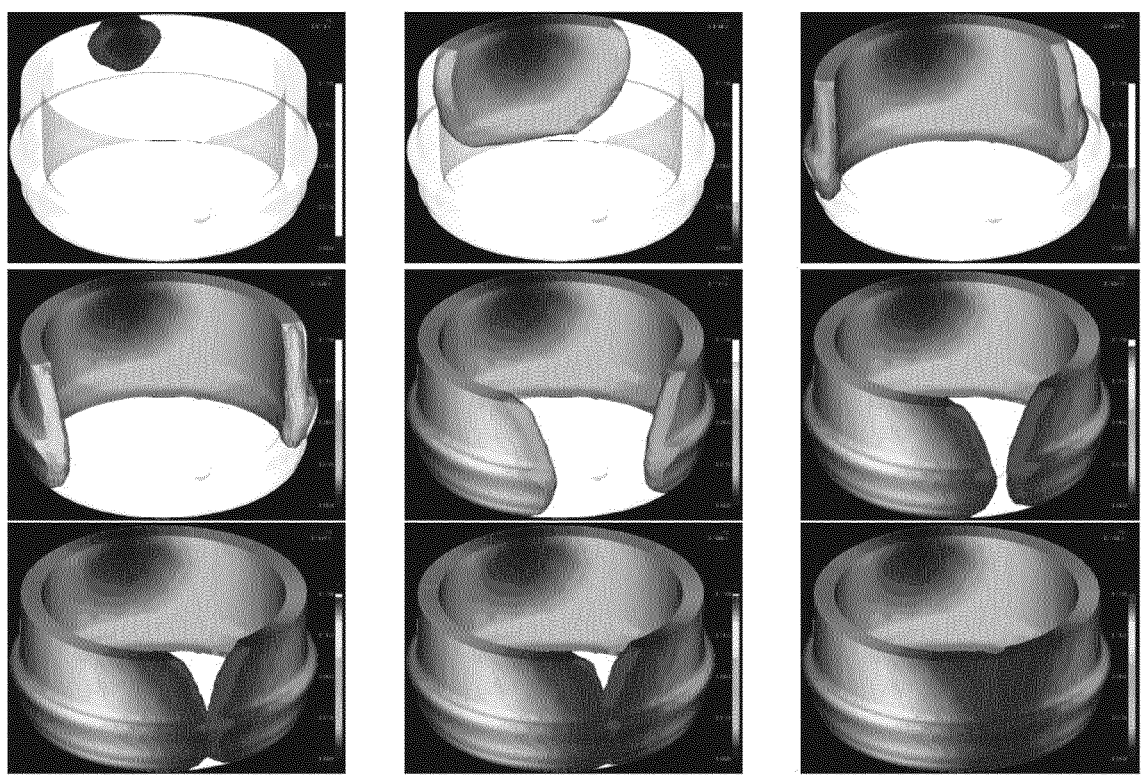
Figure 12:
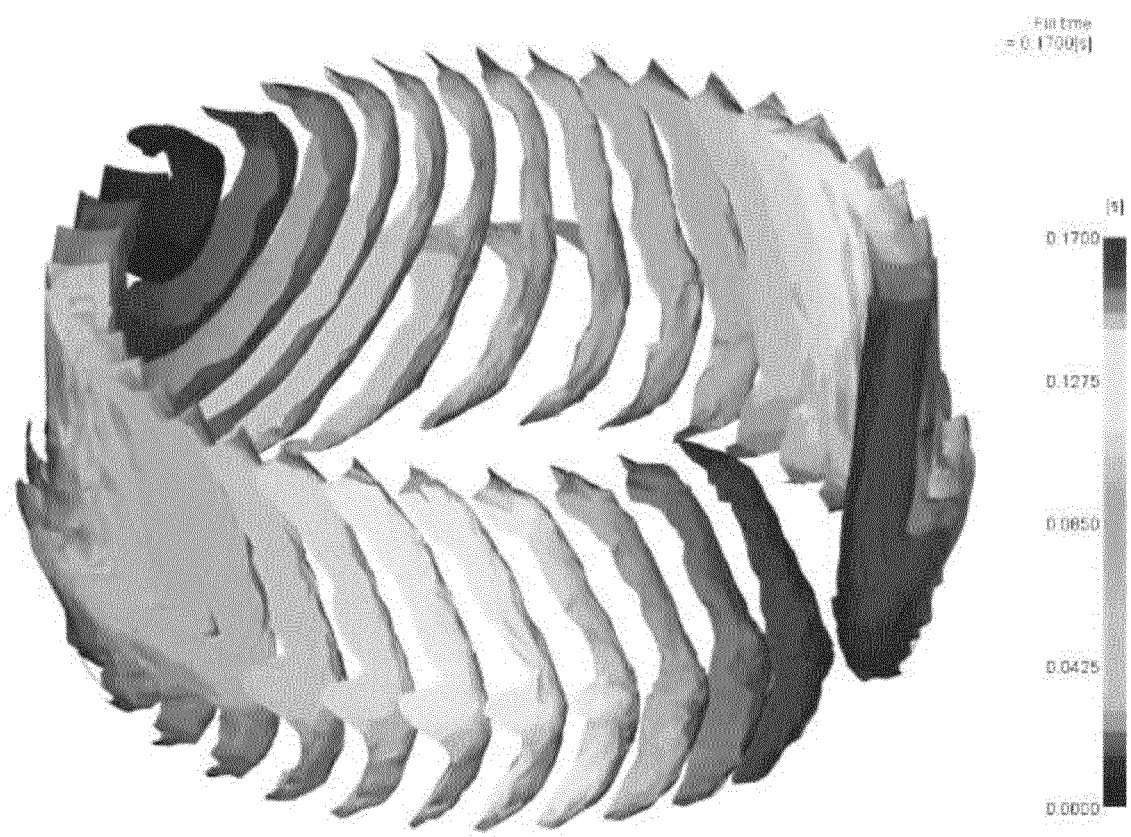
Figure 13:
Figure 14:
Figure 15:
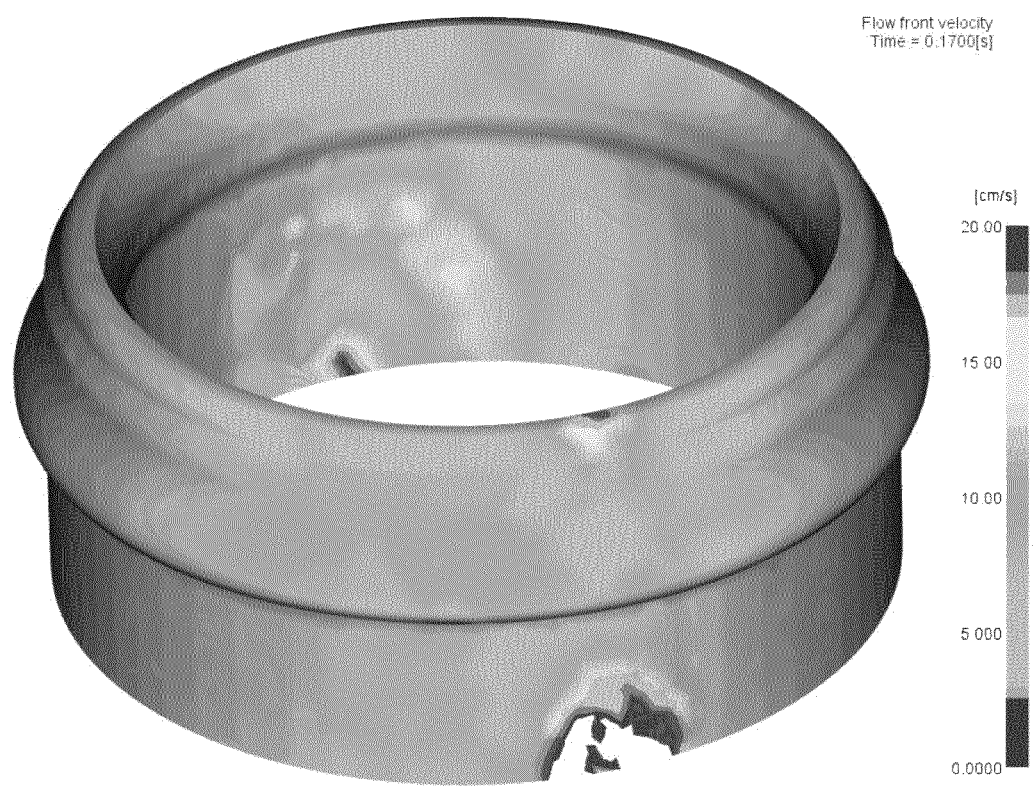
Figure 16:
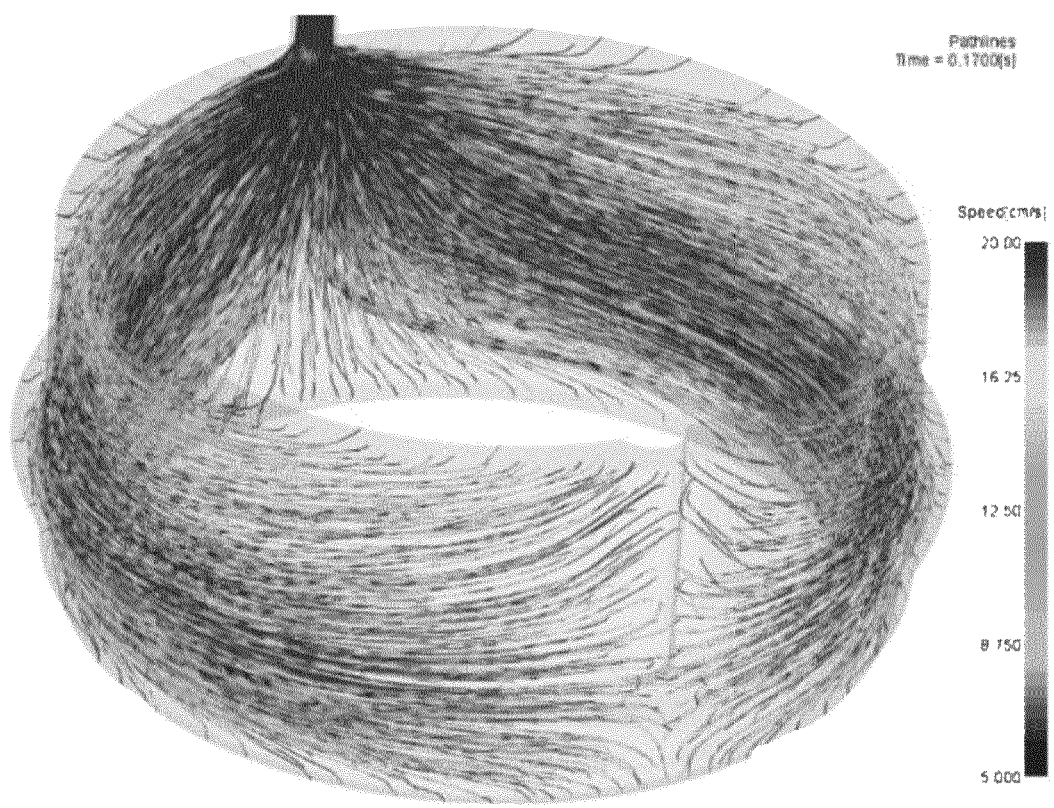
Figure 17:
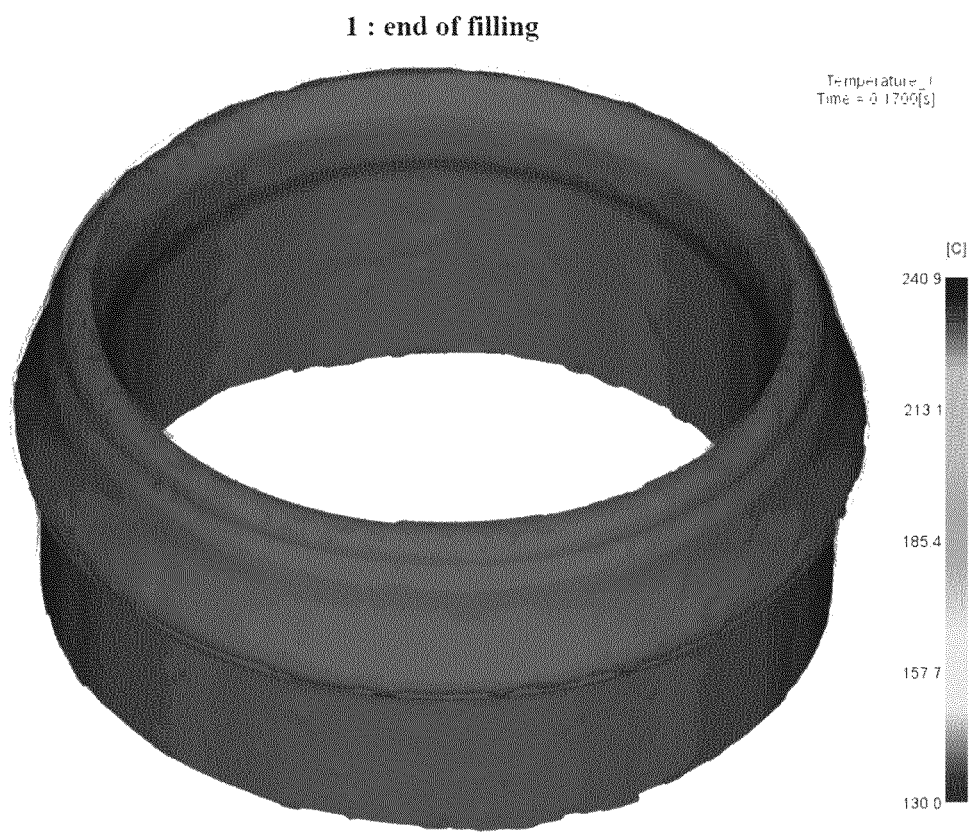
Figure 18:
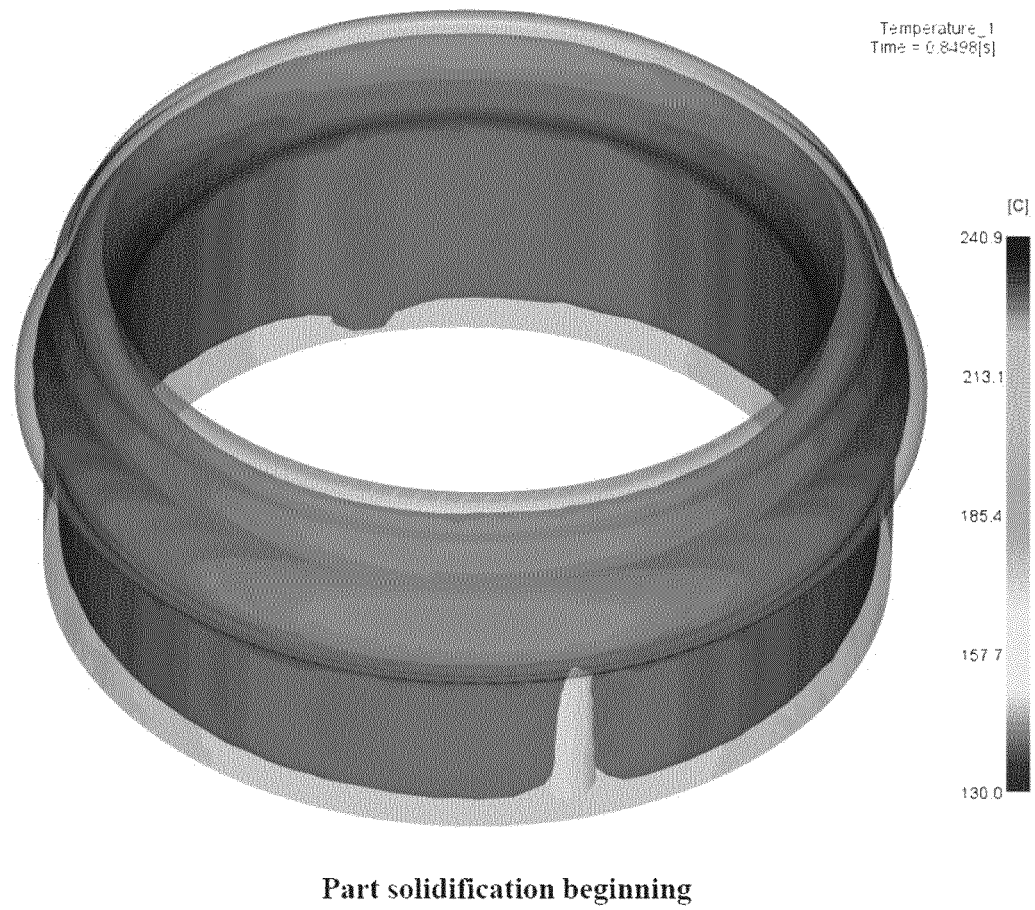
Figure 19:
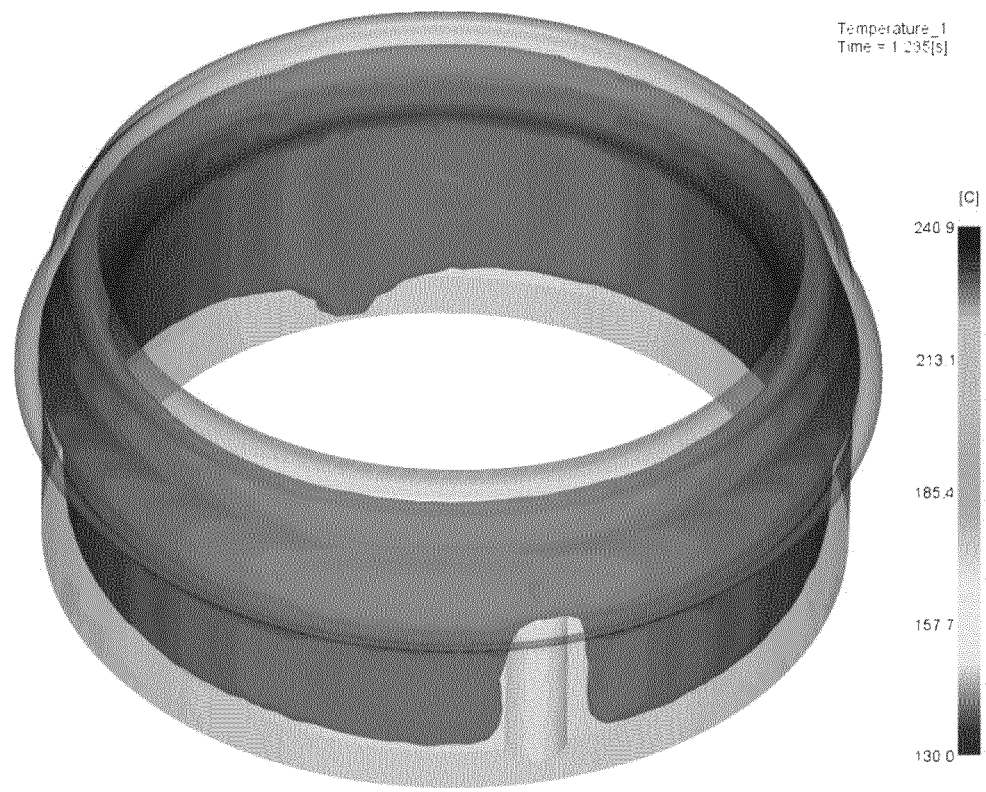
Figure 20:
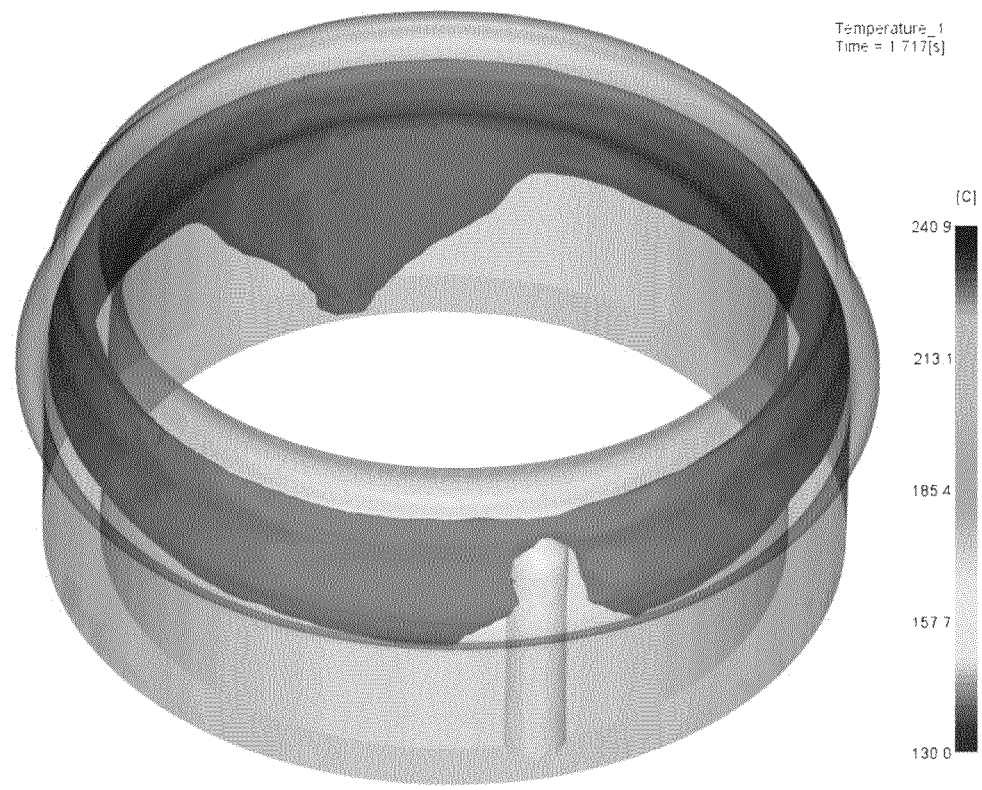
Figure 21:
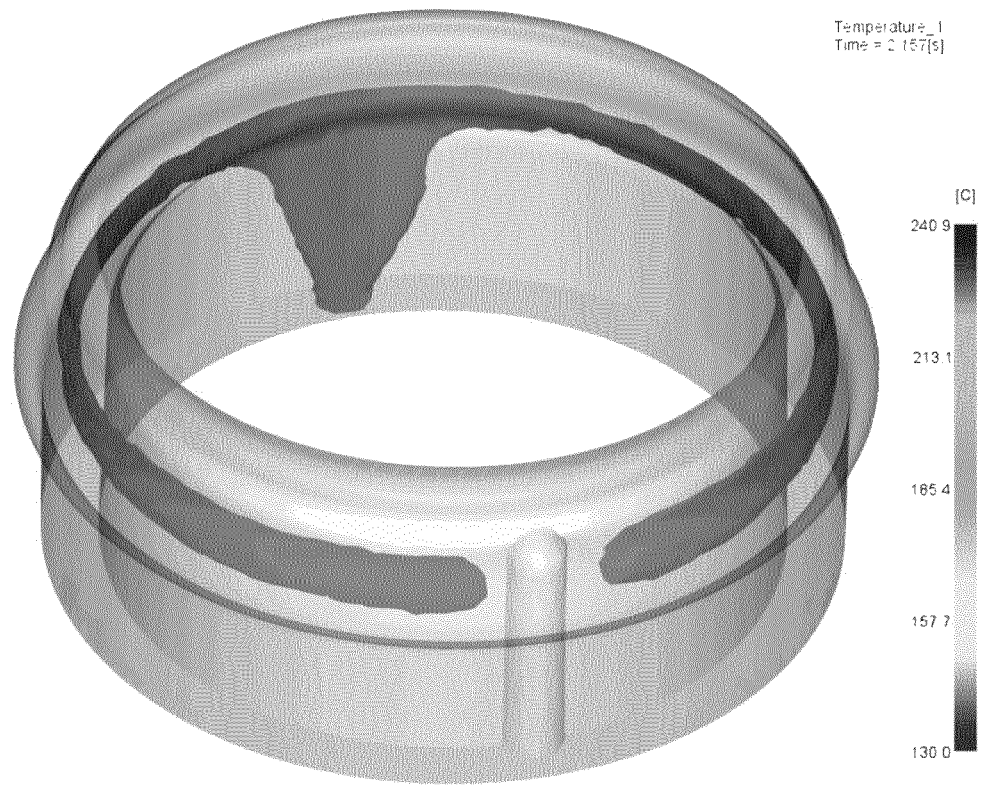
Figure 22:
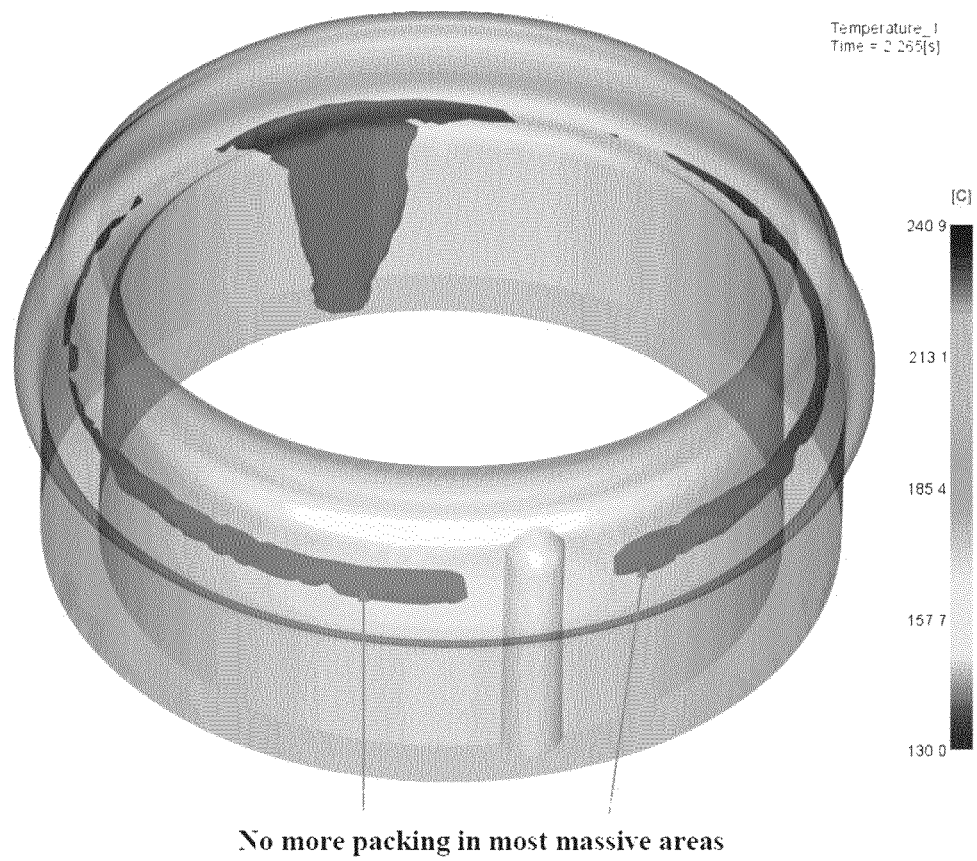
Figure 23:
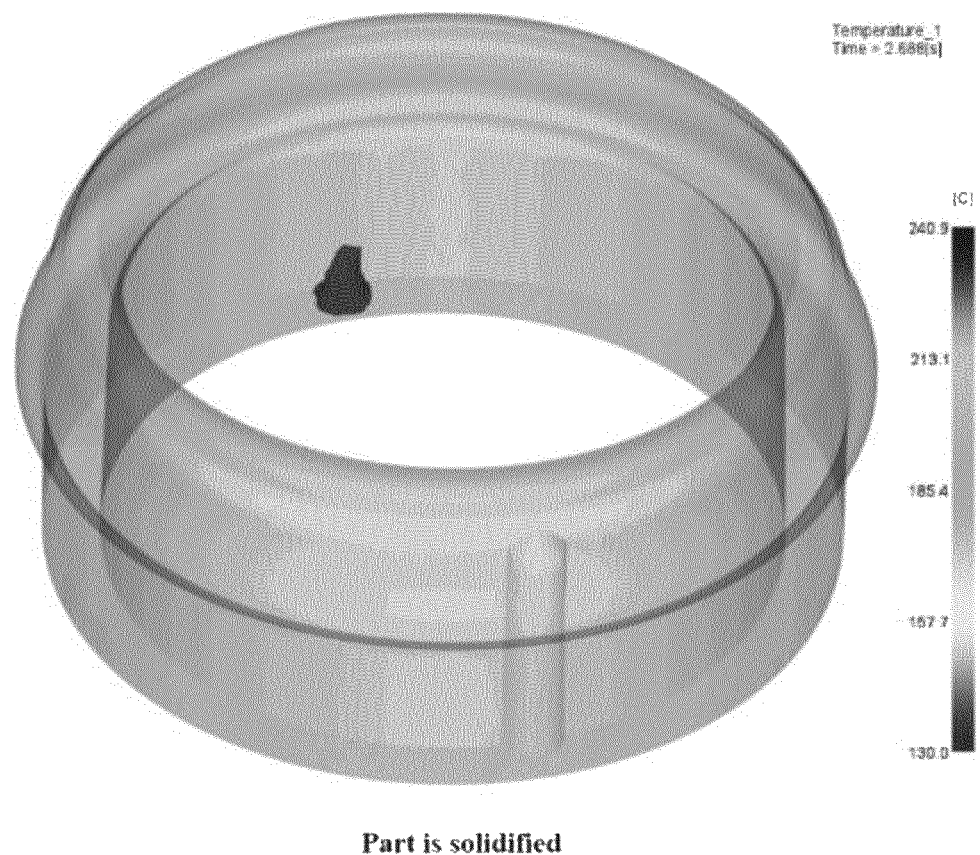
Figure 24:
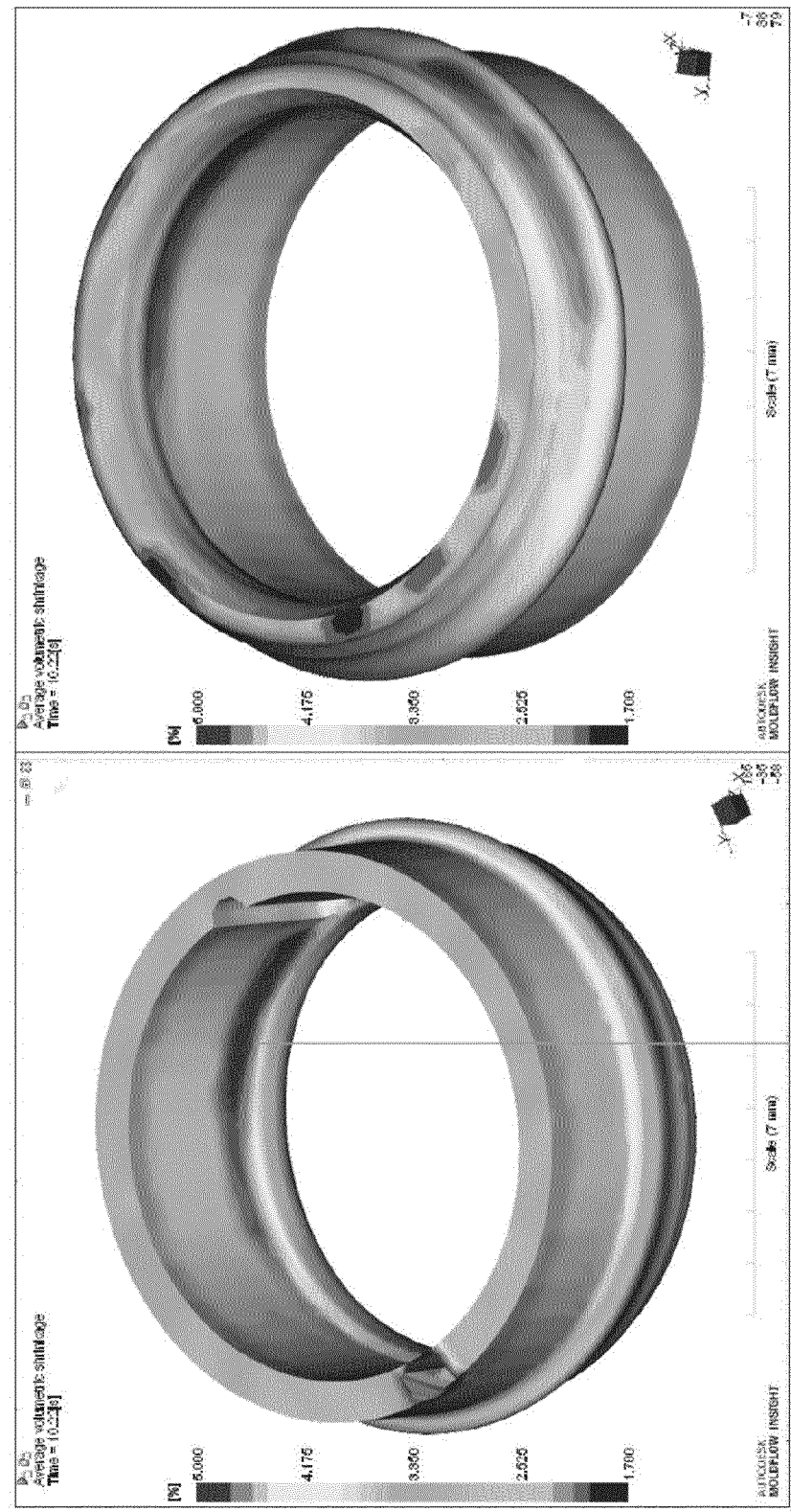
Figure 25:
Figure 26:
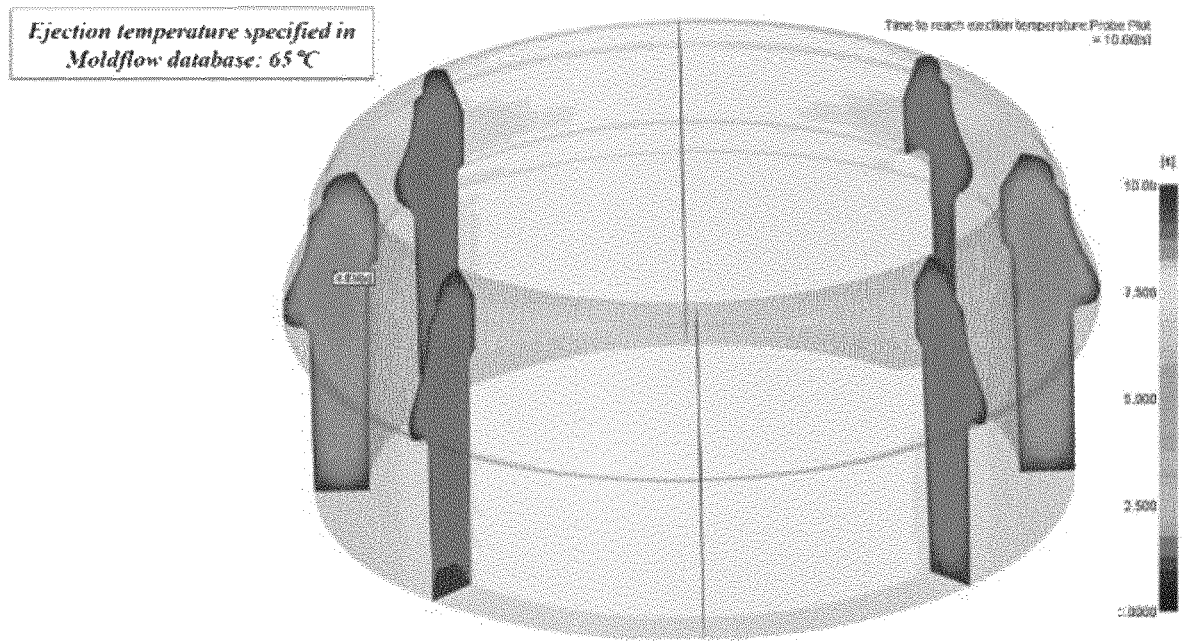
Figure 27:
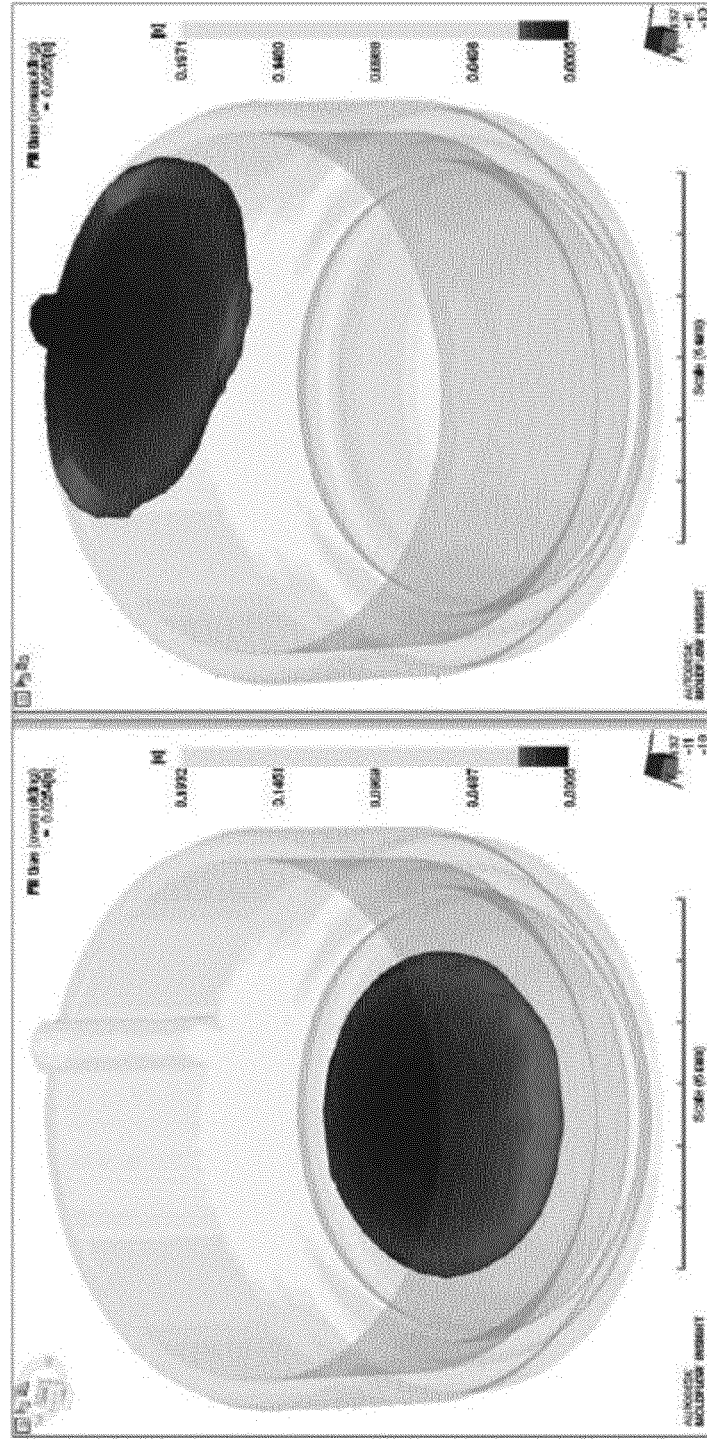
Figure 28:
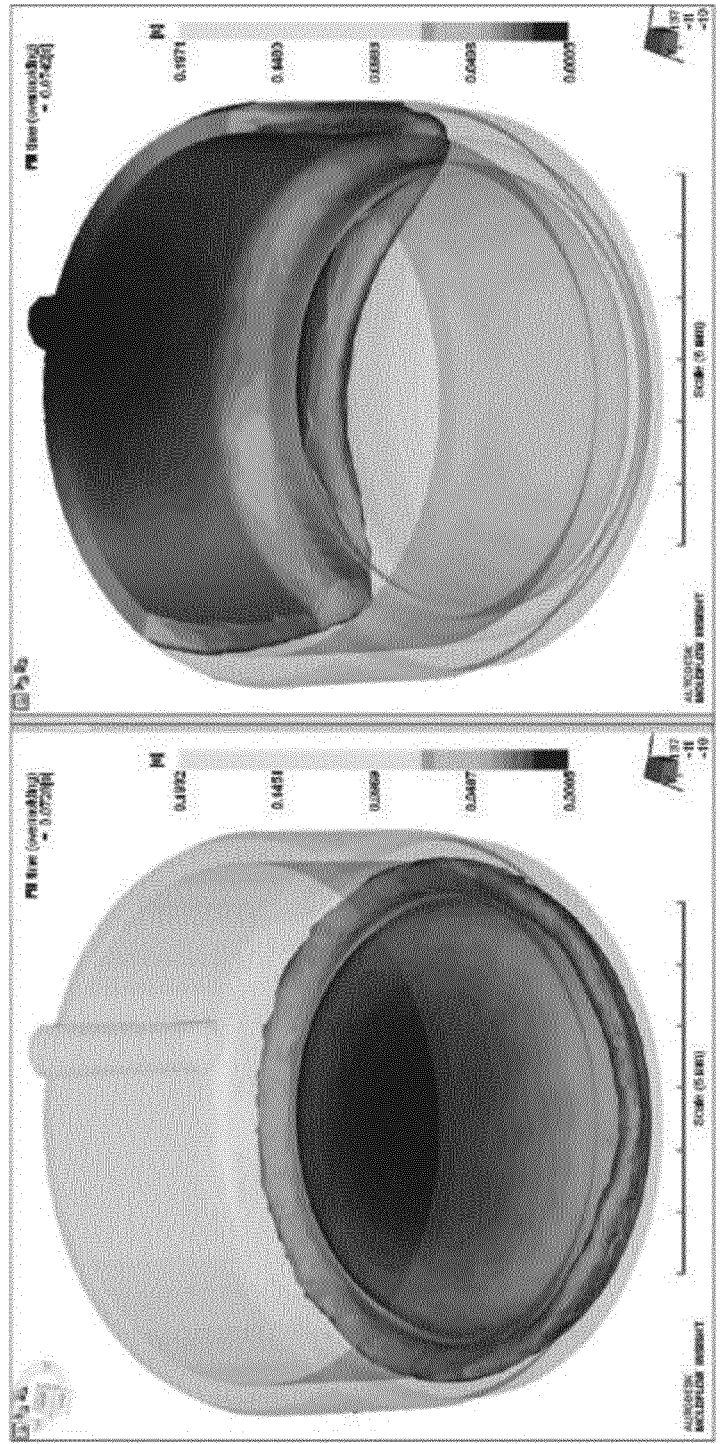
Figure 29:
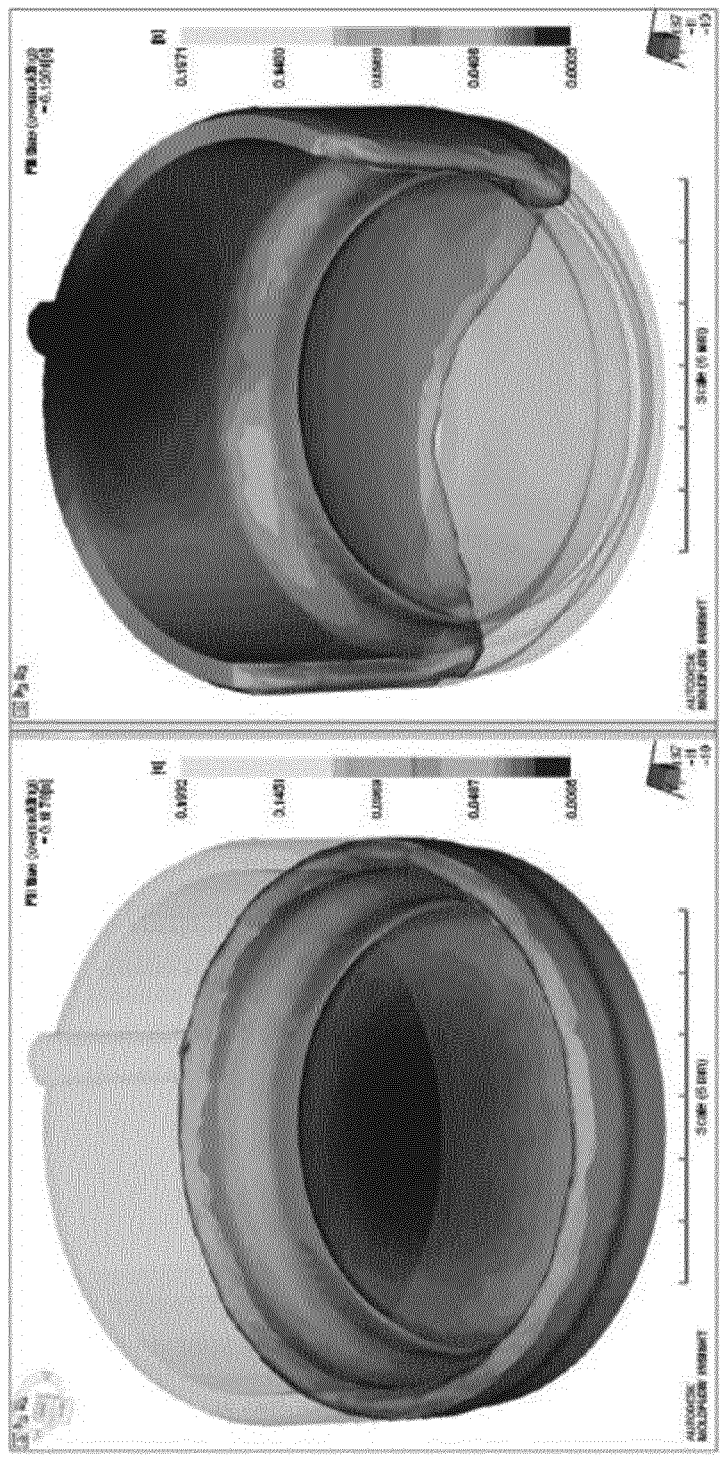
Figure 30:
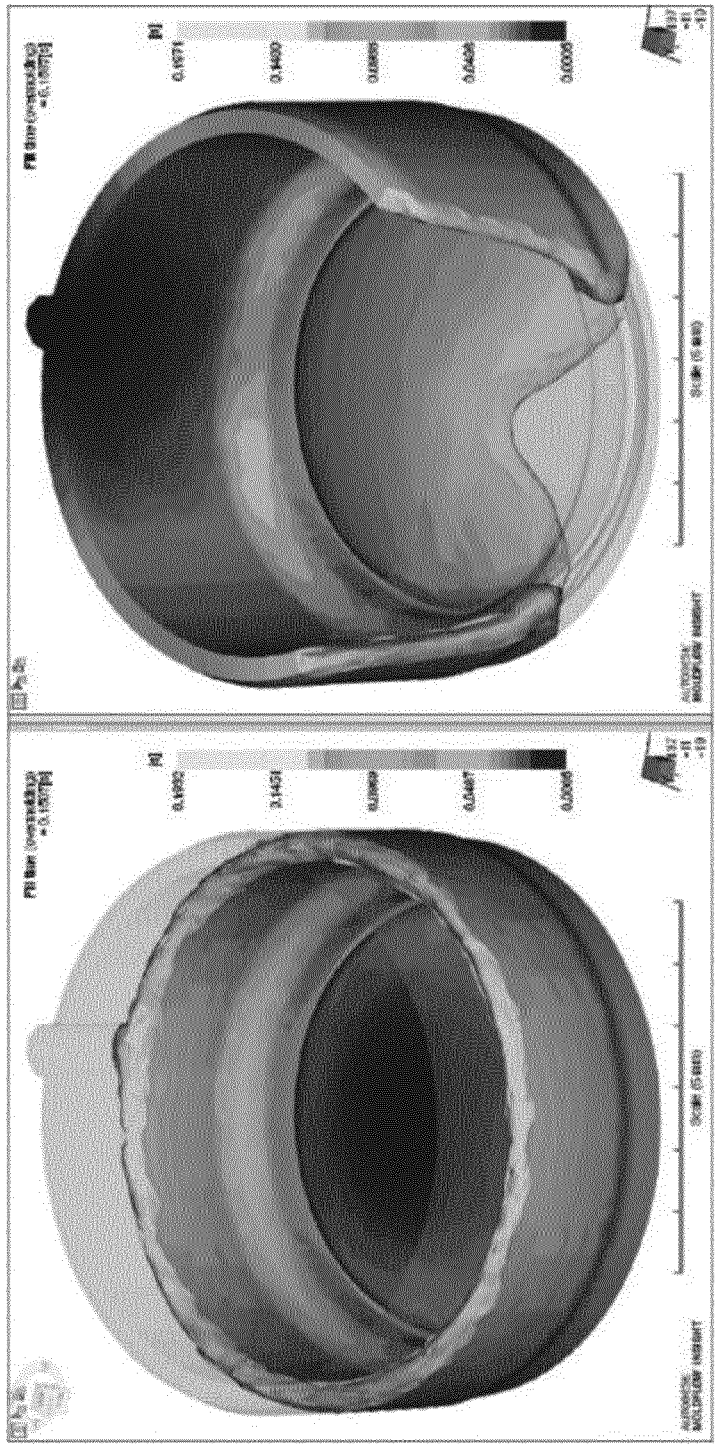
Figure 31:
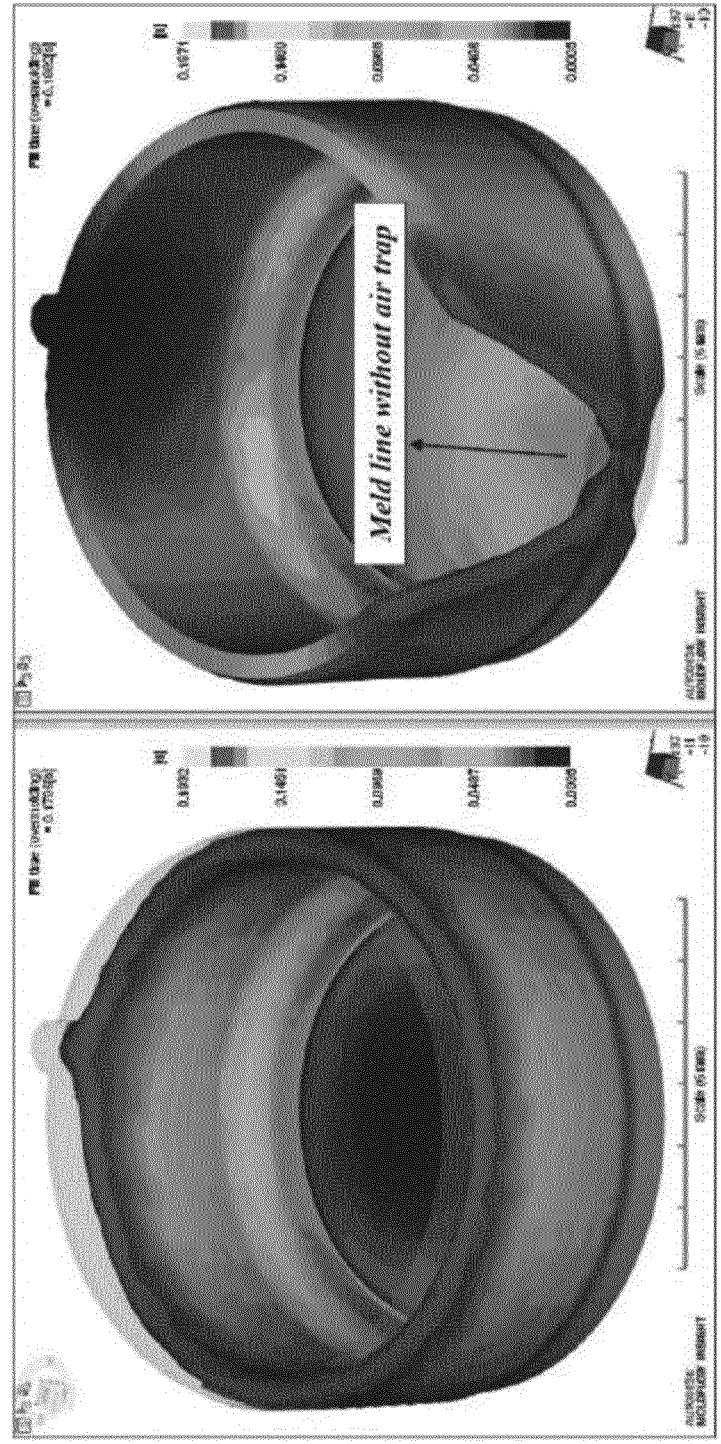
Figure 32:
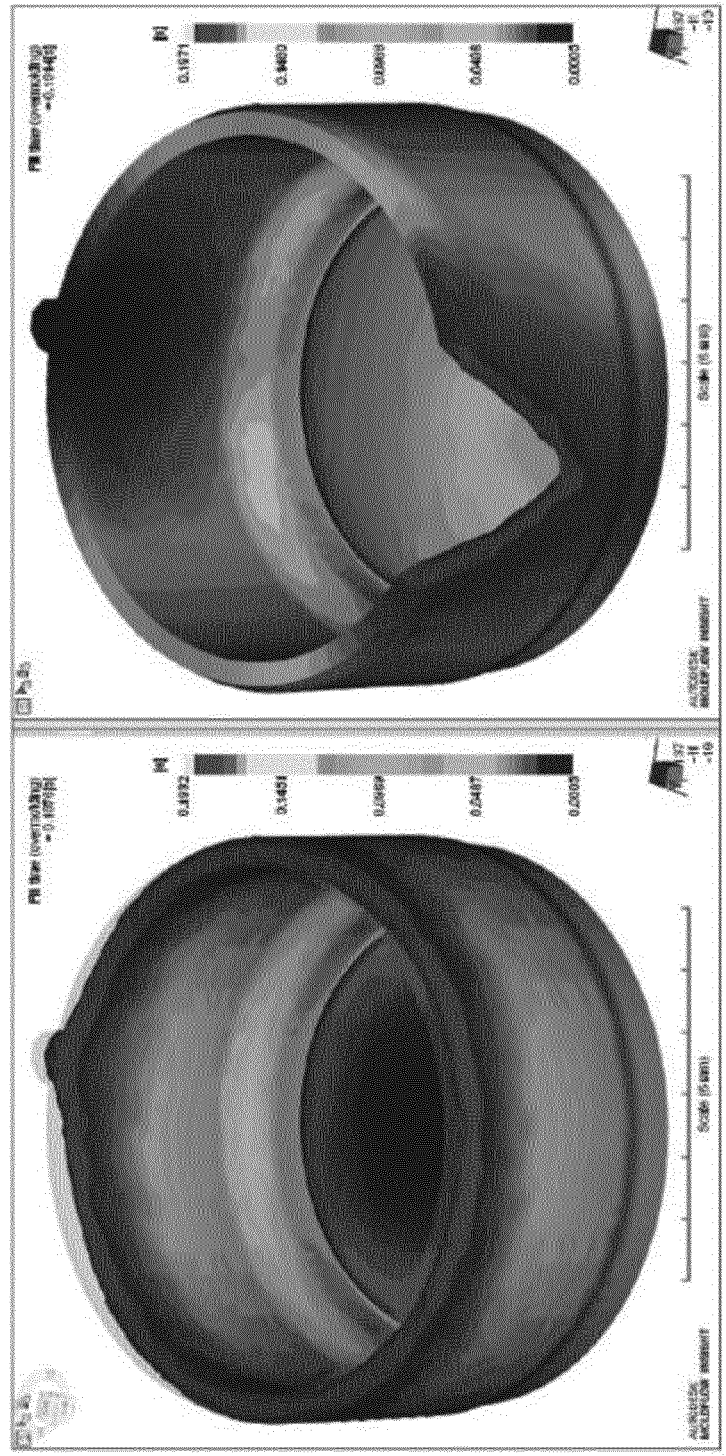
Figure 33:
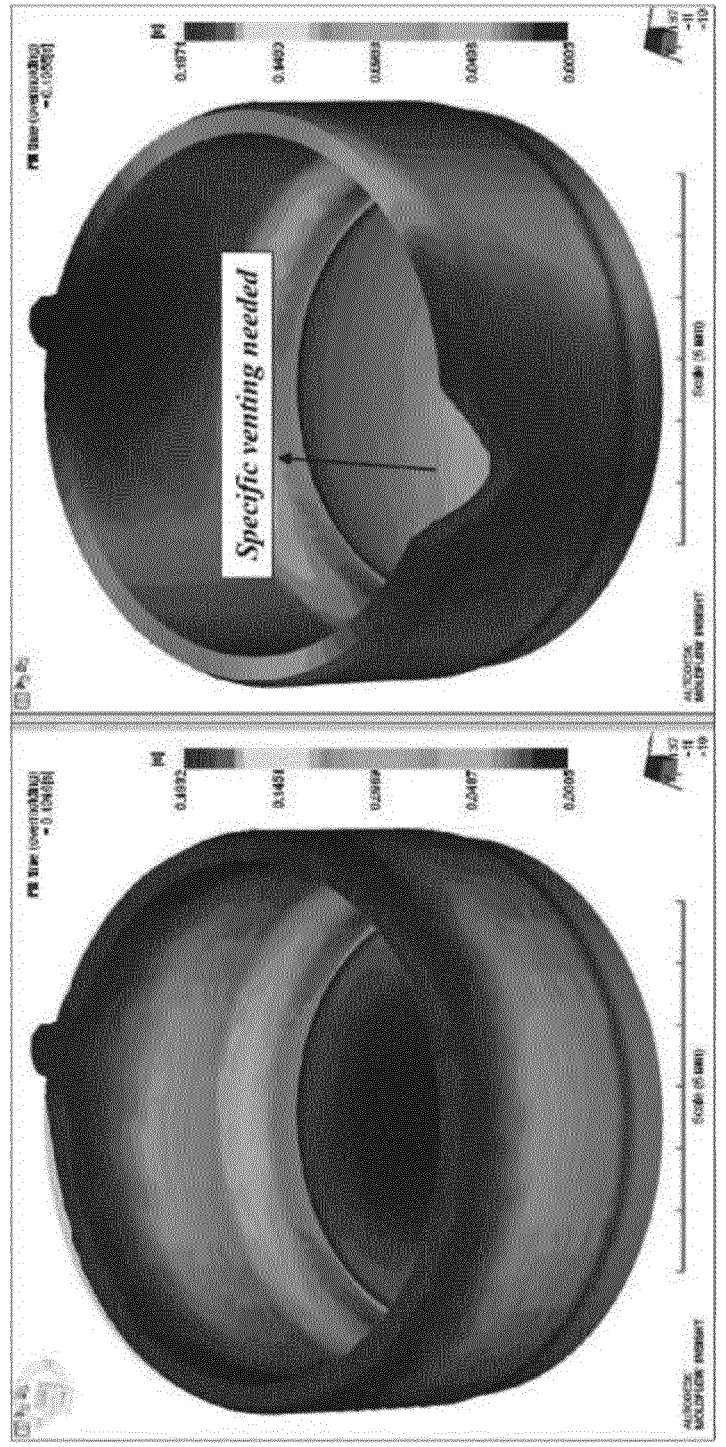
Figure 34:
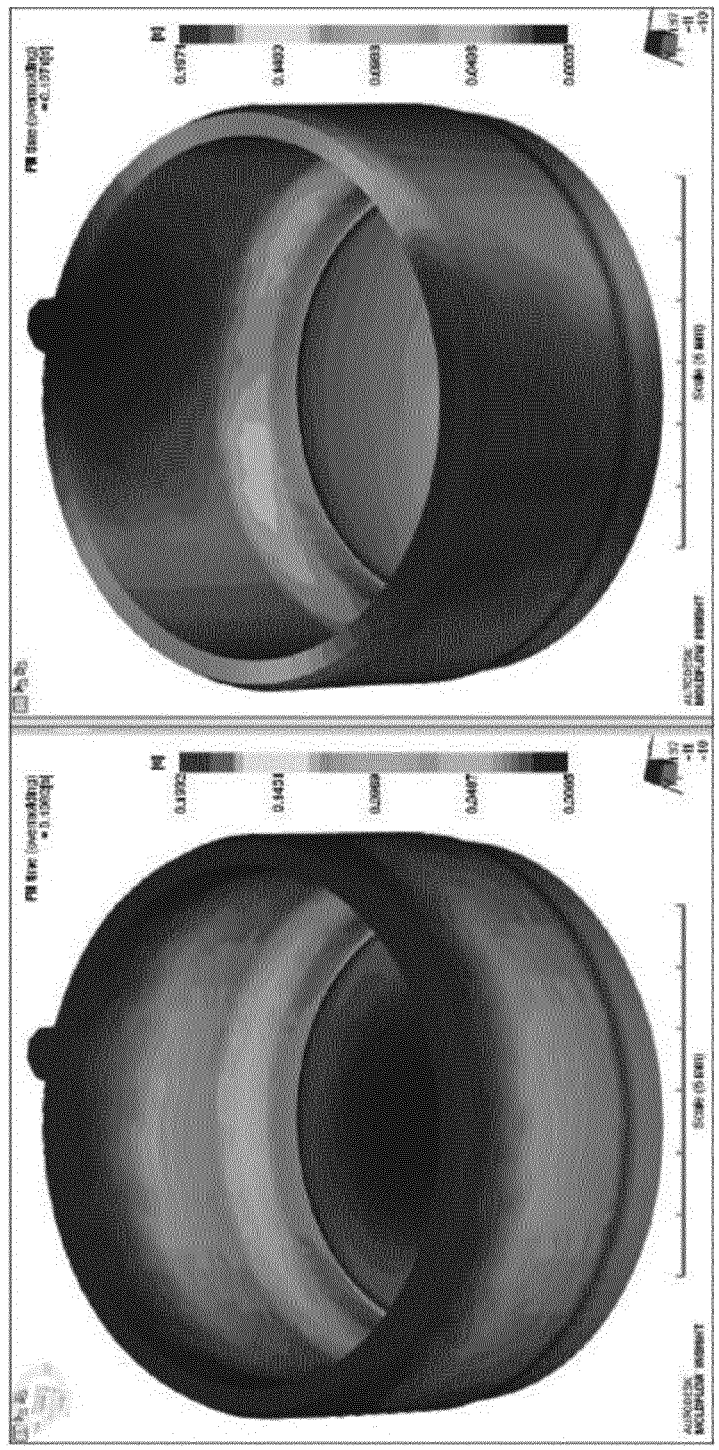
Figure 35:
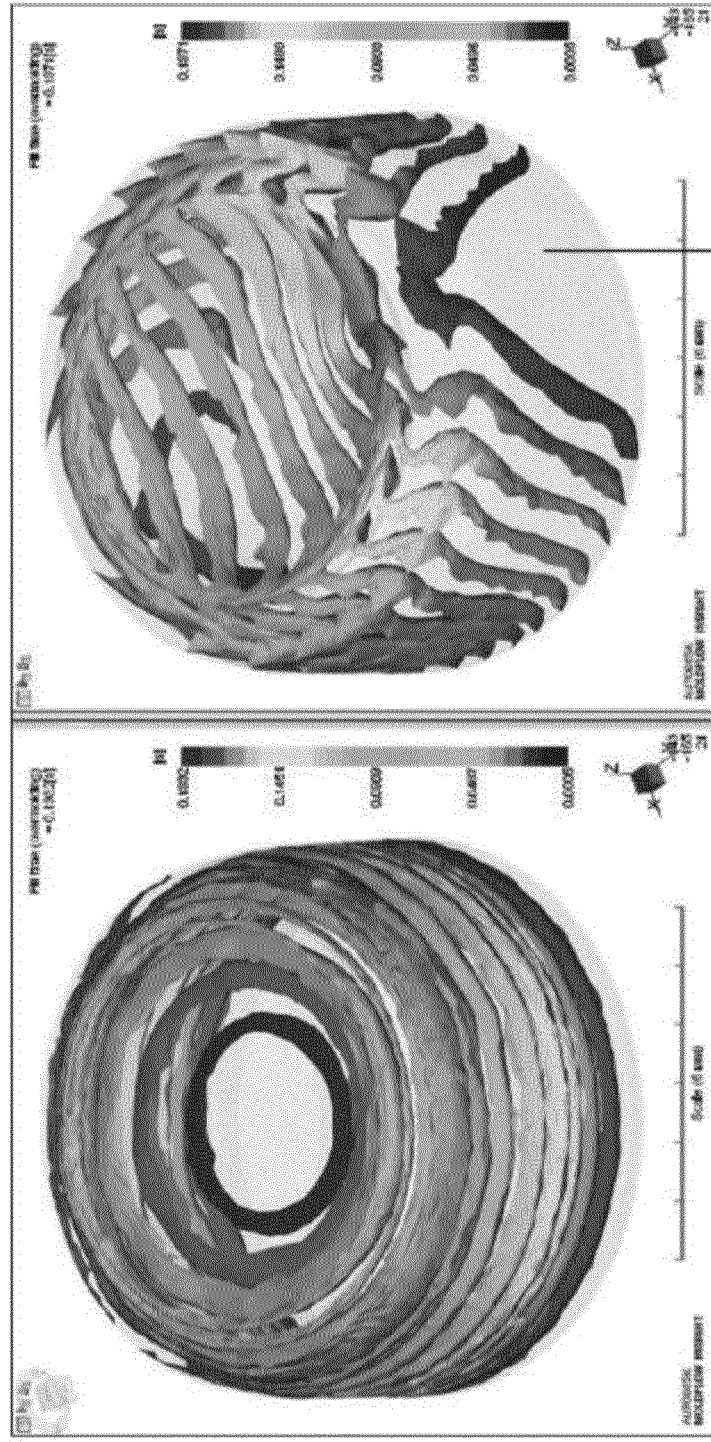
Figure 36:
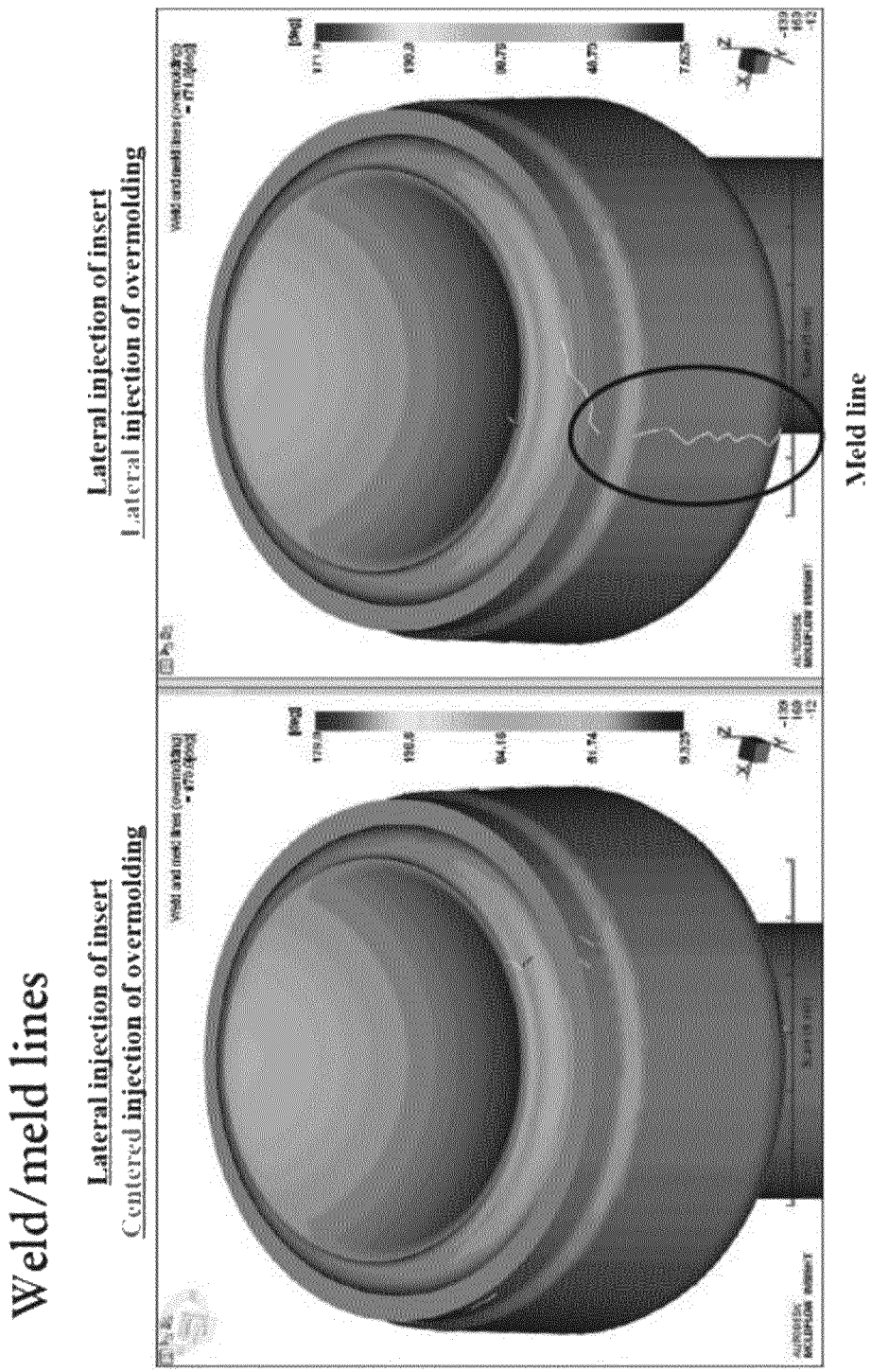
Figure 37:
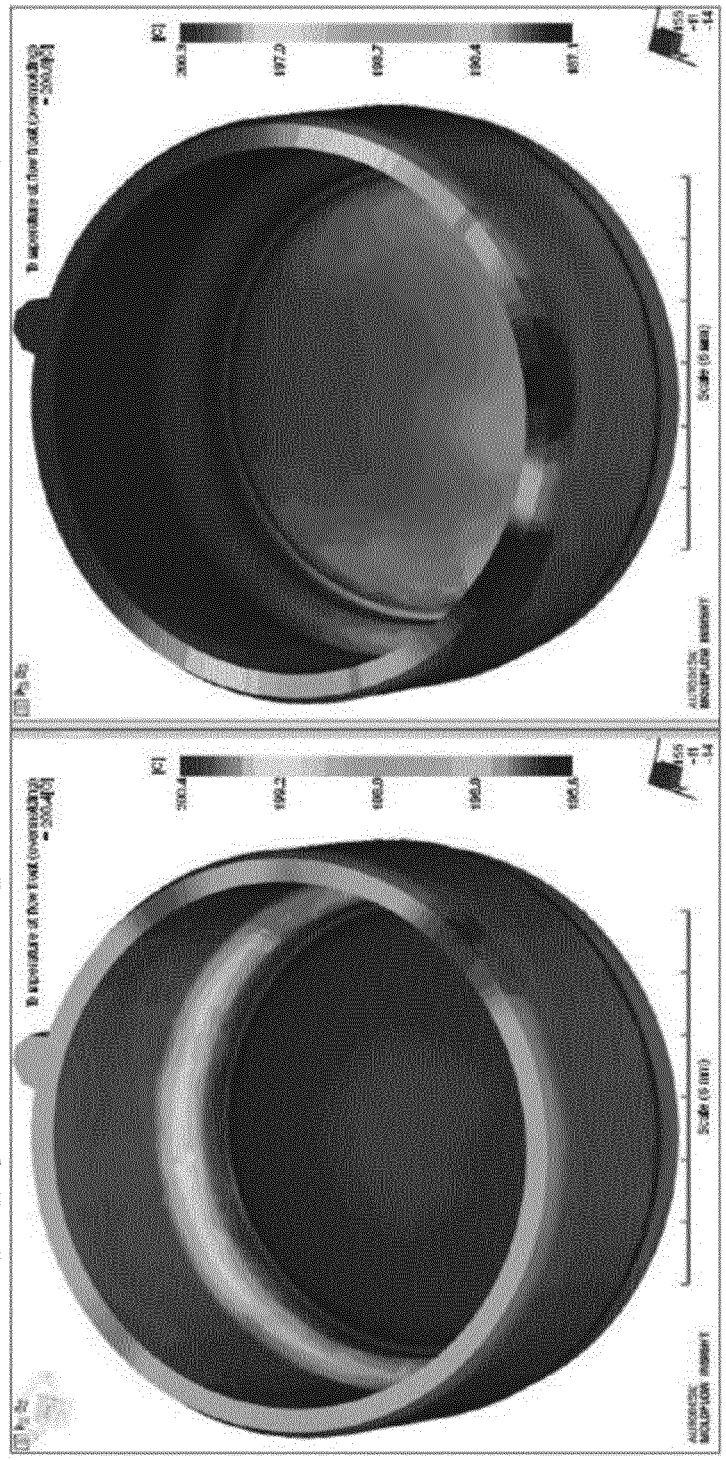
Figure 38:
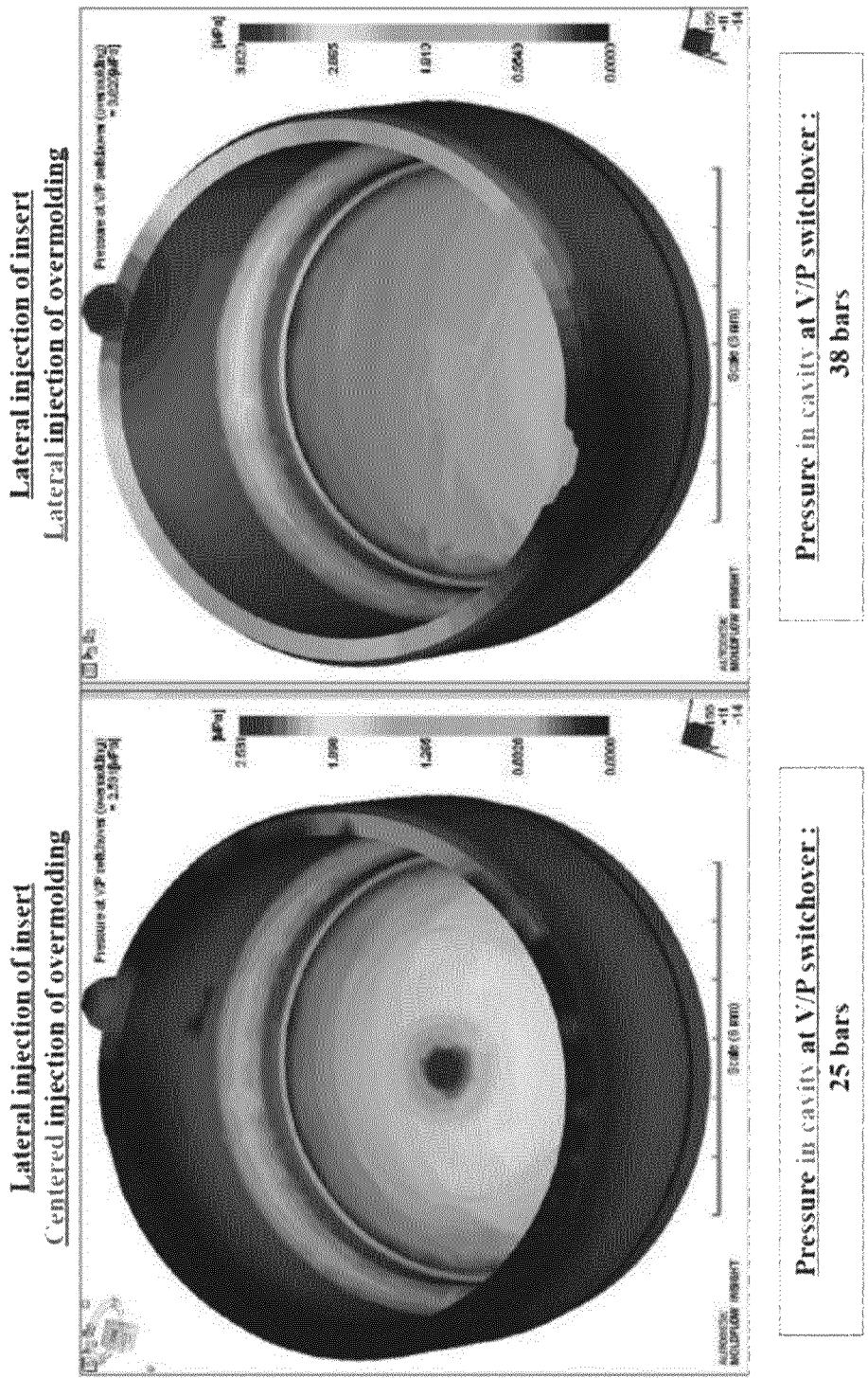
Figure 39:
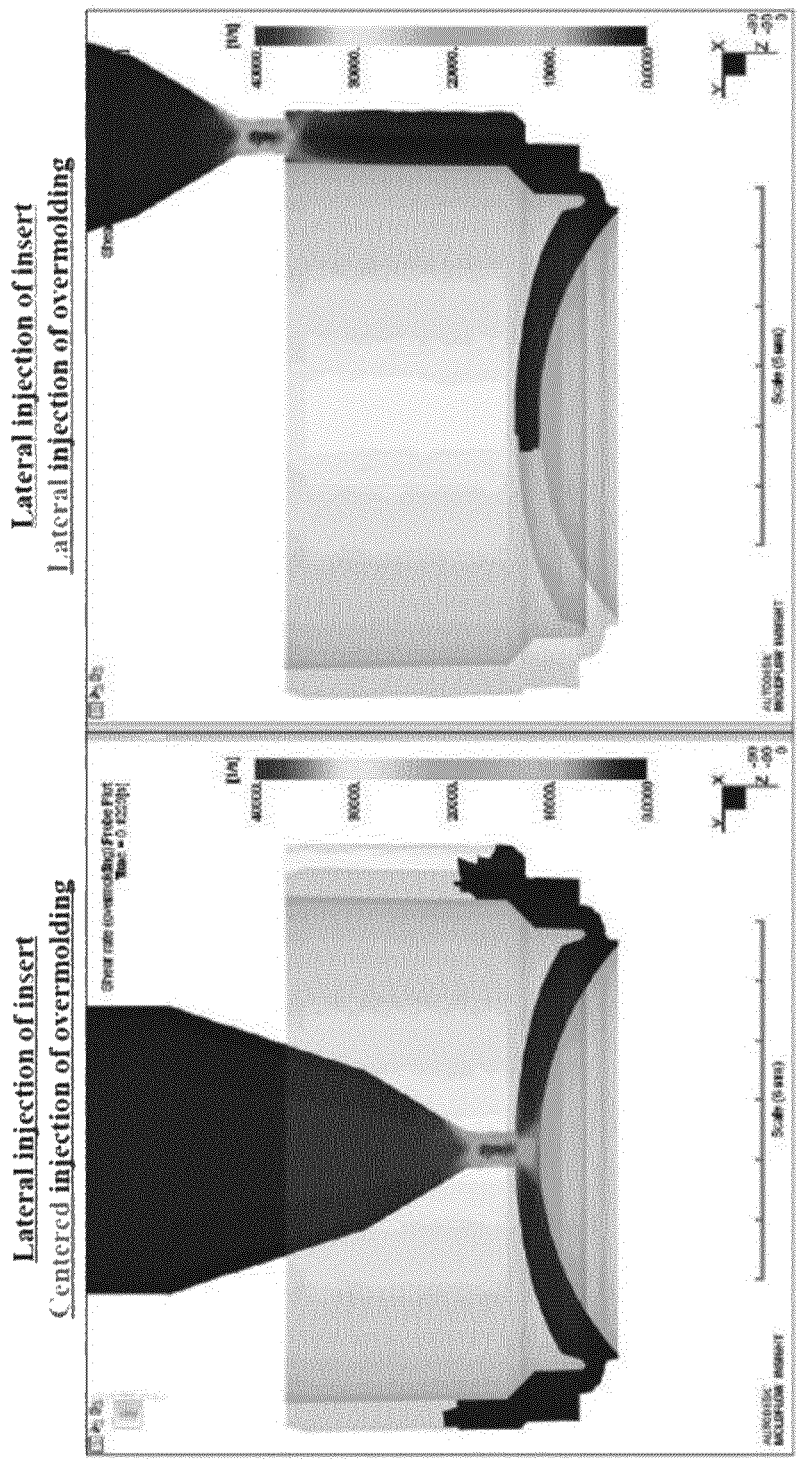
Figure 40:
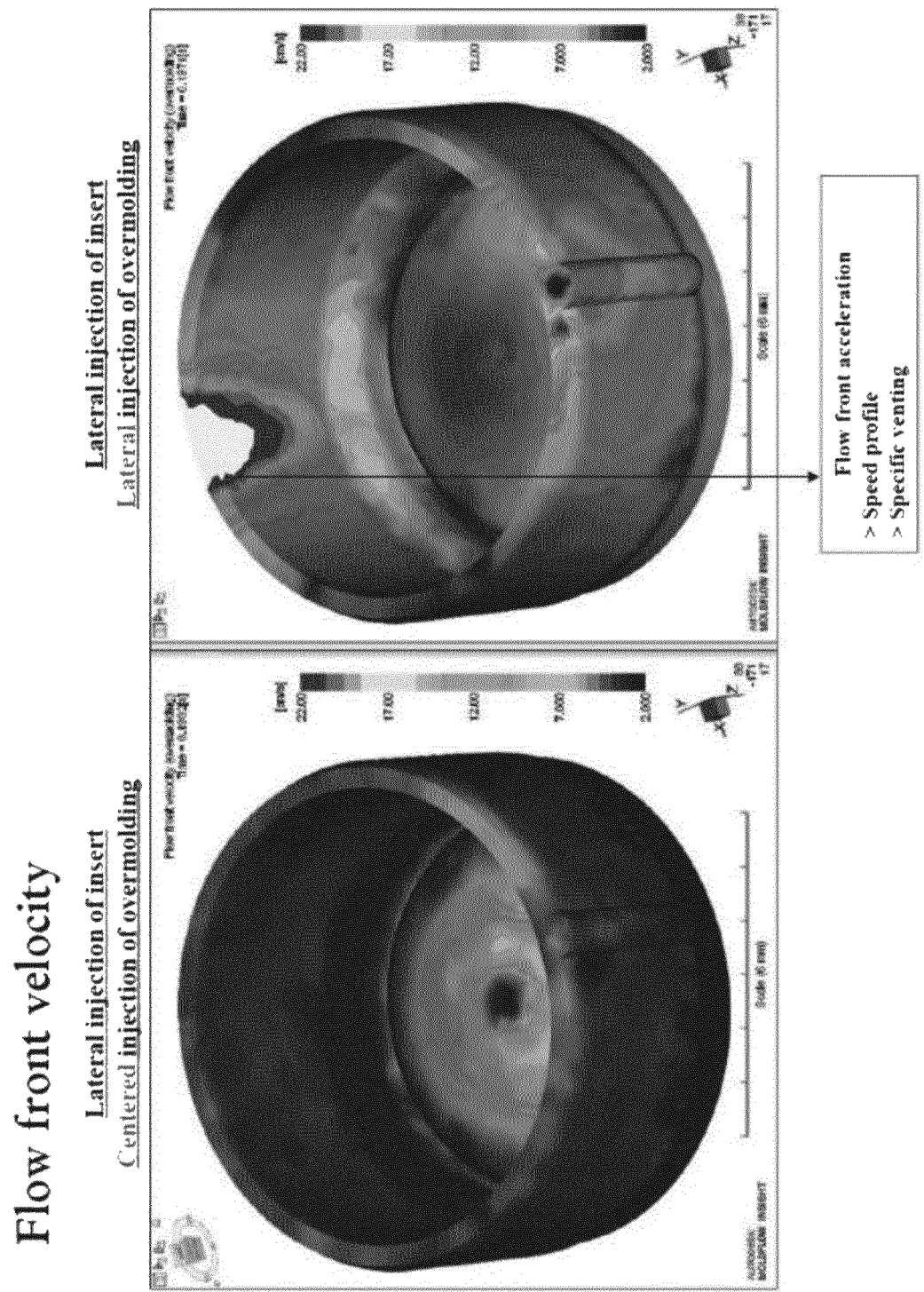
Figure 41:
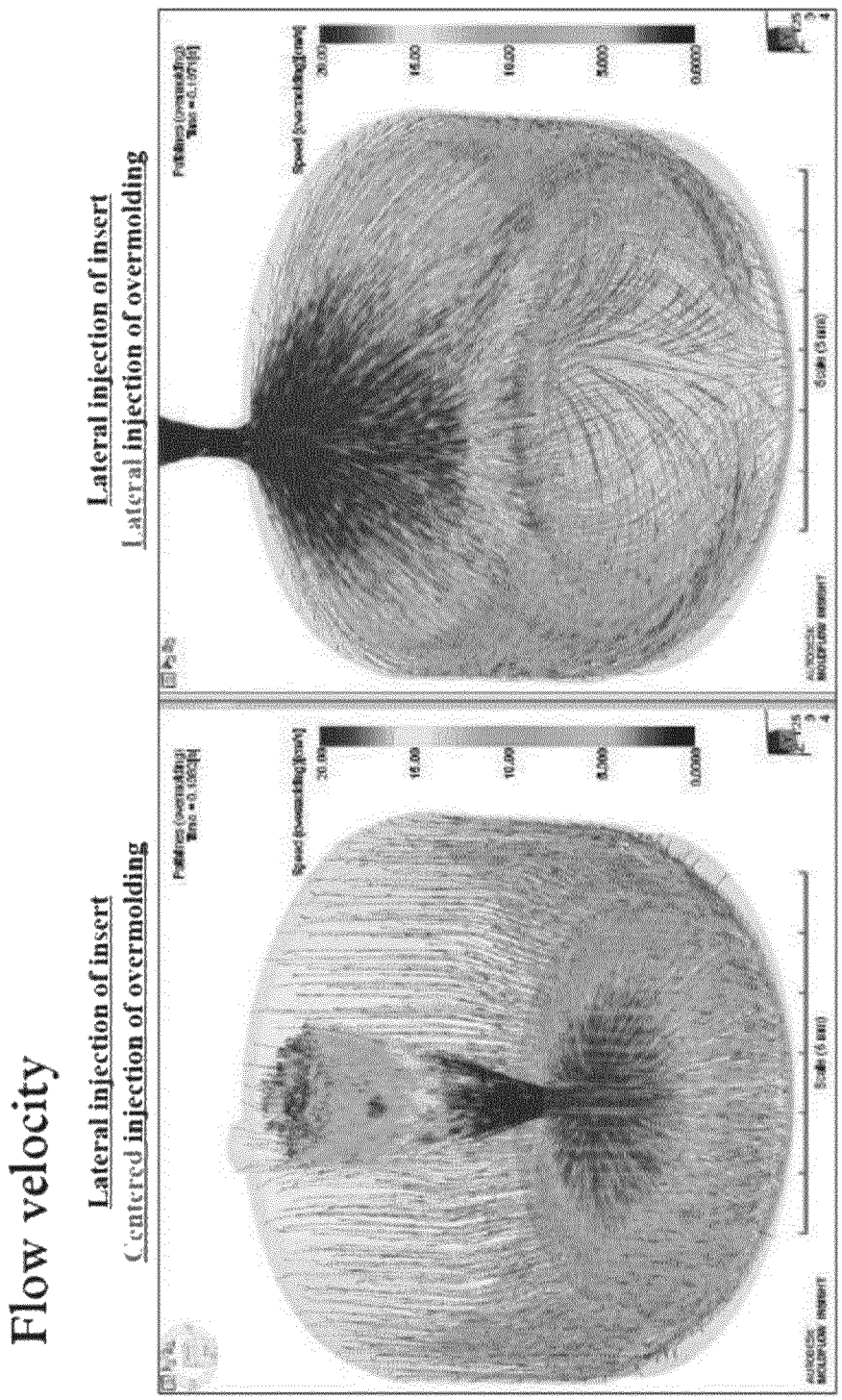
Figure 42:
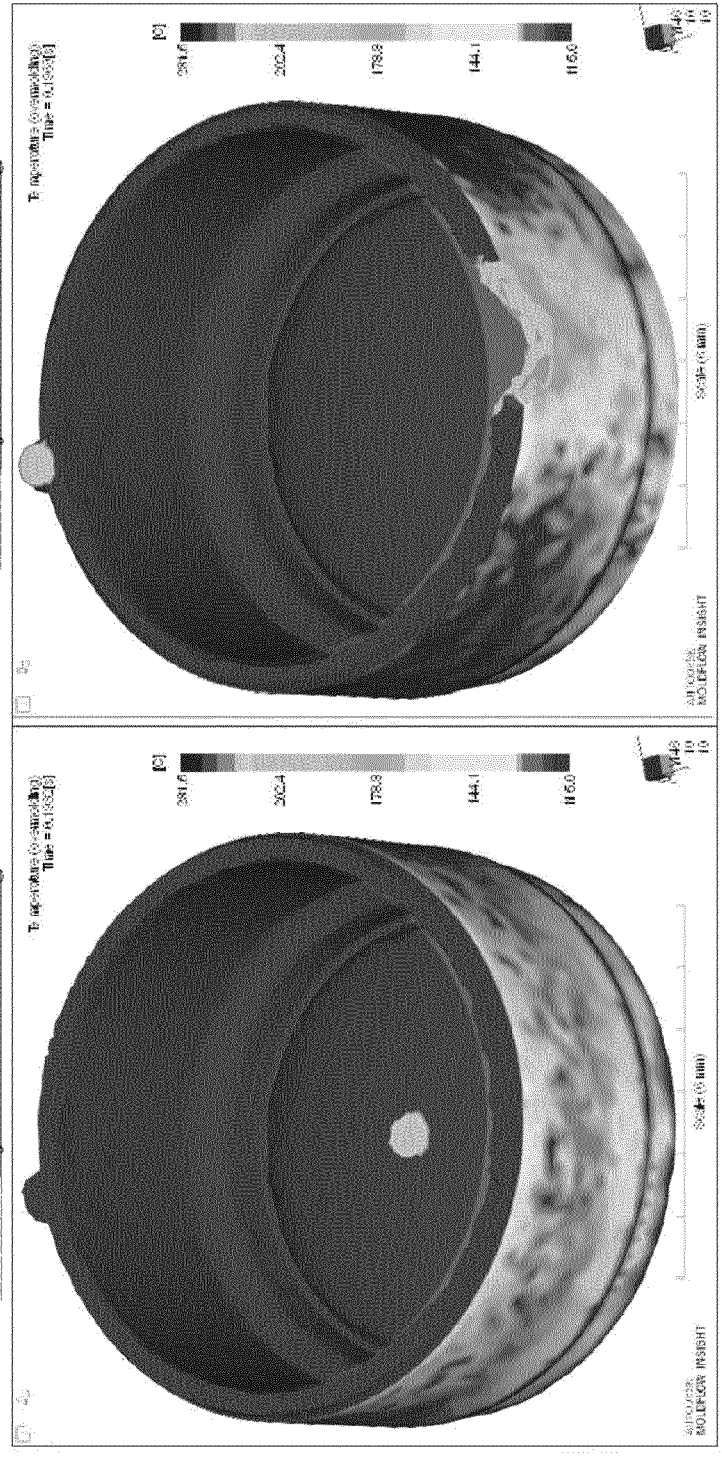
Figure 43:
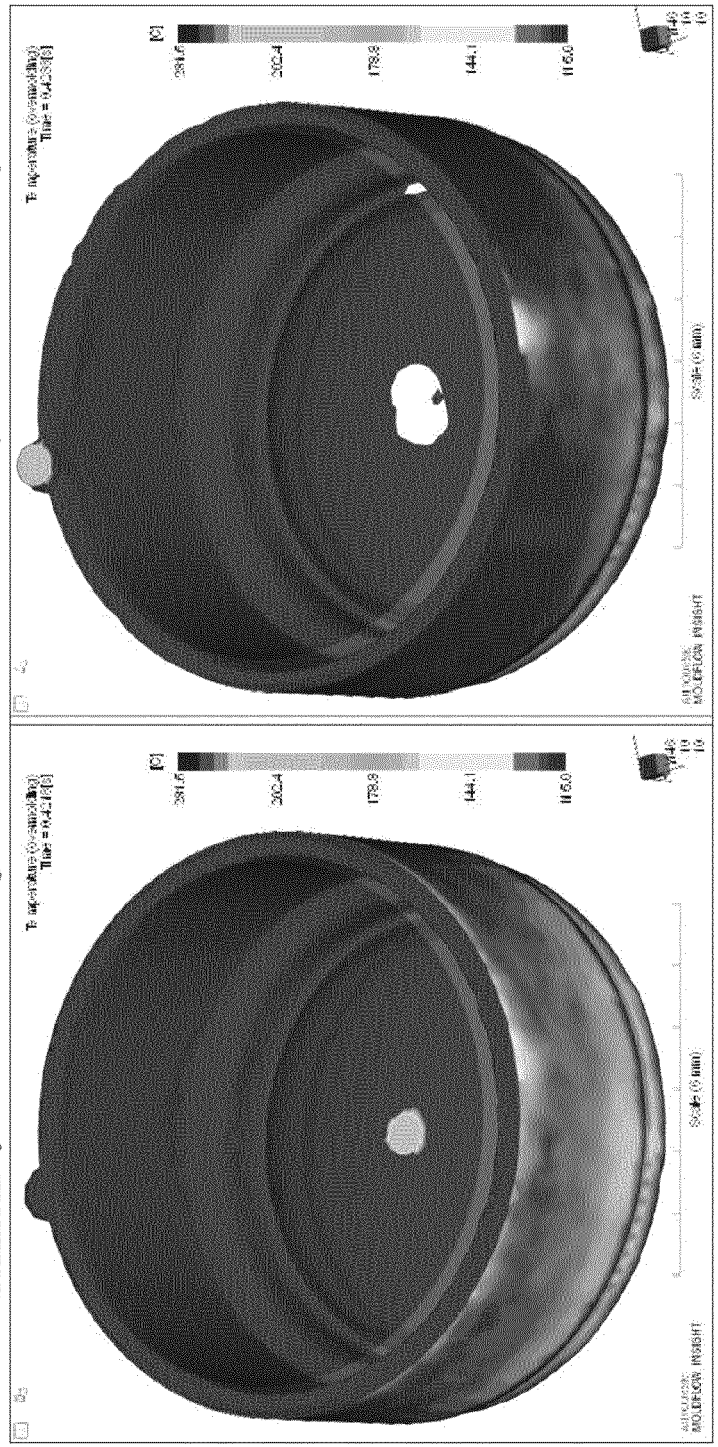
Figure 44:
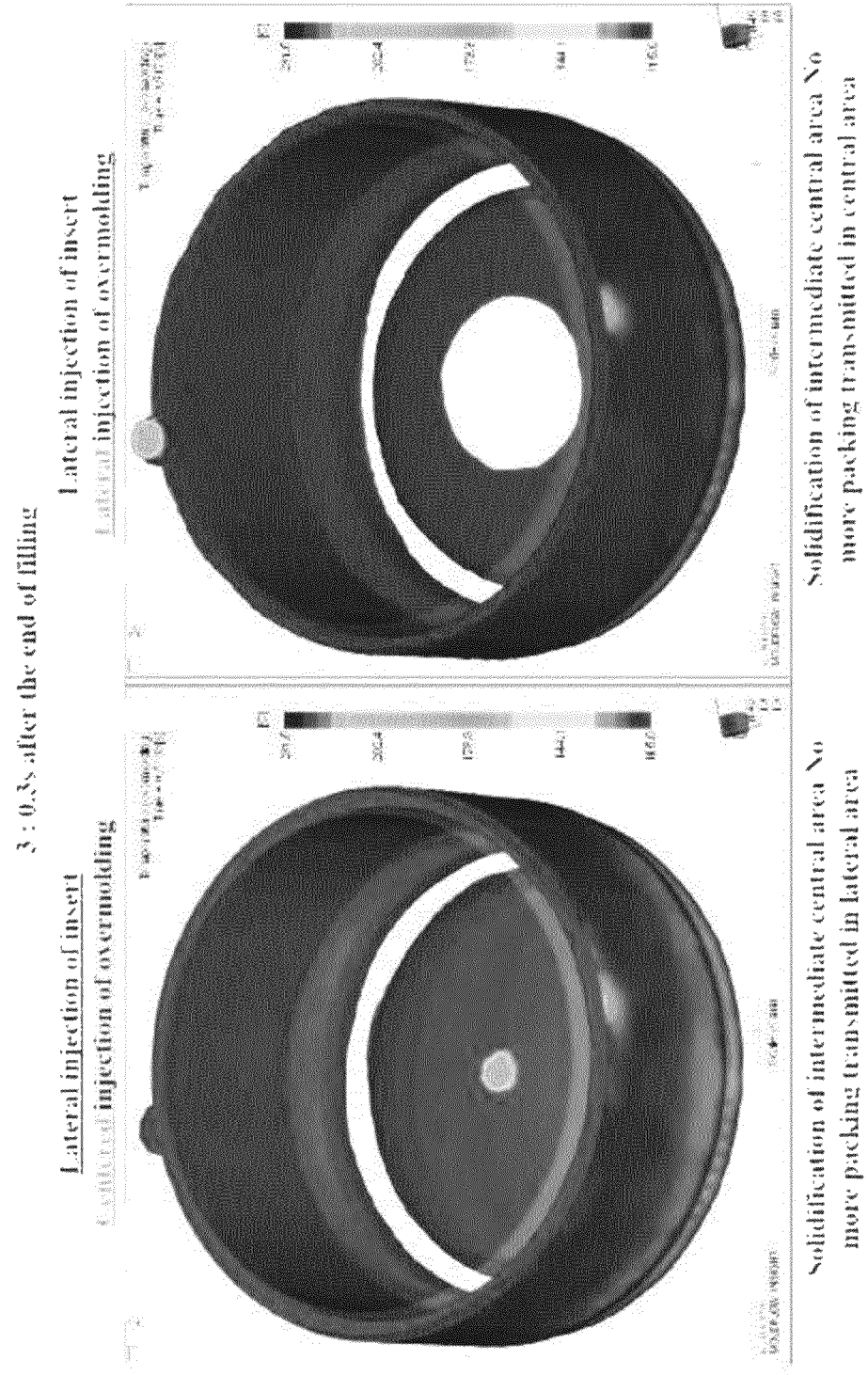
Figure 45:
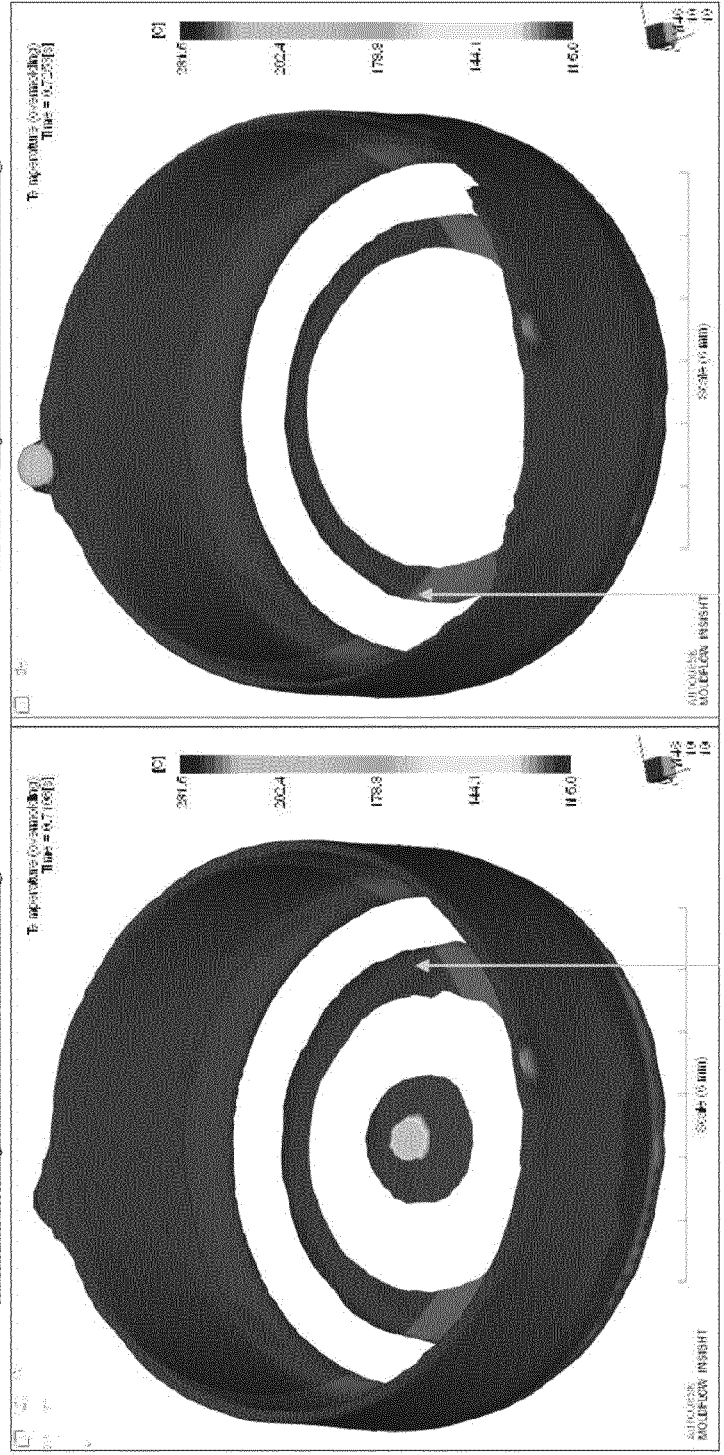
Figure 46:
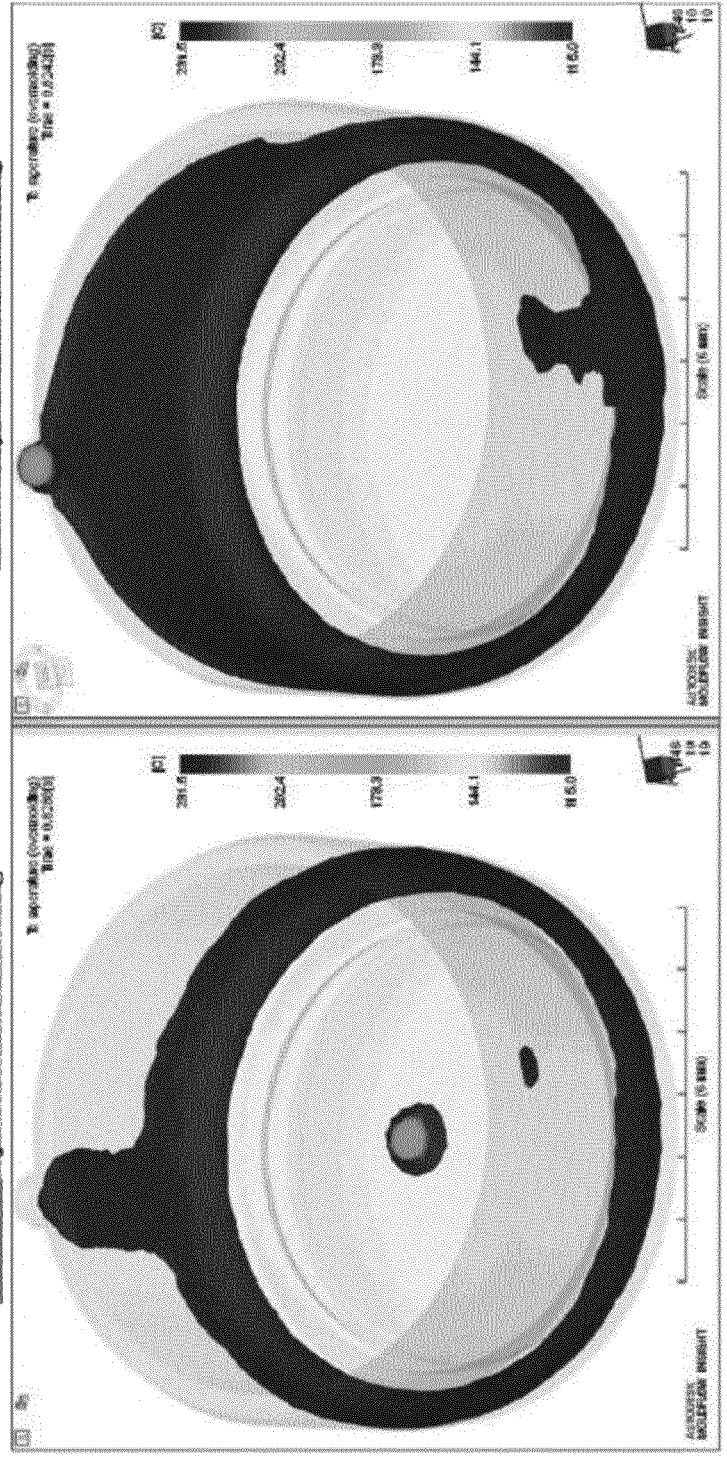
Figure 47:
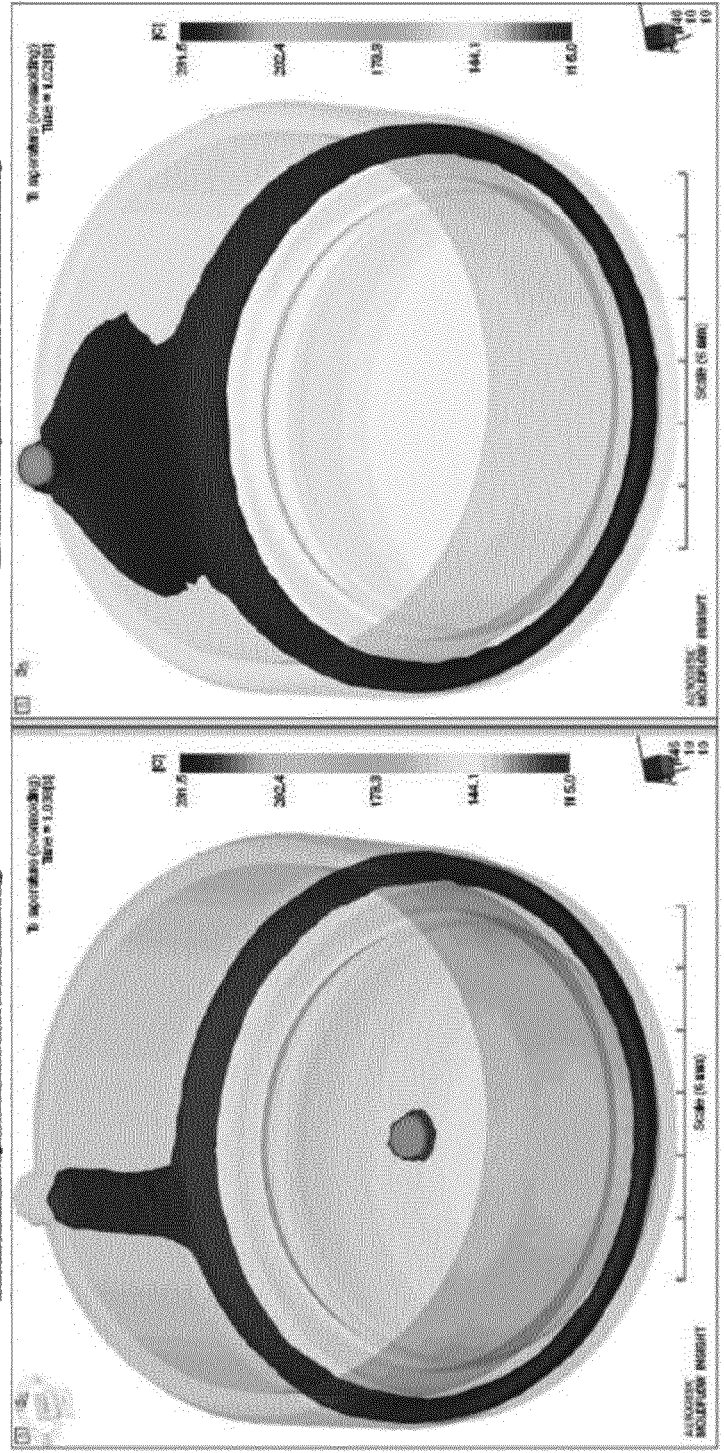
Figure 48:
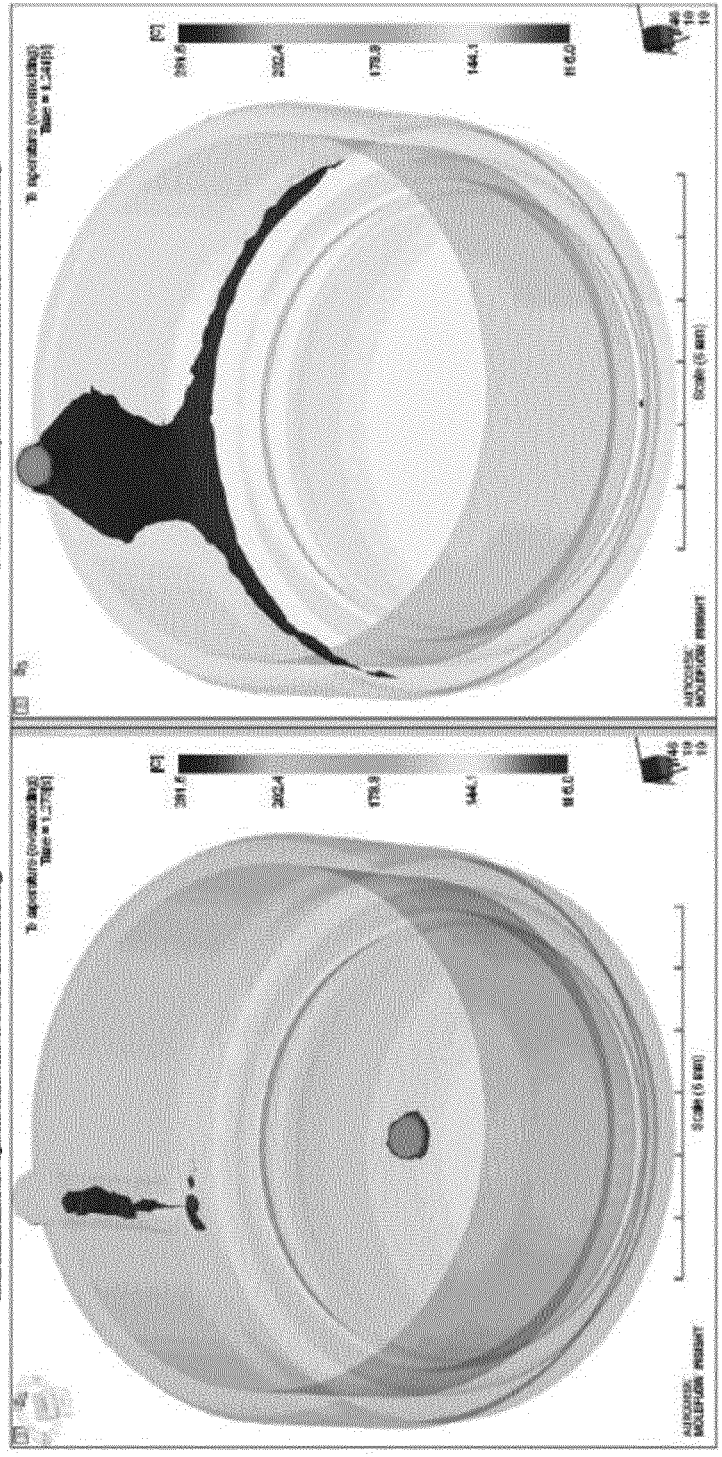
Figure 49:
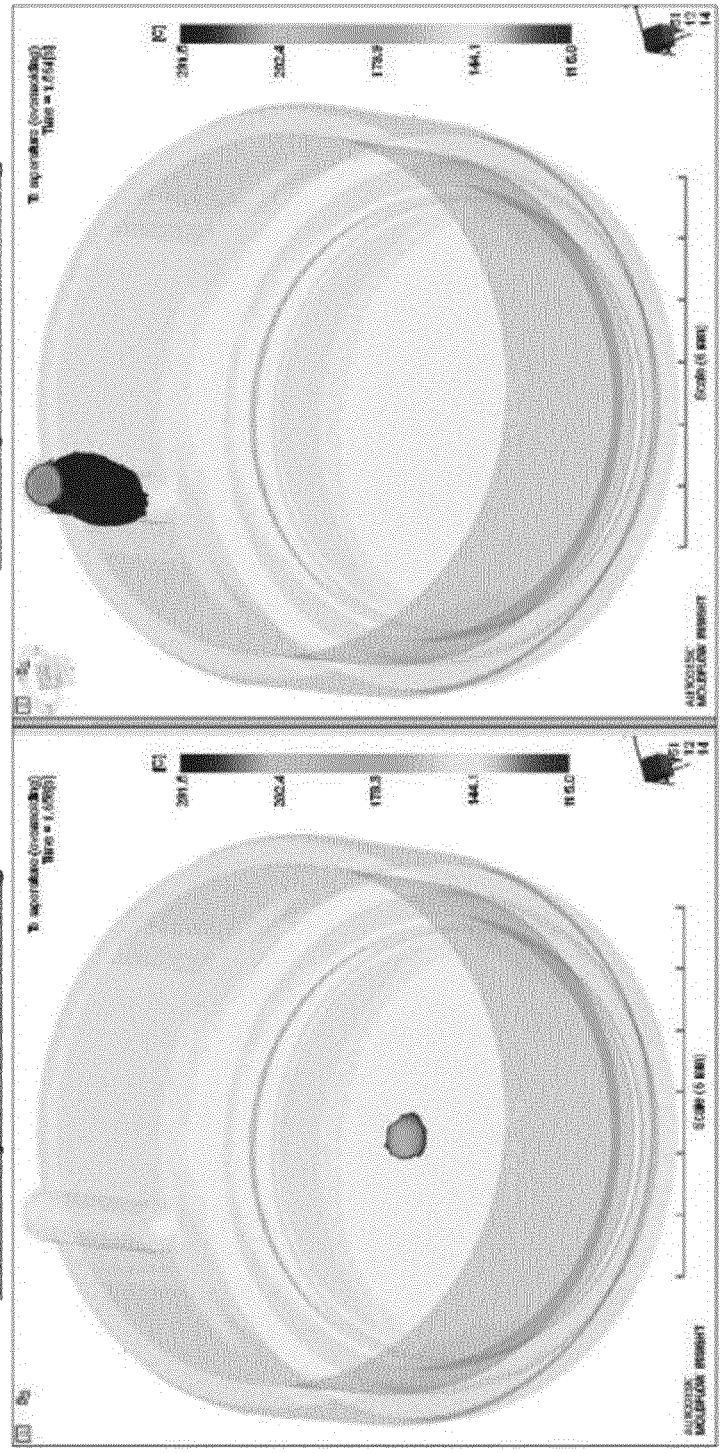
Figure 50:
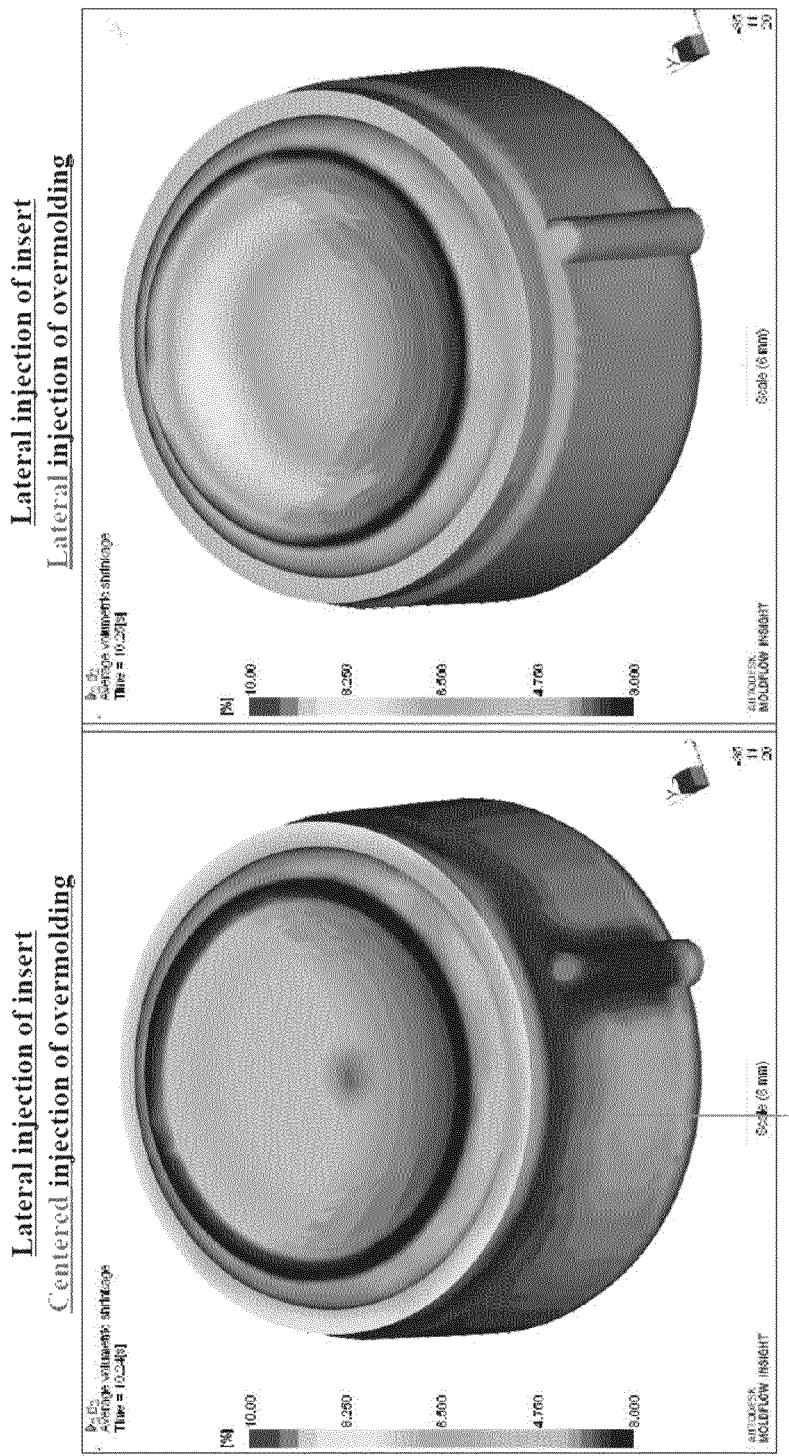
Figure 51:
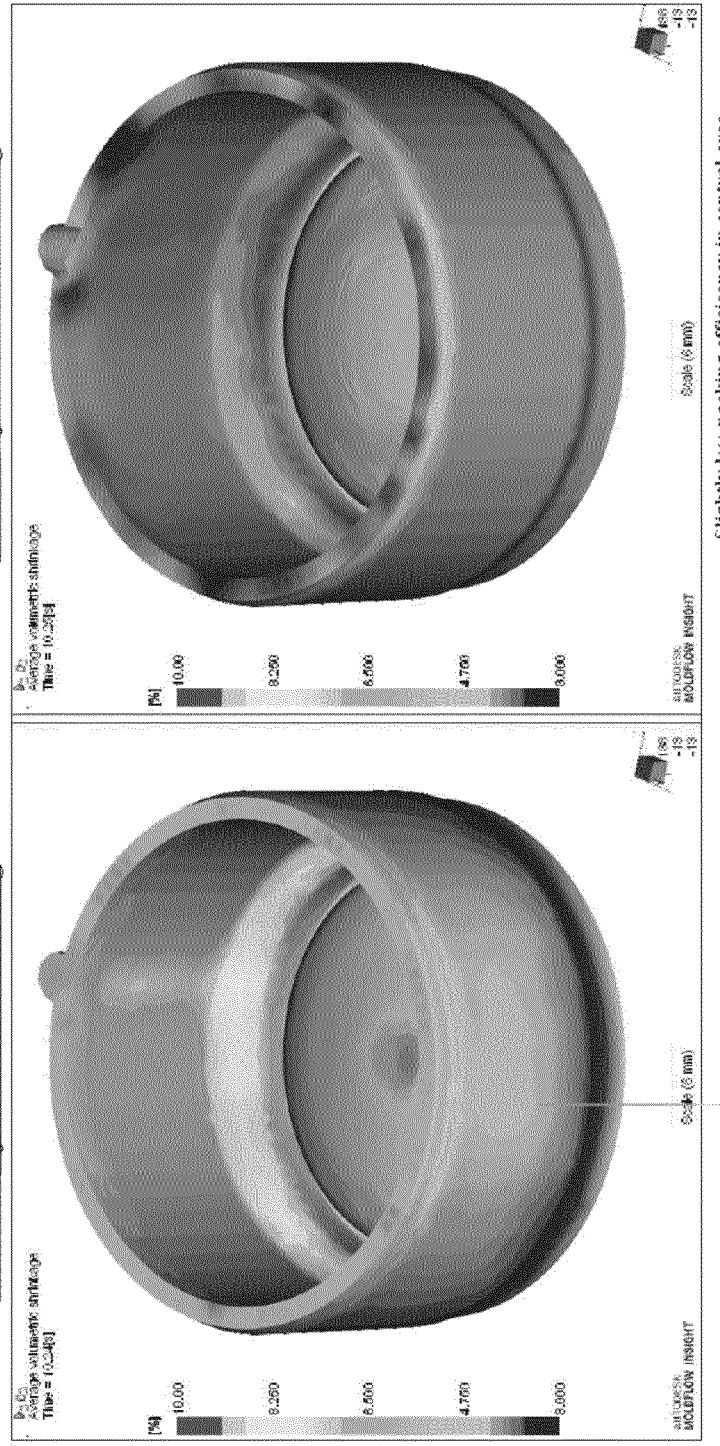
Figure 52:
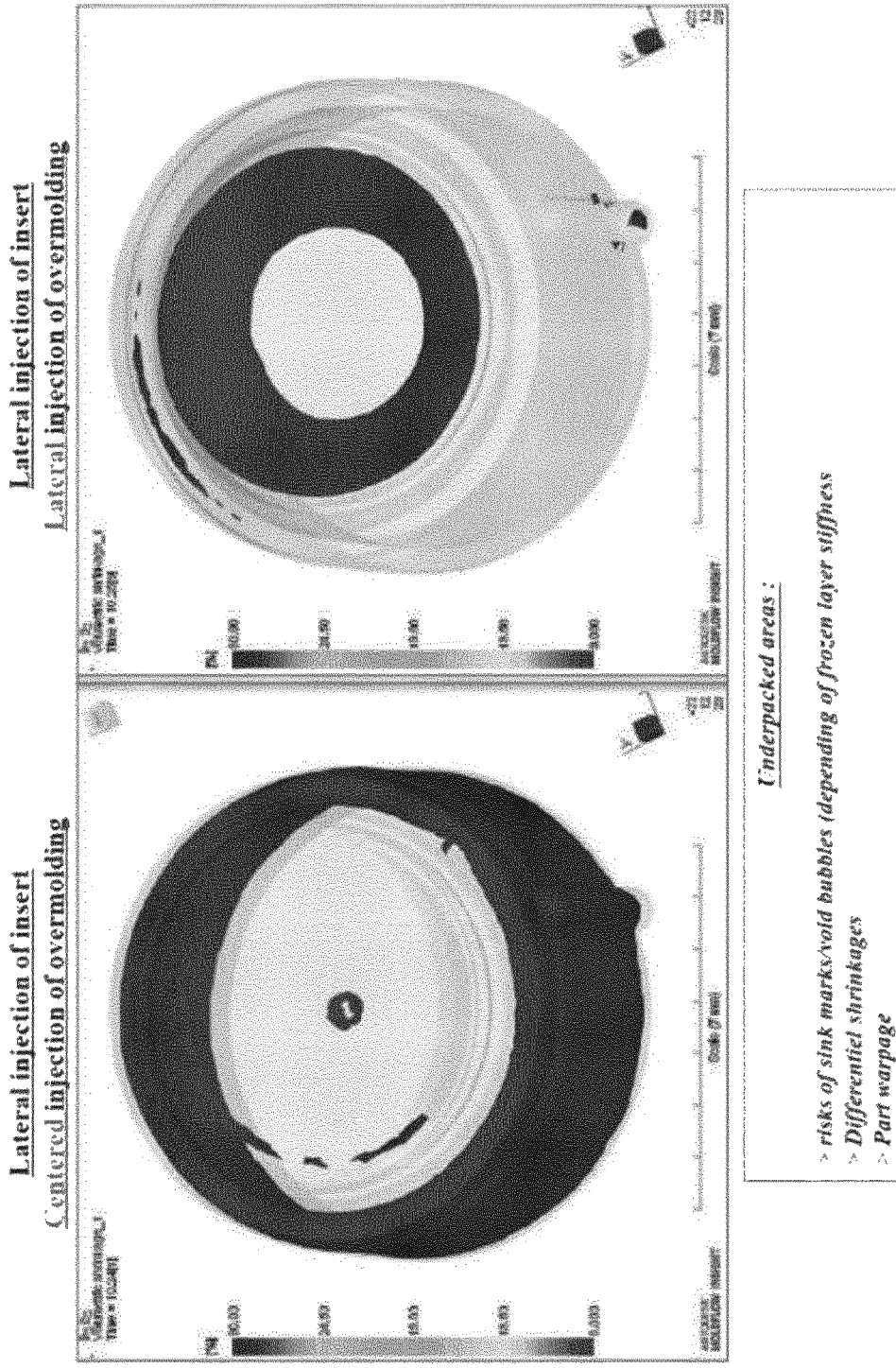
Figure 53:
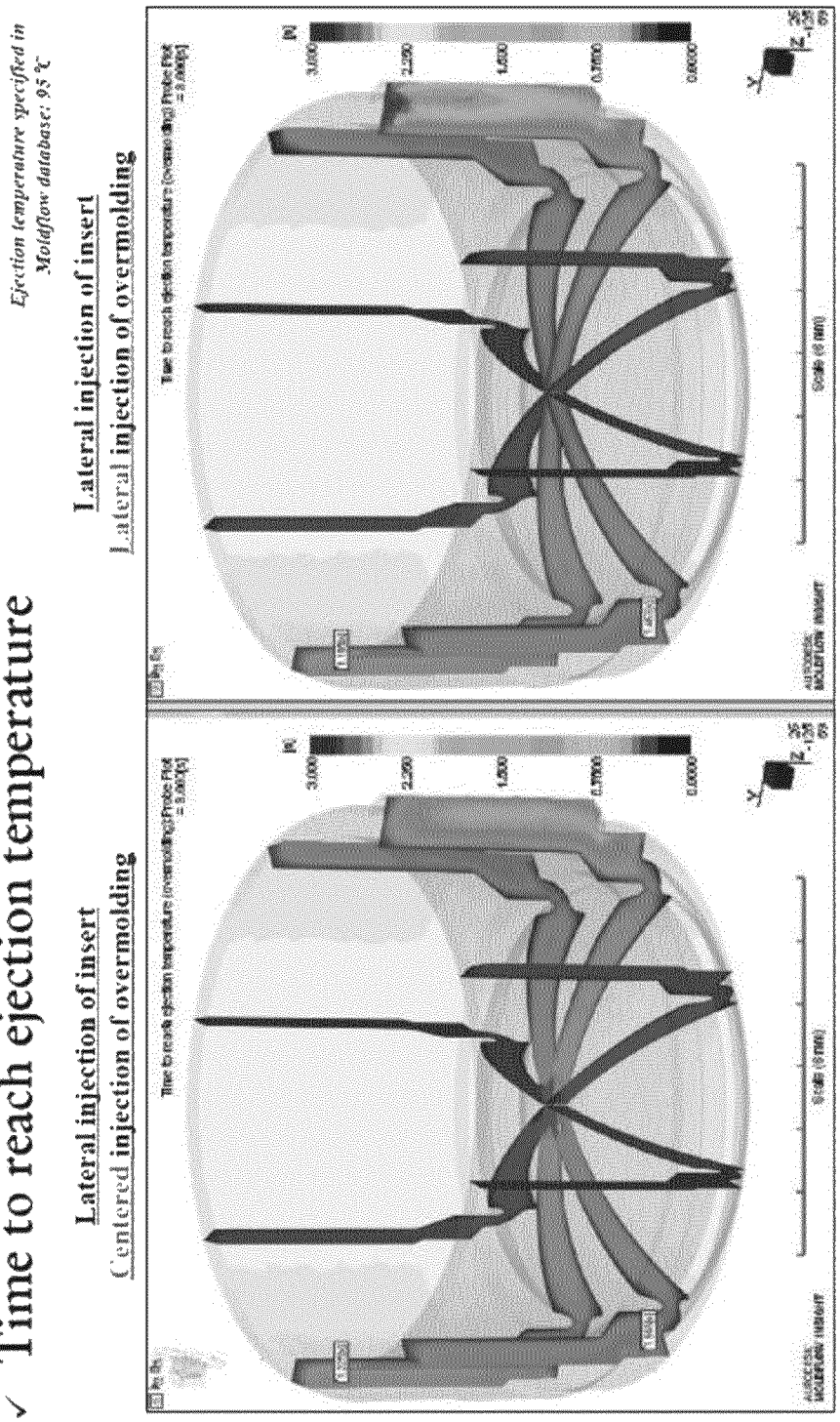
Figure 54:
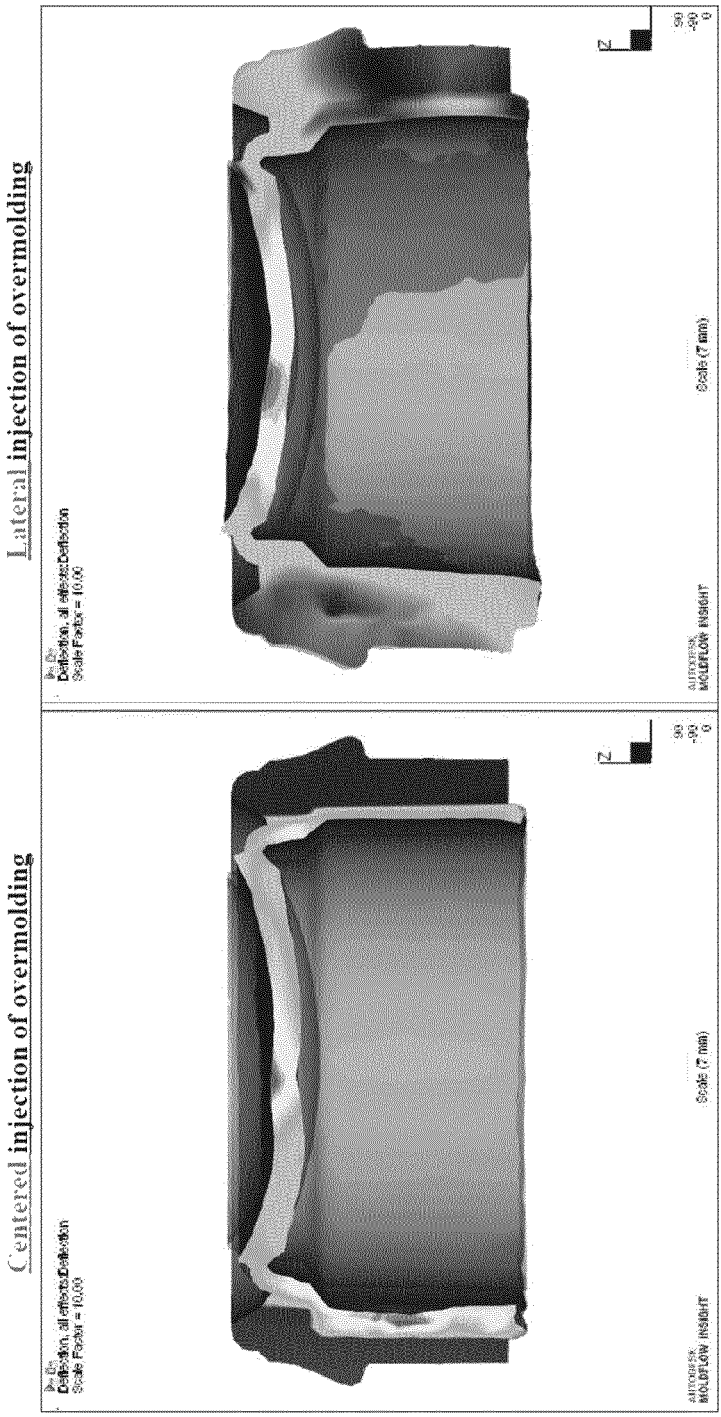
Figure 55:
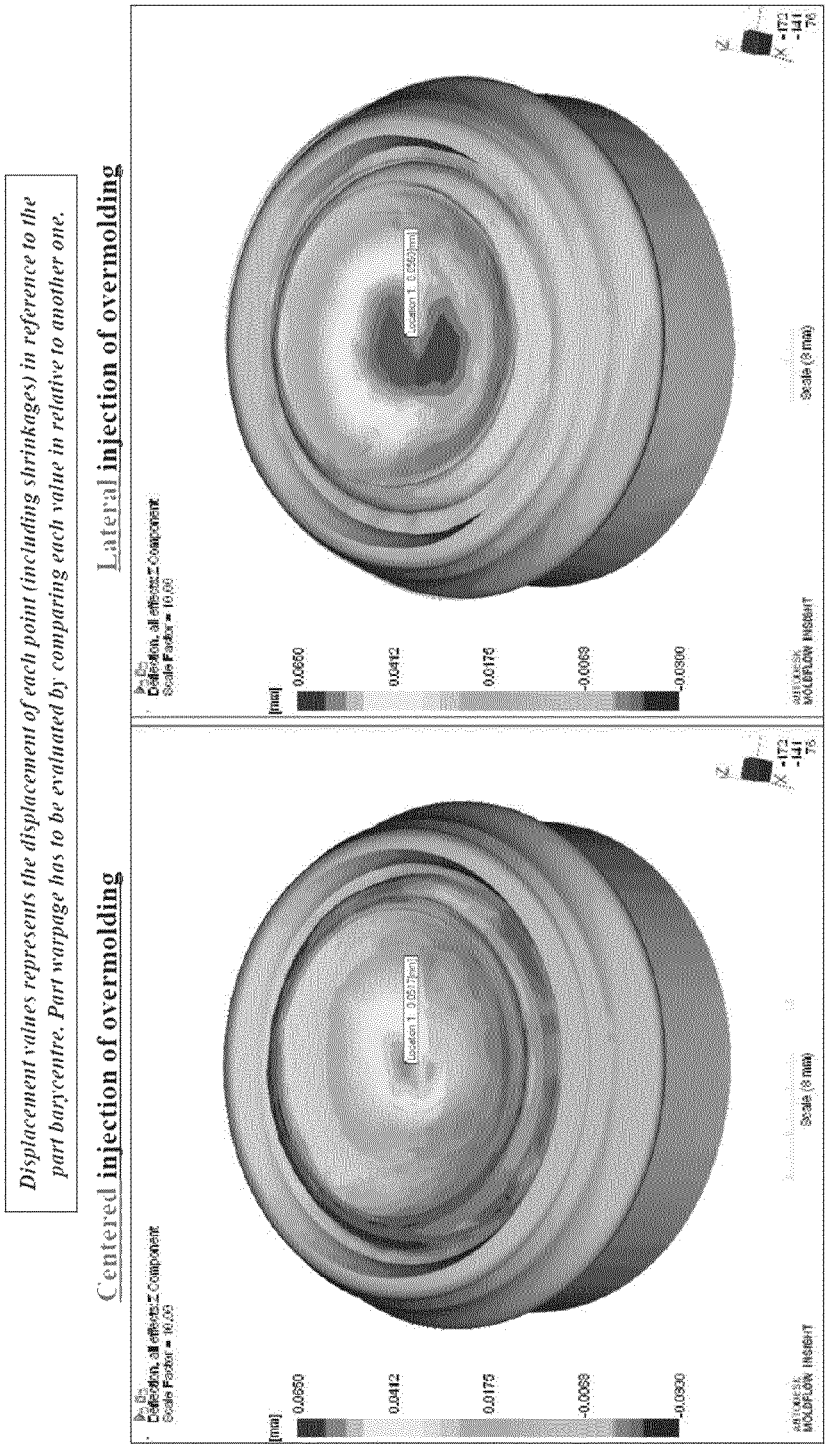
Figure 56:
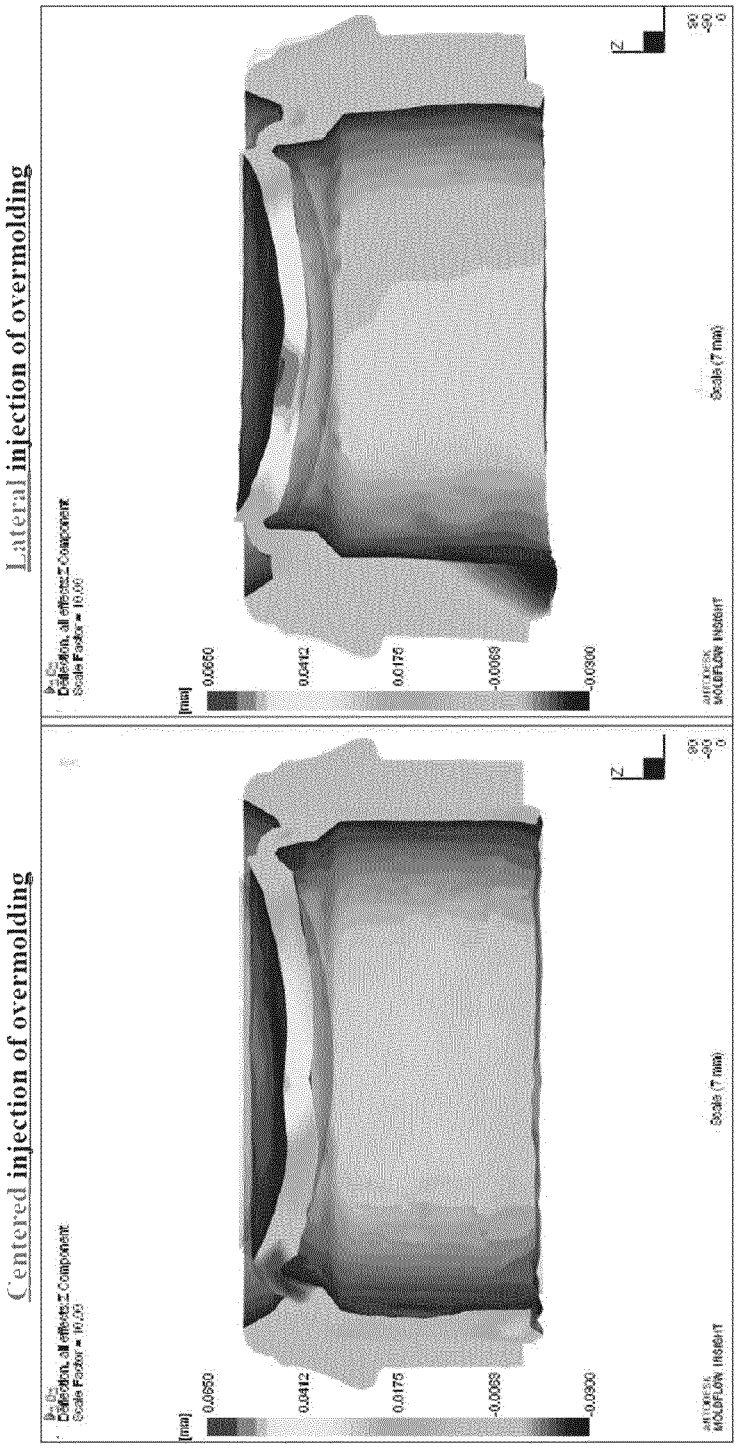
Figure 57:
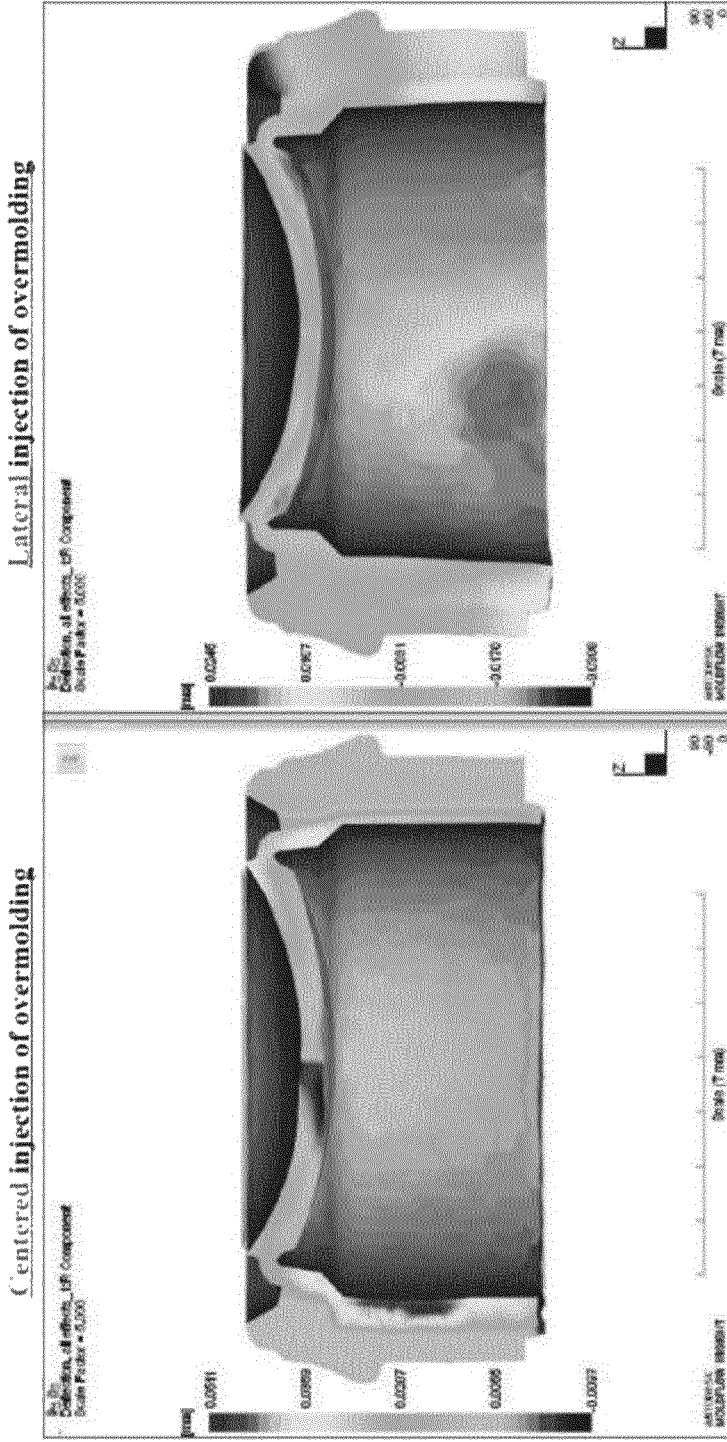
Figure 58:
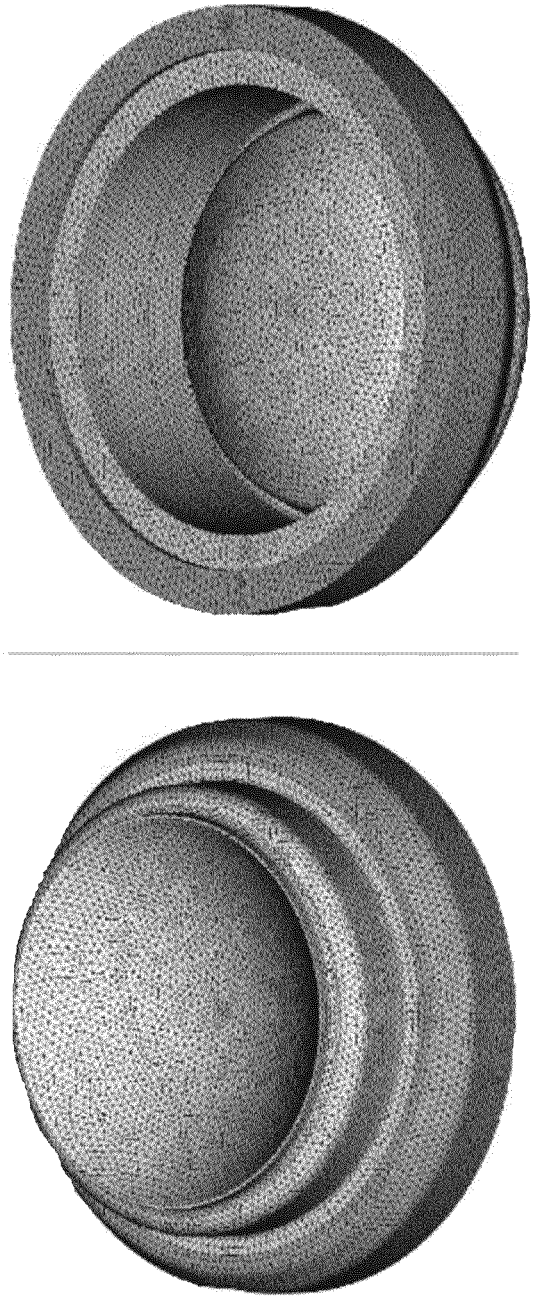
Figure 59:
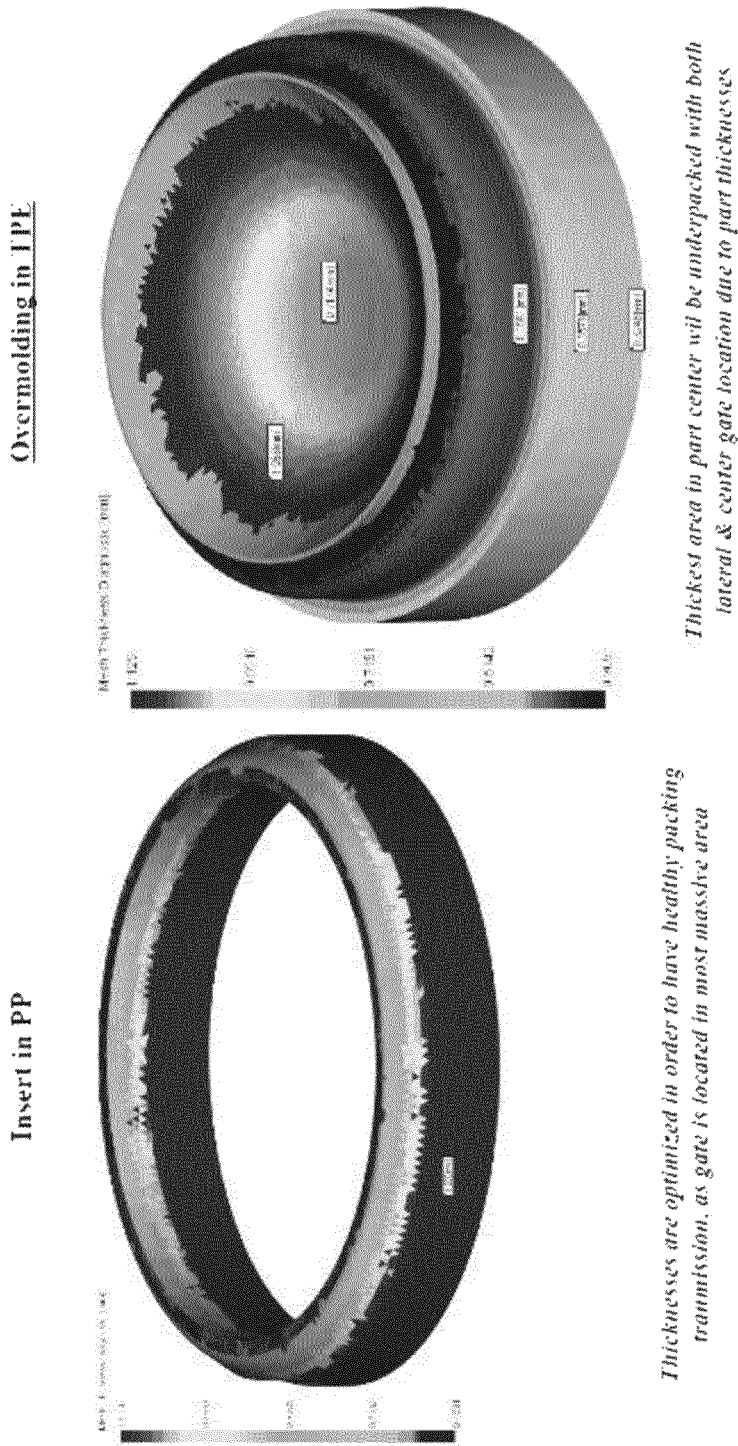
Figure 60:
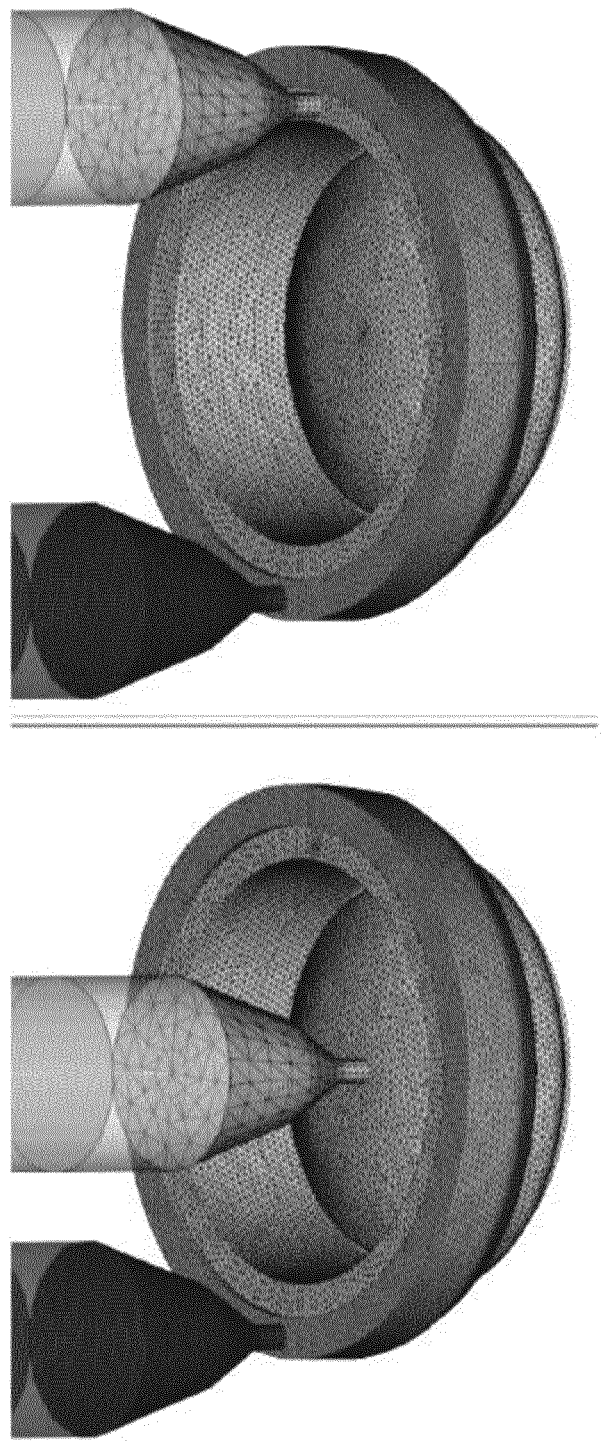
Figure 62:
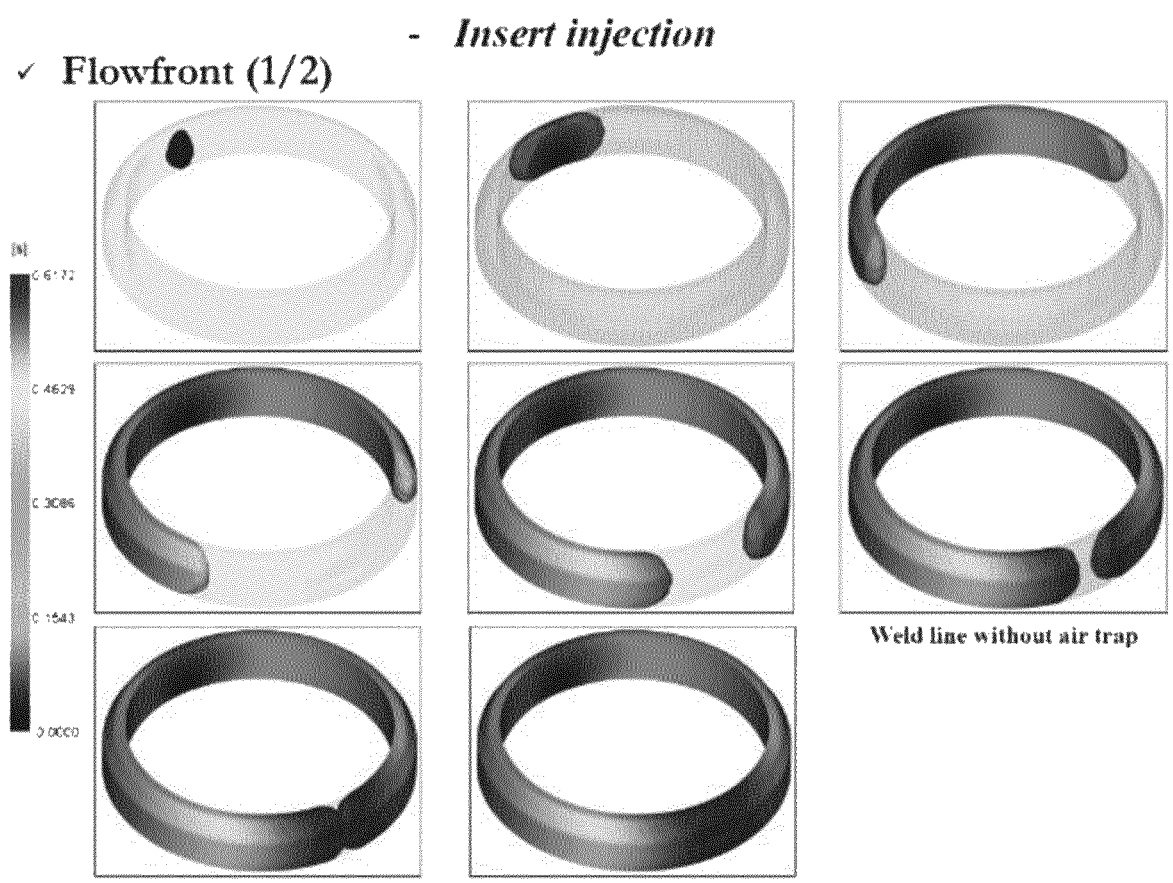
Figure 63:
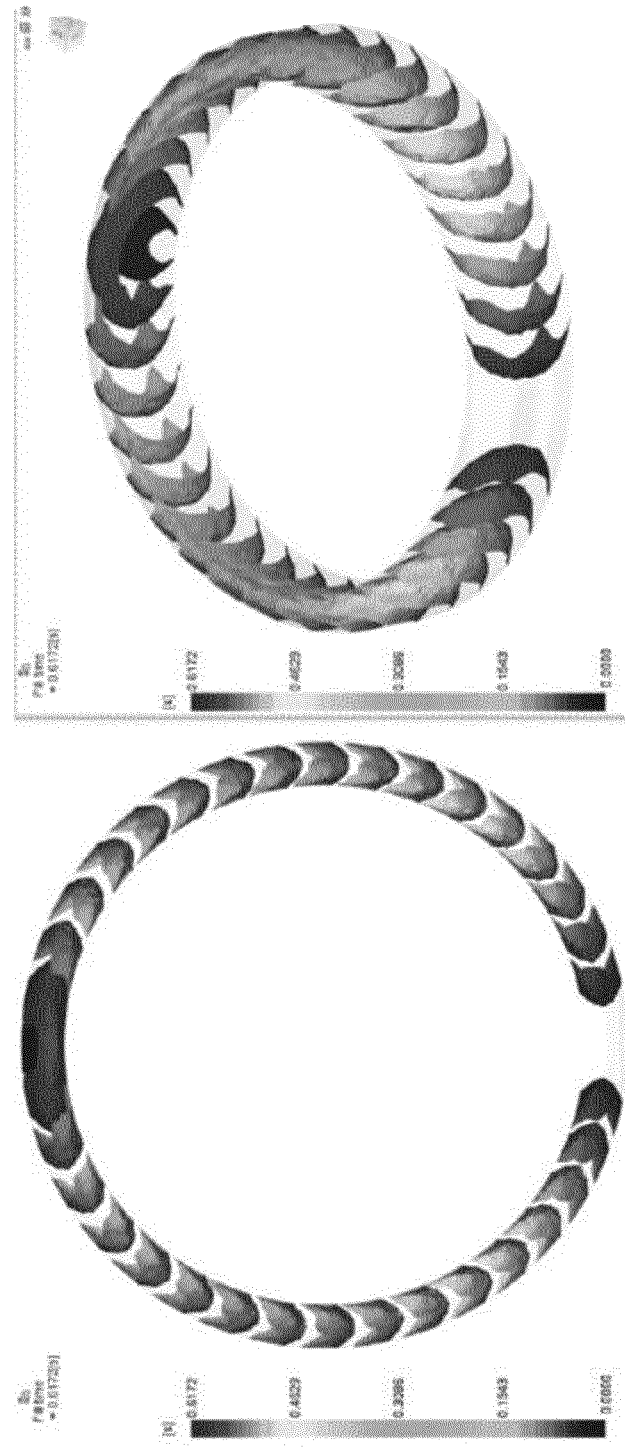
Figure 64:
Figure 65:
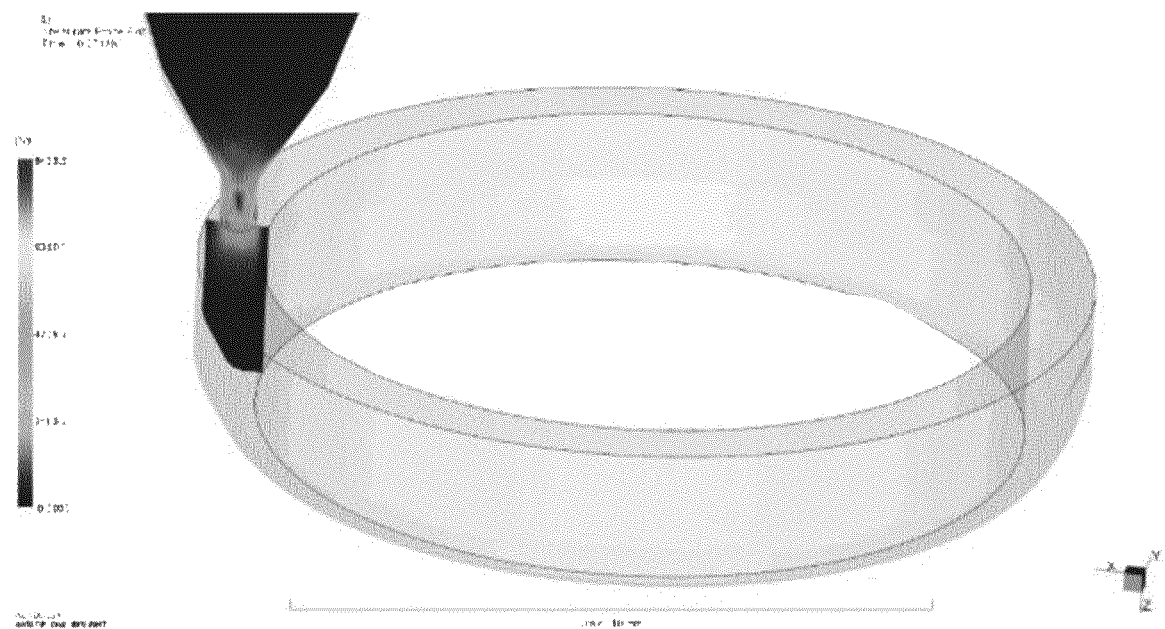
Figure 66:
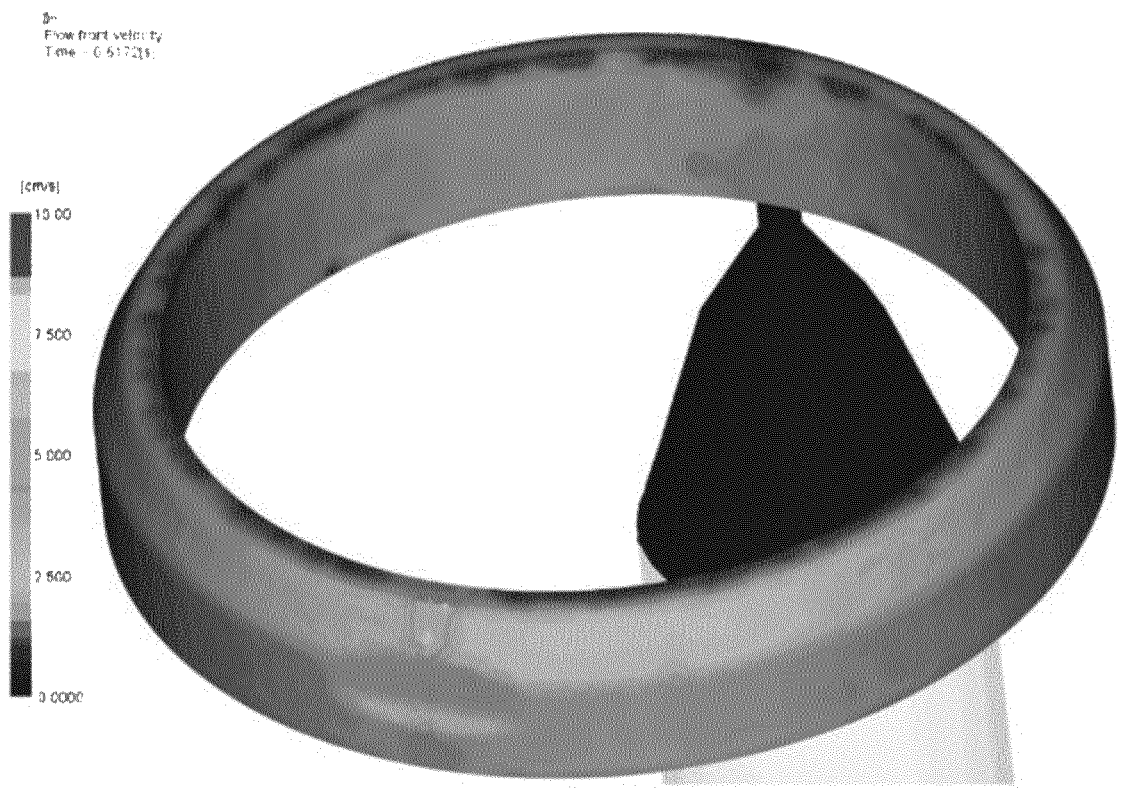
Figure 67:
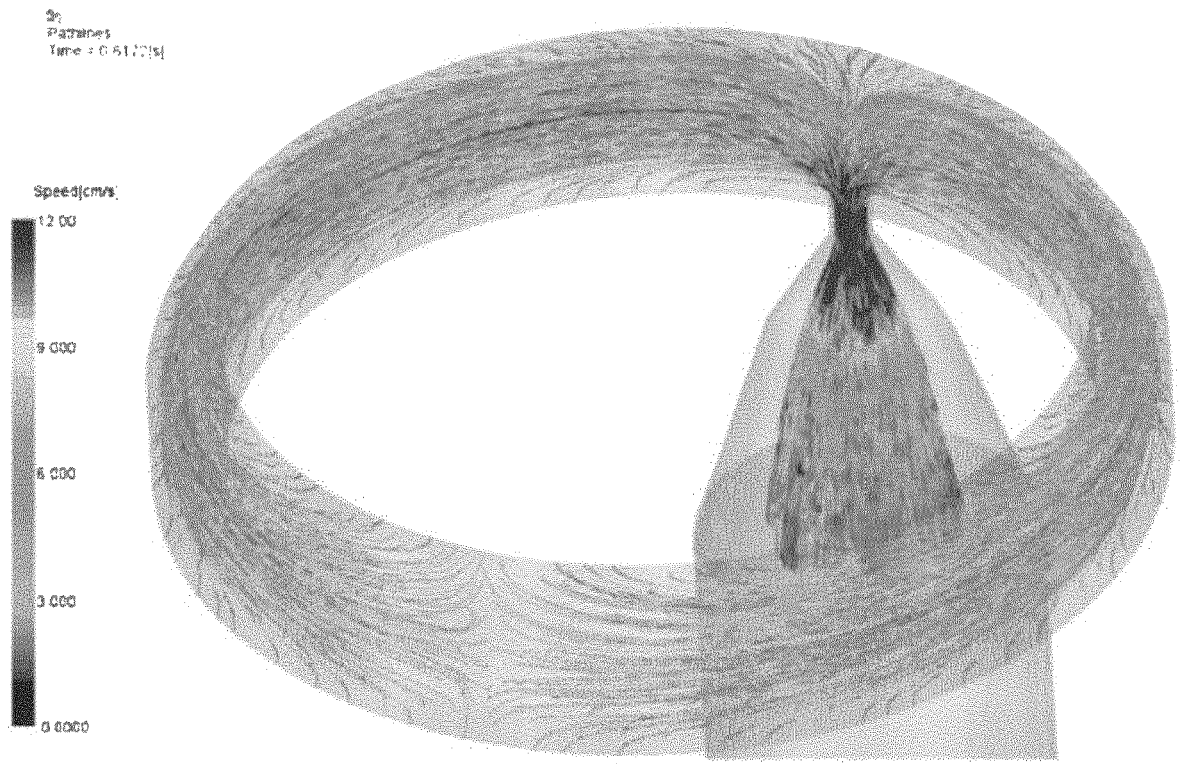
Figure 68:
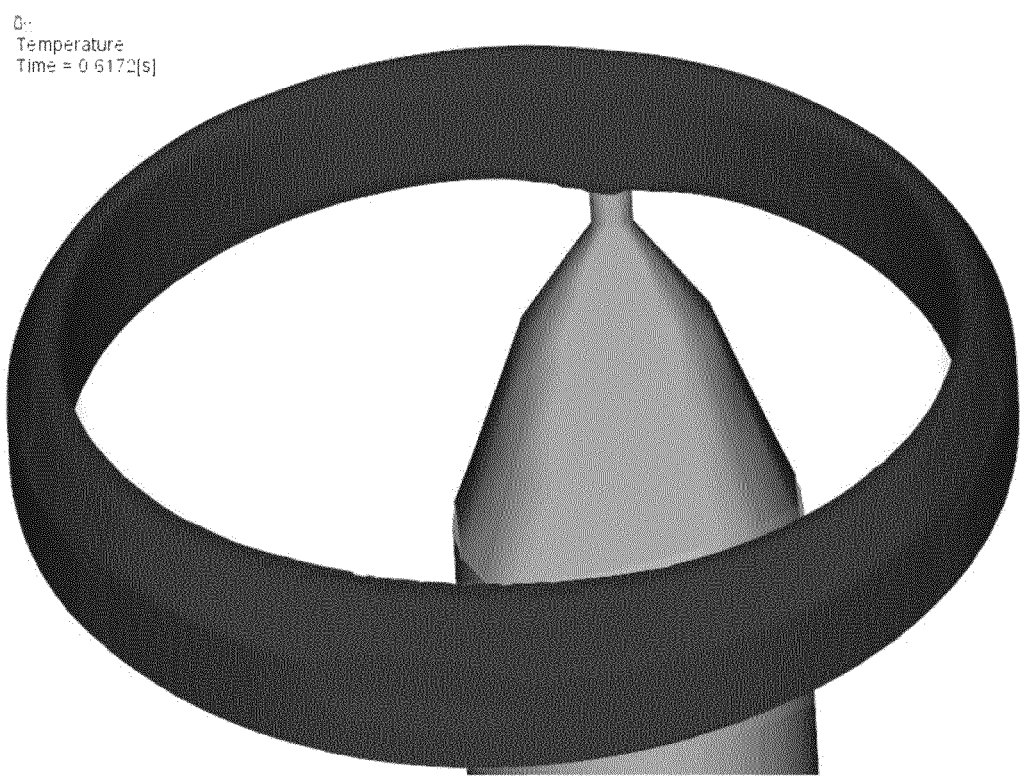
Figure 69:
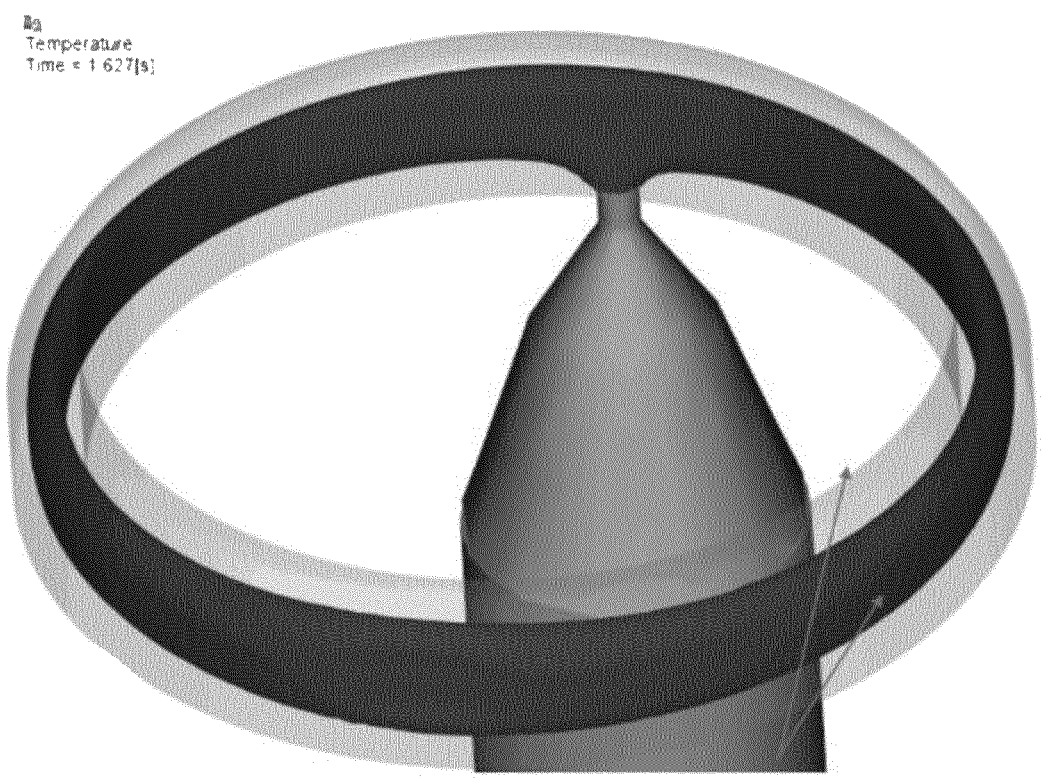
Figure 70:
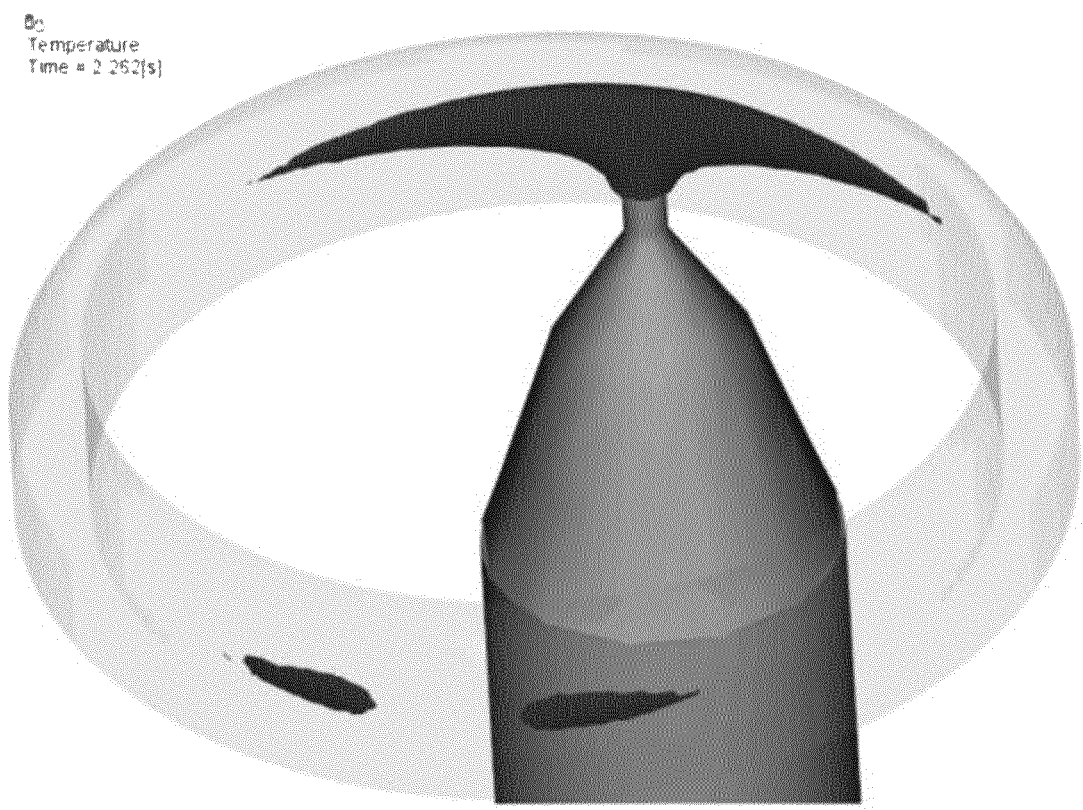
Figure 71:
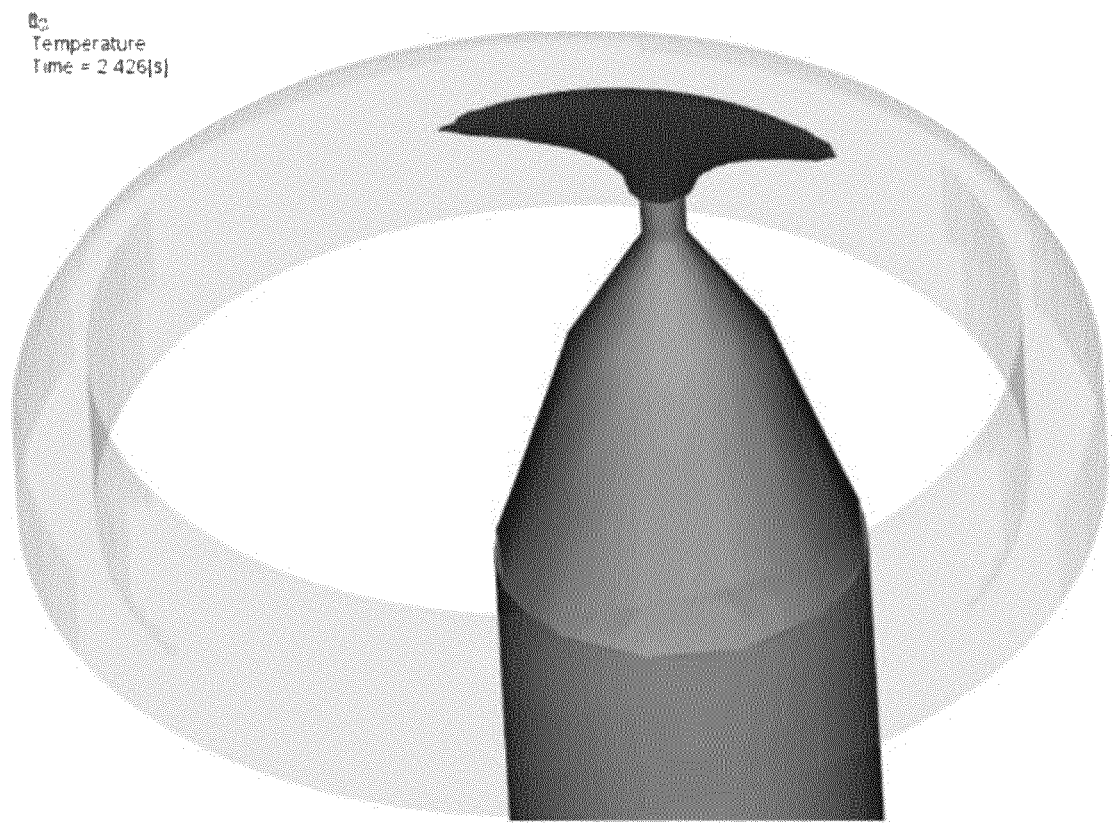
Figure 72:
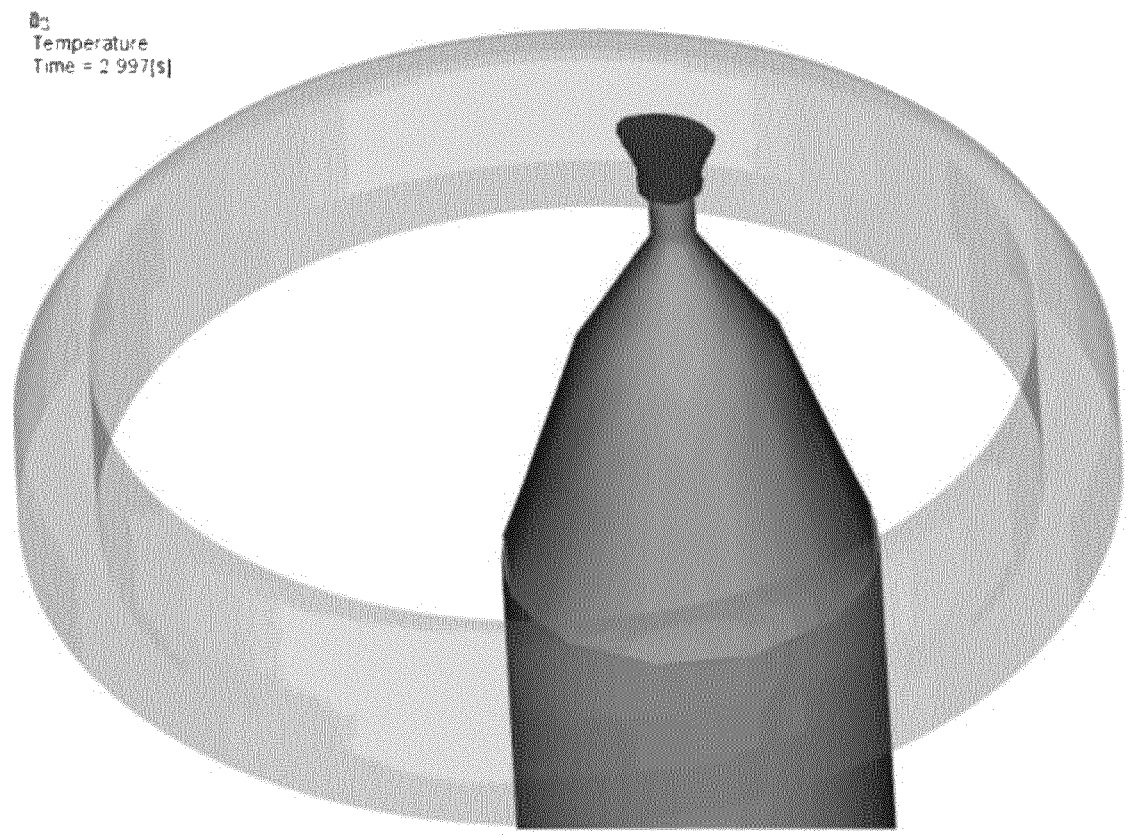
Figure 73:
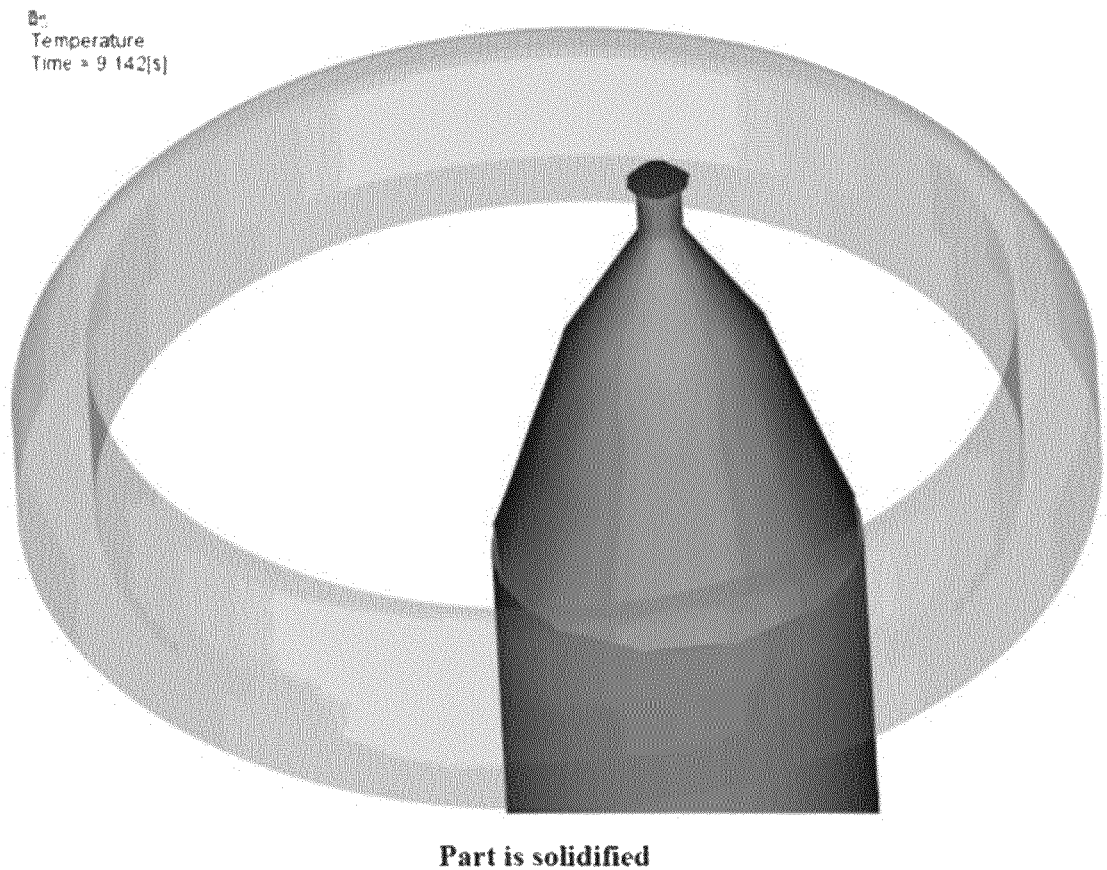
Figure 74:
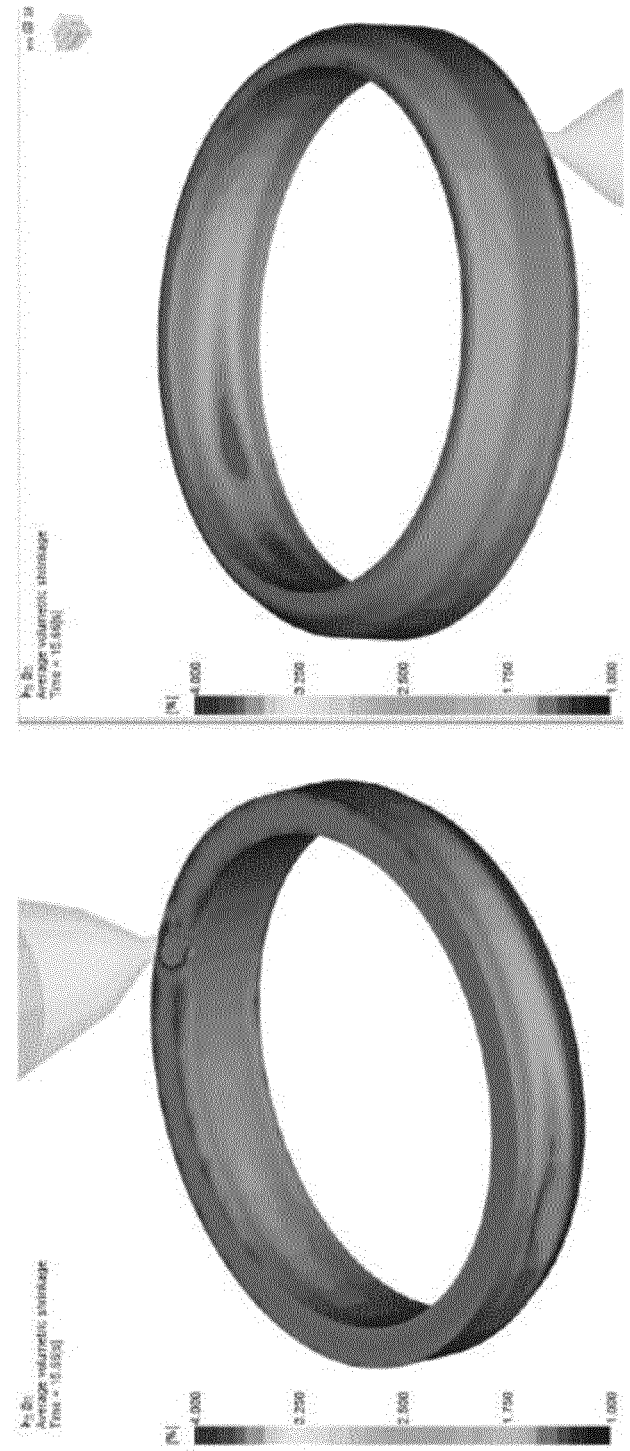
Figure 75:
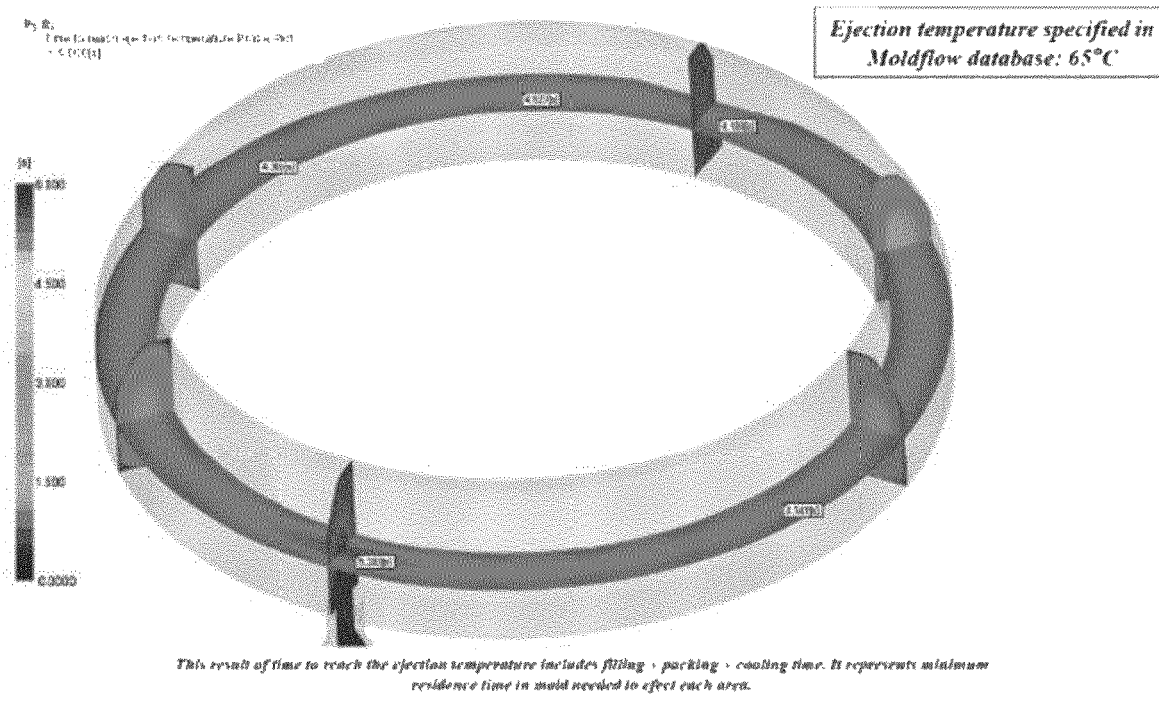
Figure 76:
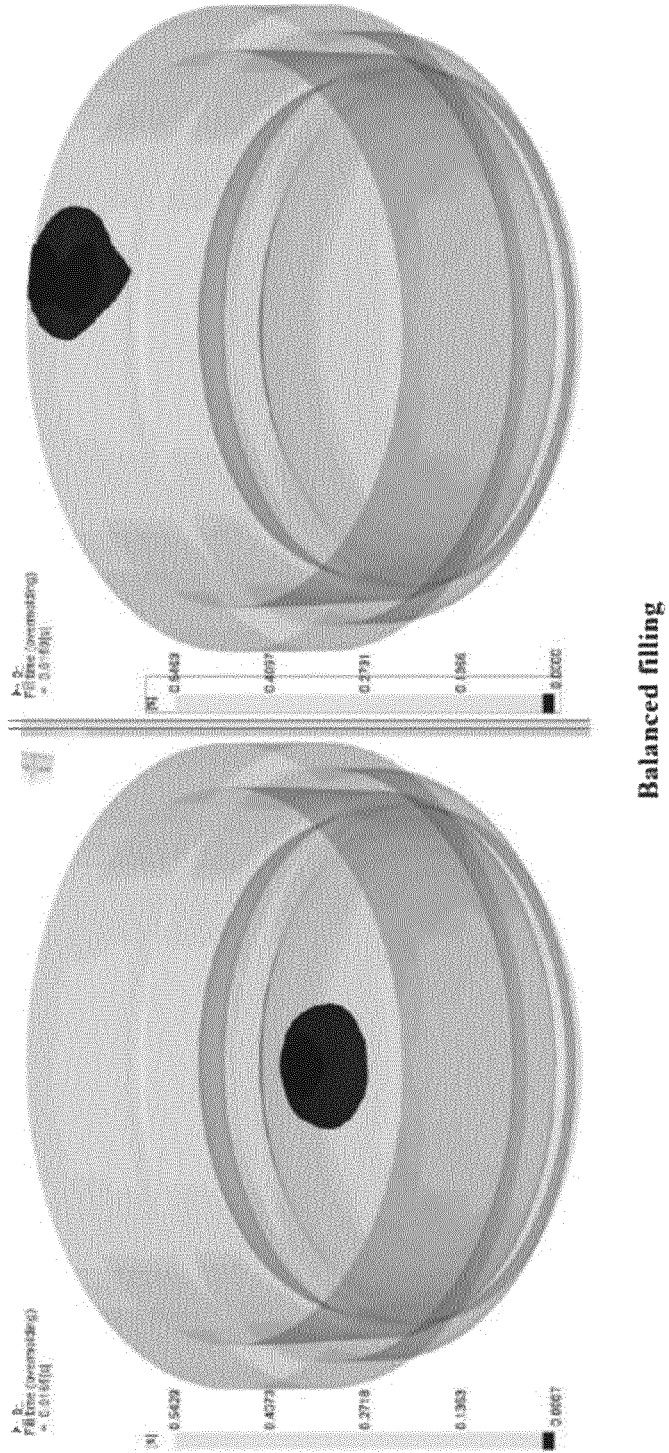
Figure 77:
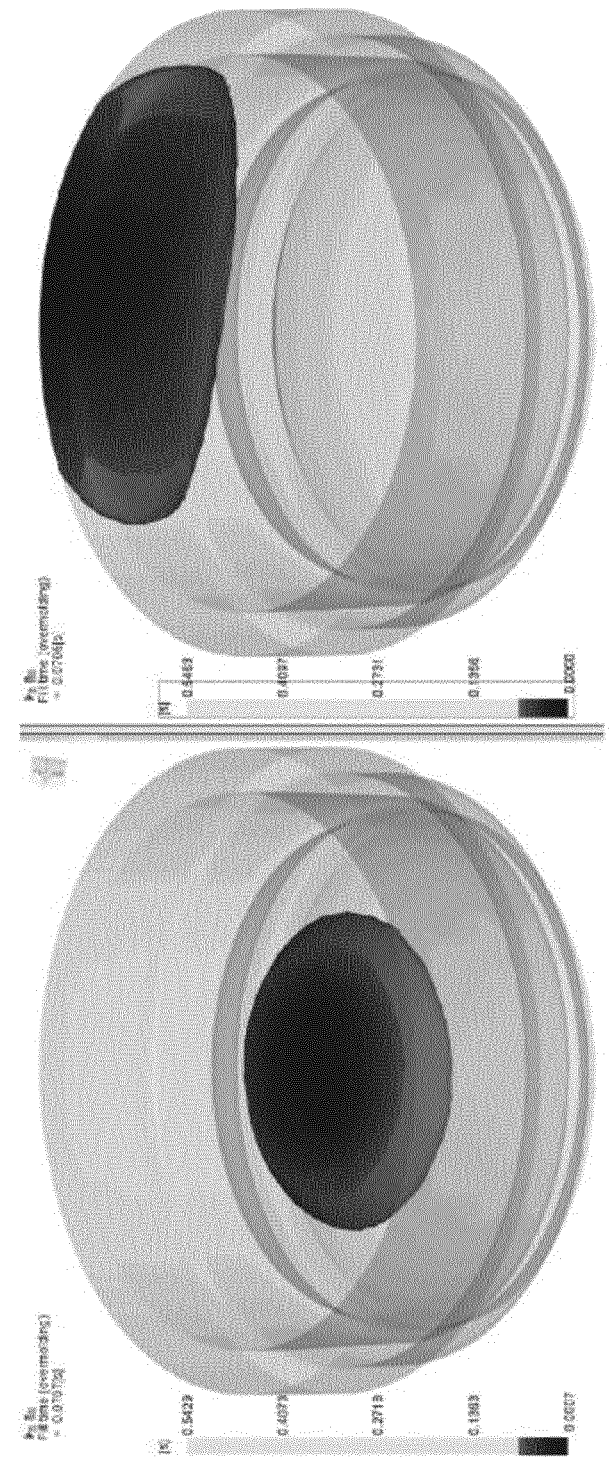
Figure 78:
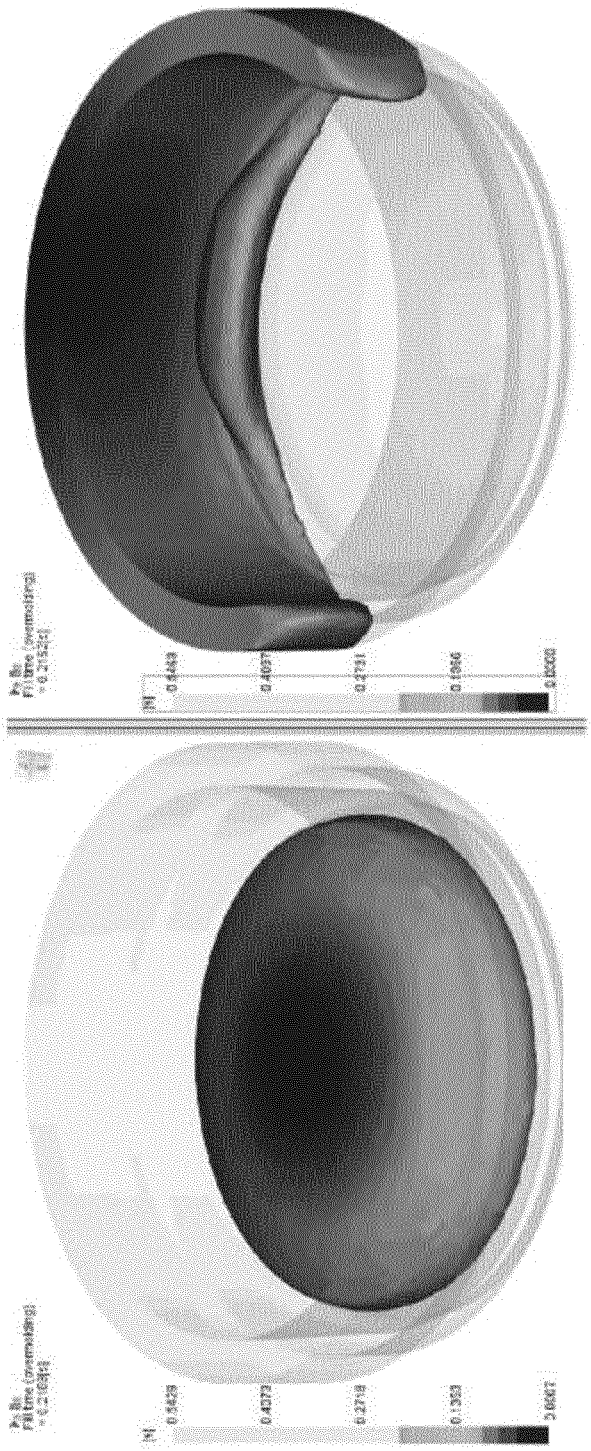
Figure 79:
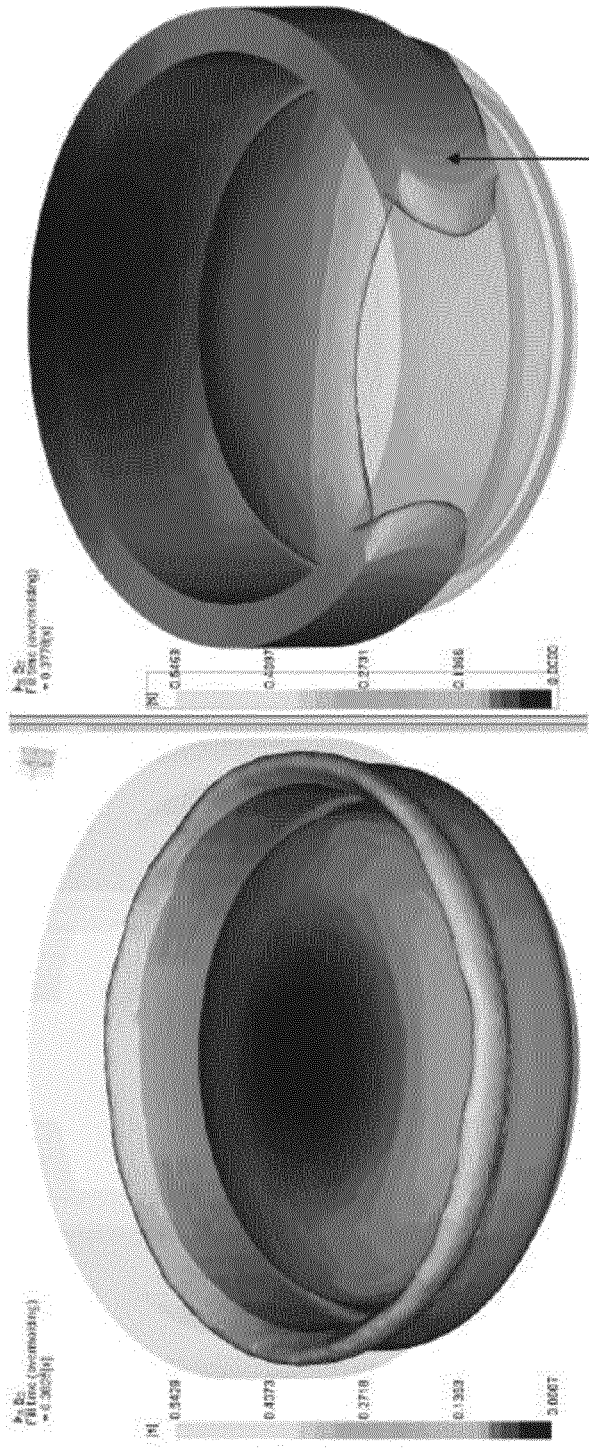
Figure 80:
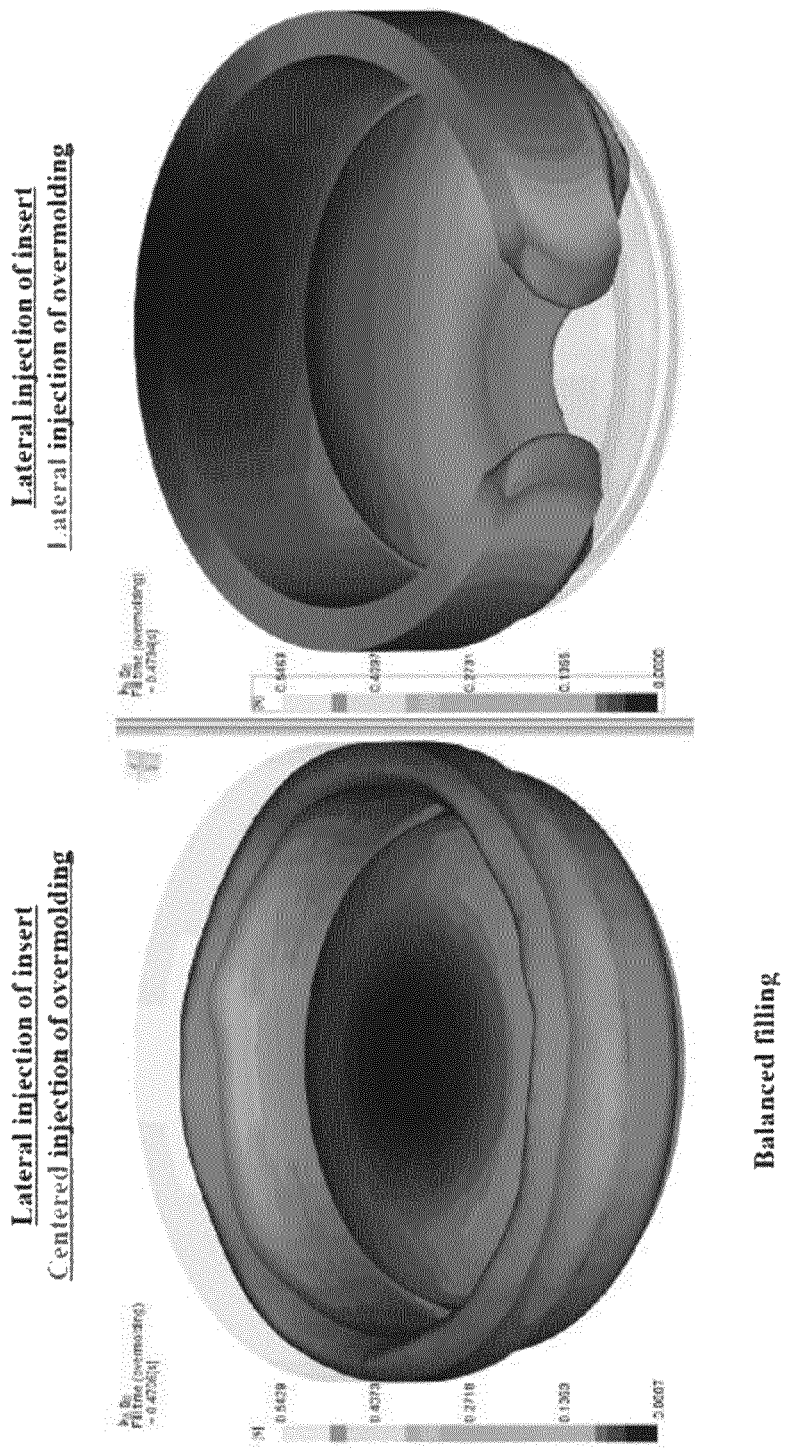
Figure 8I:
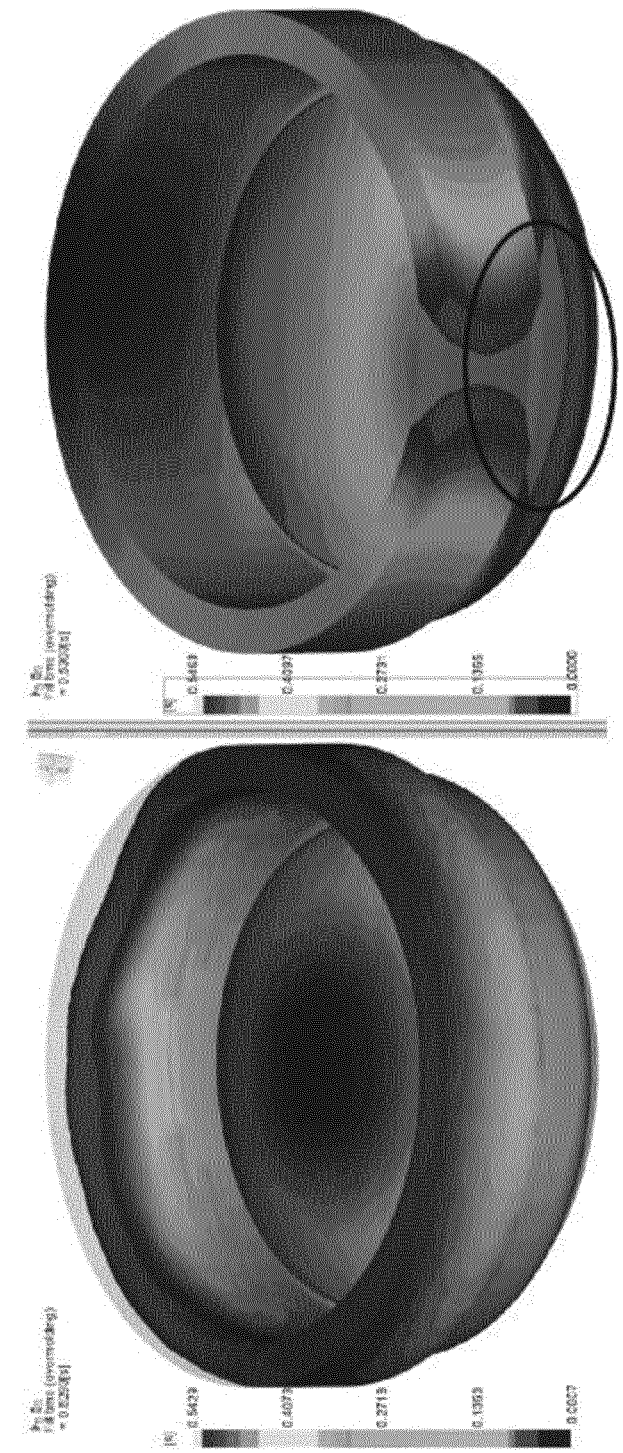
Figure 82:
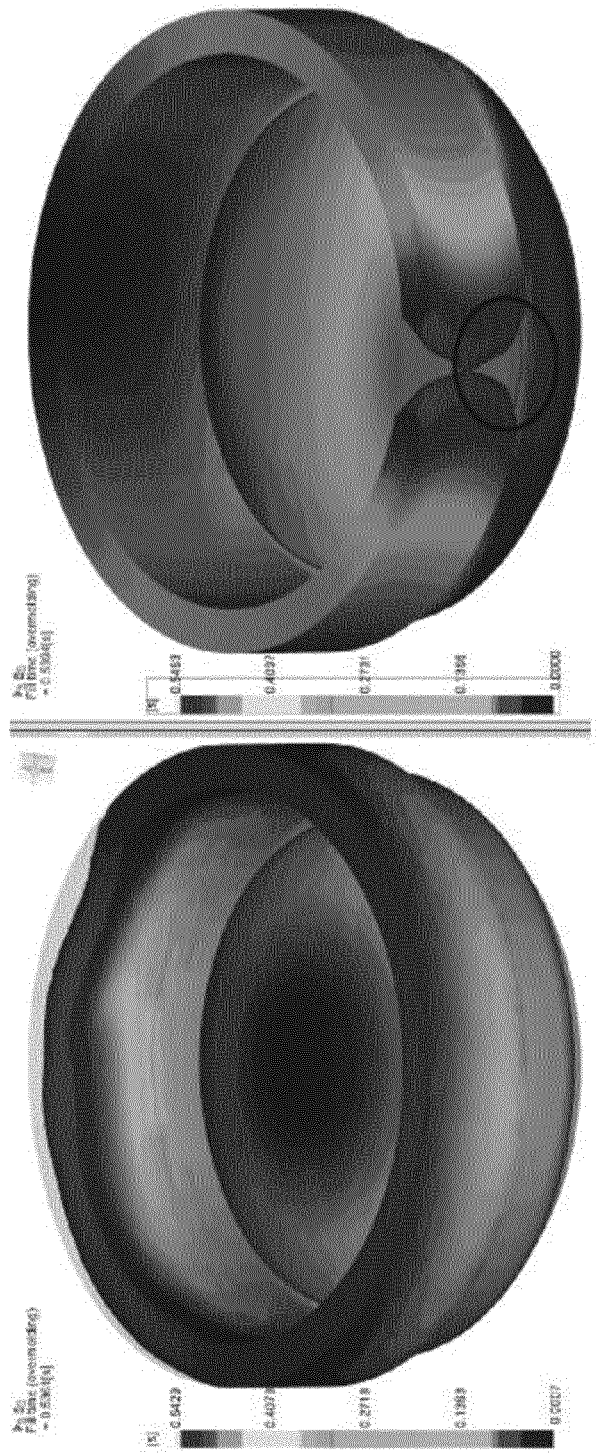
Figure 84:
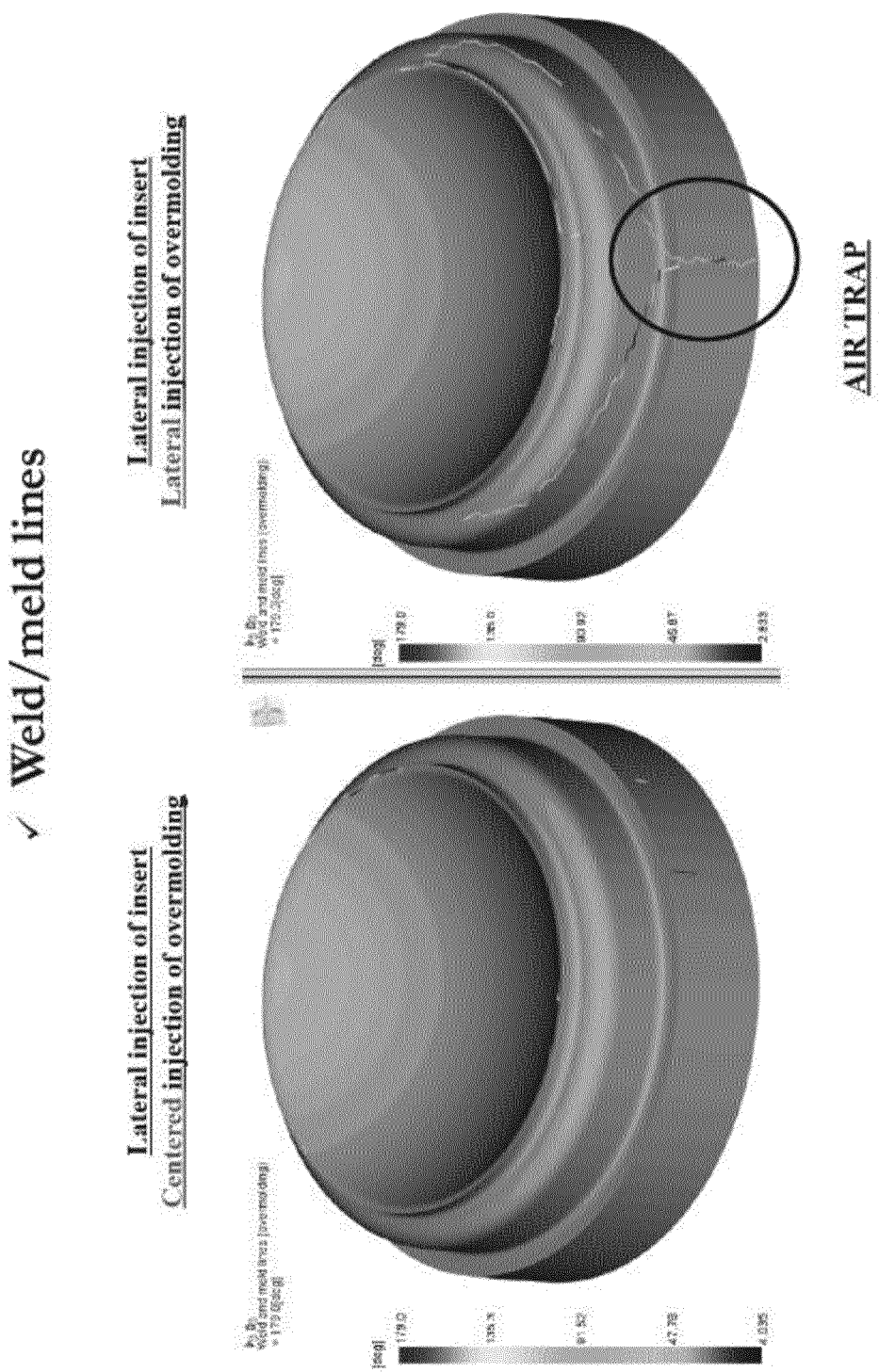
Figure 85:
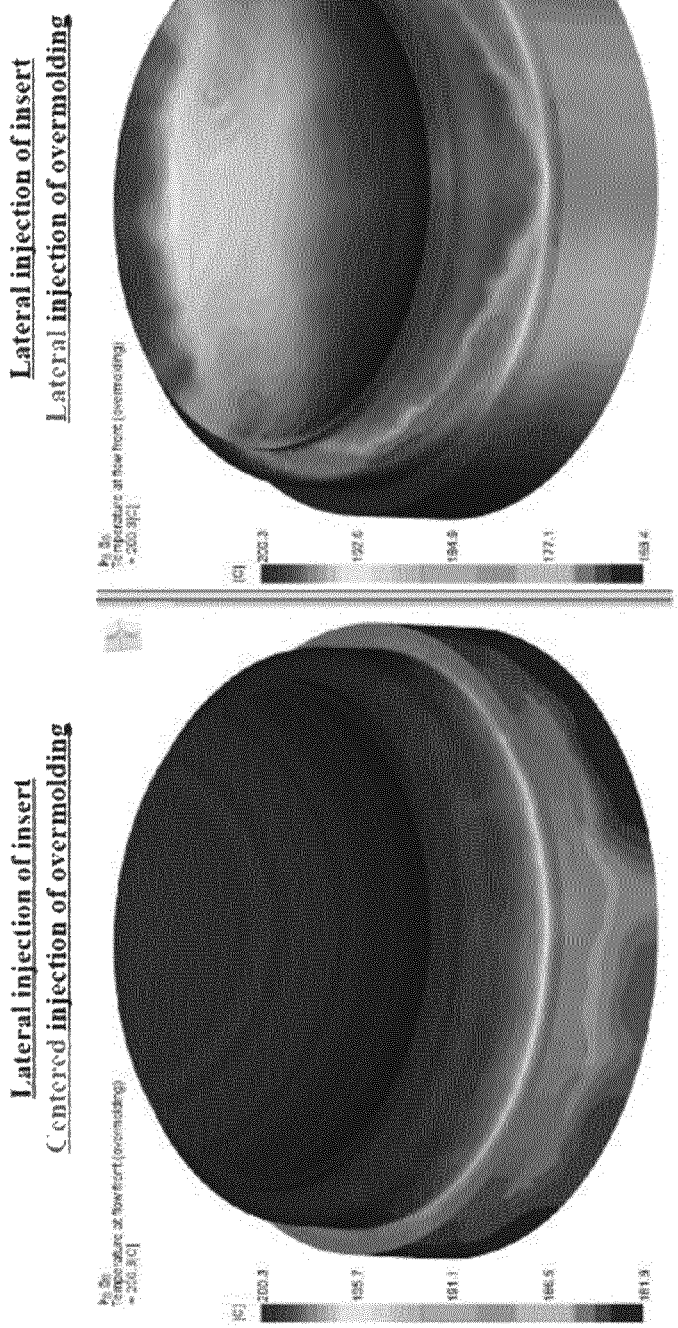
Figure 86:
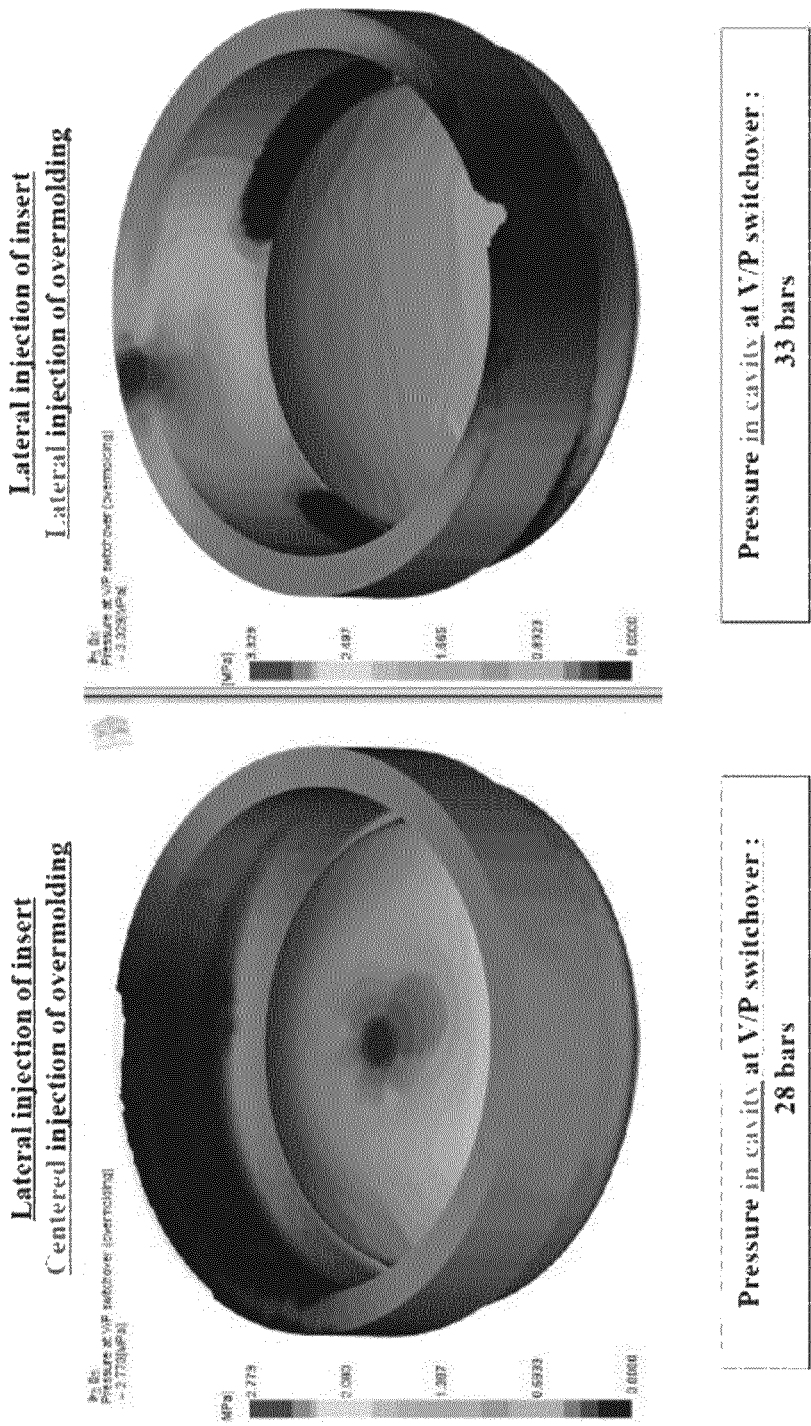
Figure 87:
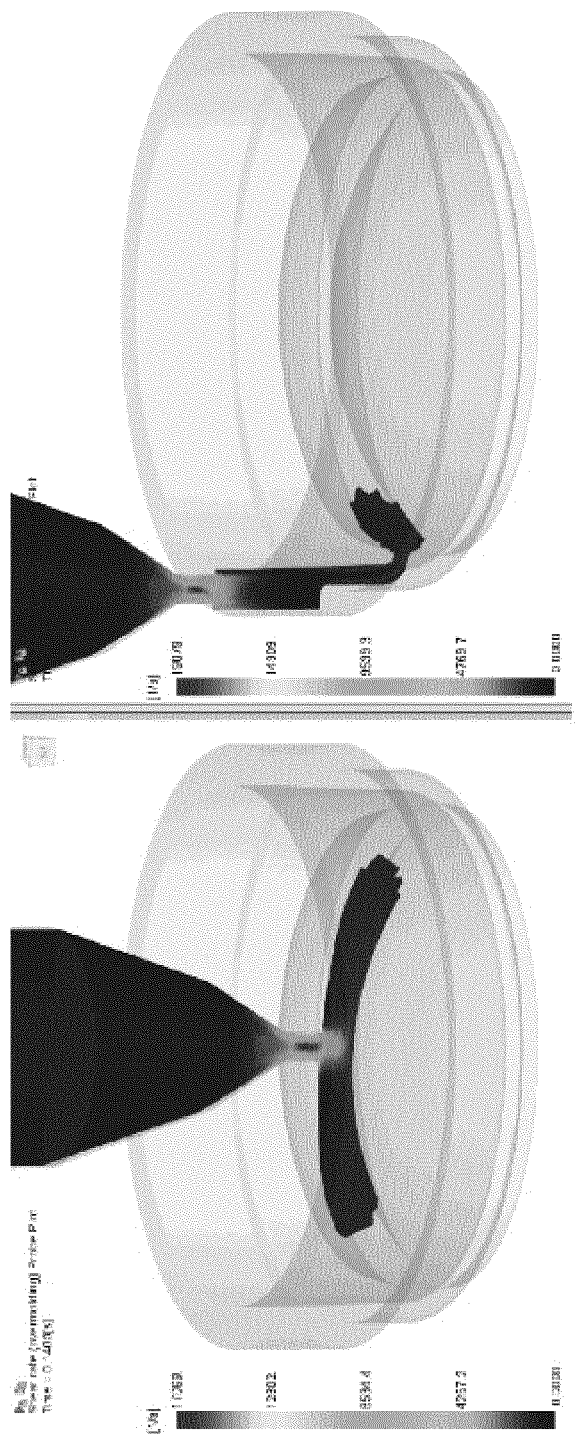
Figure 88:
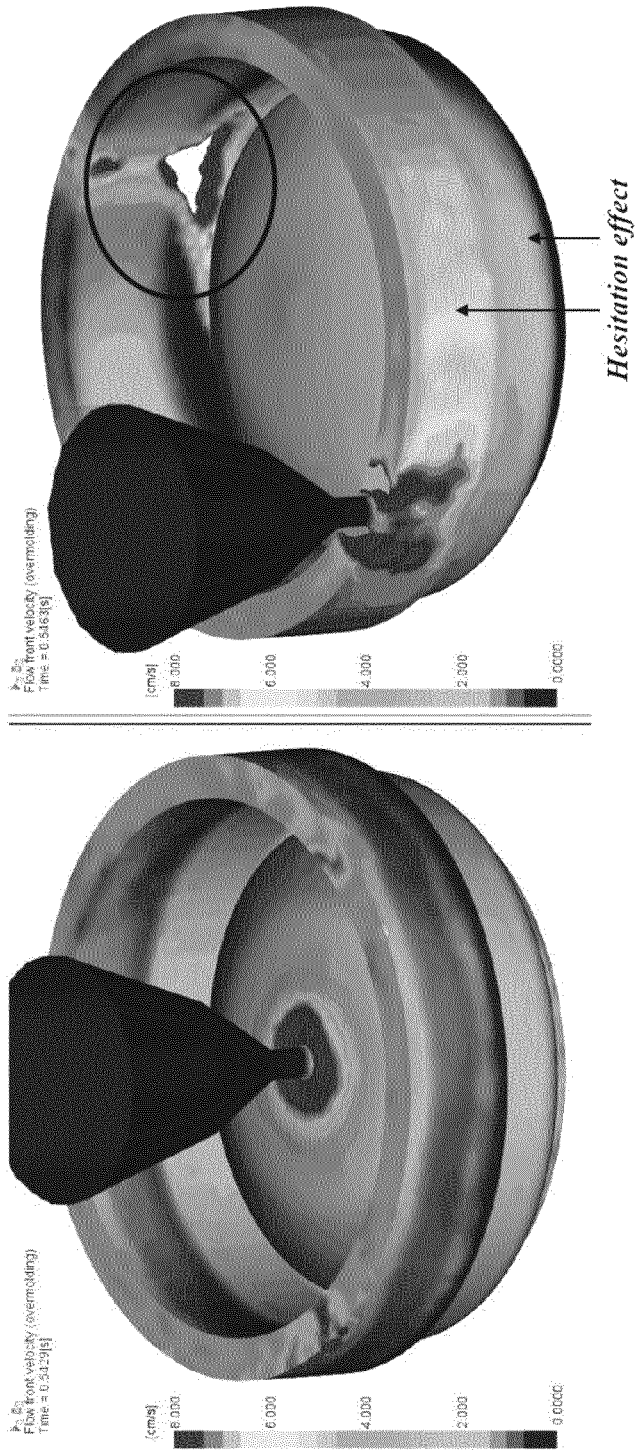
Figure 89:
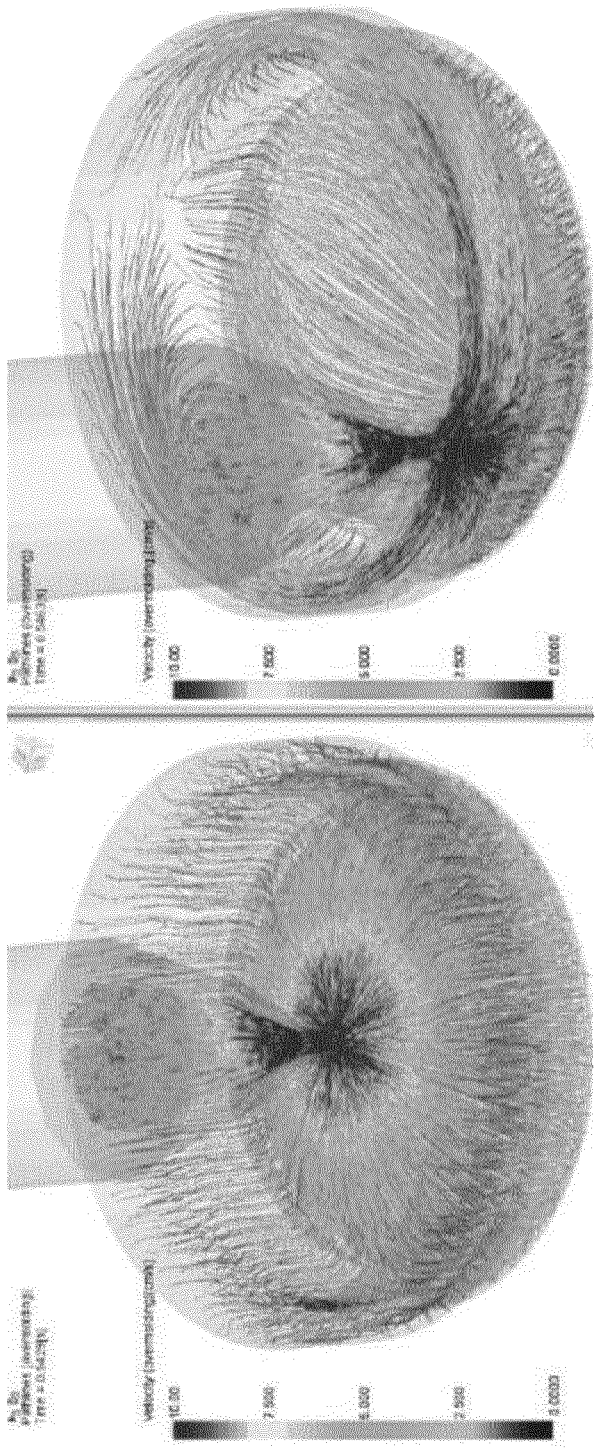
Figure 90:
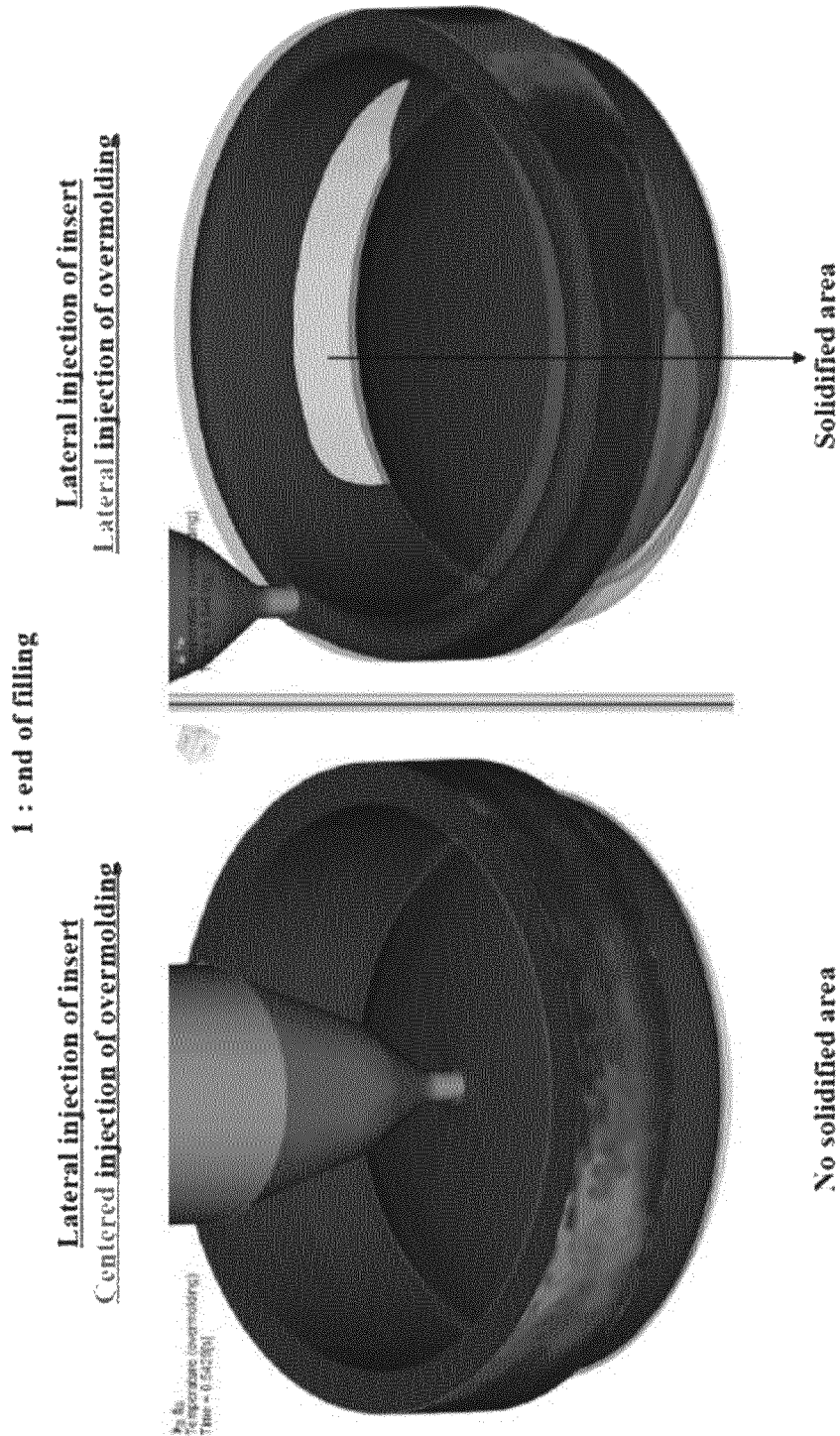
Figure 91:
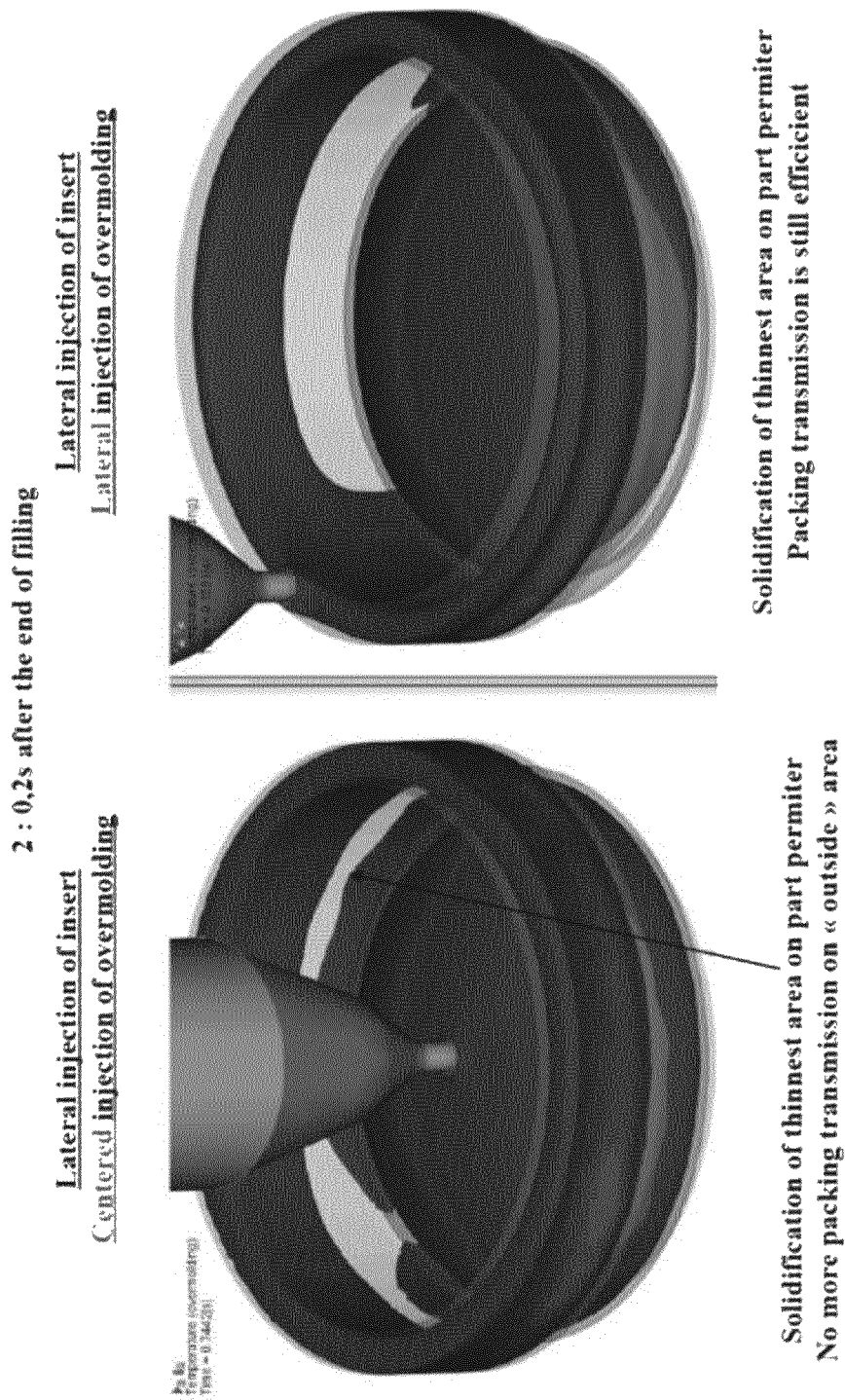
Figure 93:
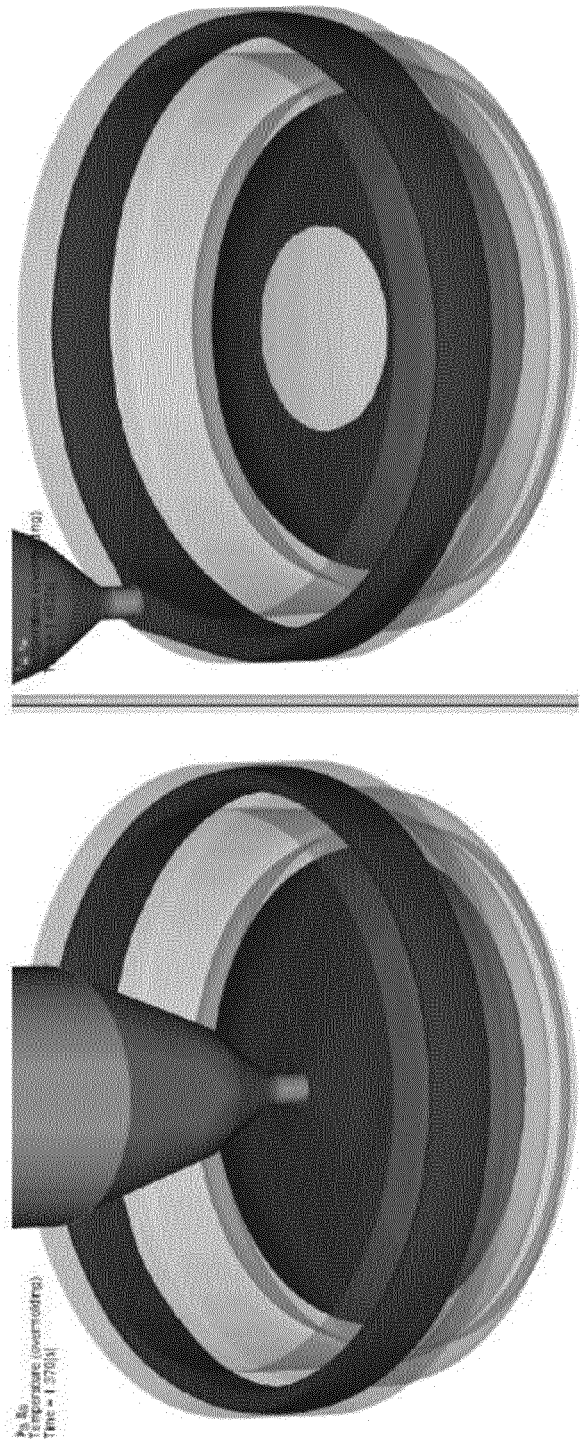
Figure 94:
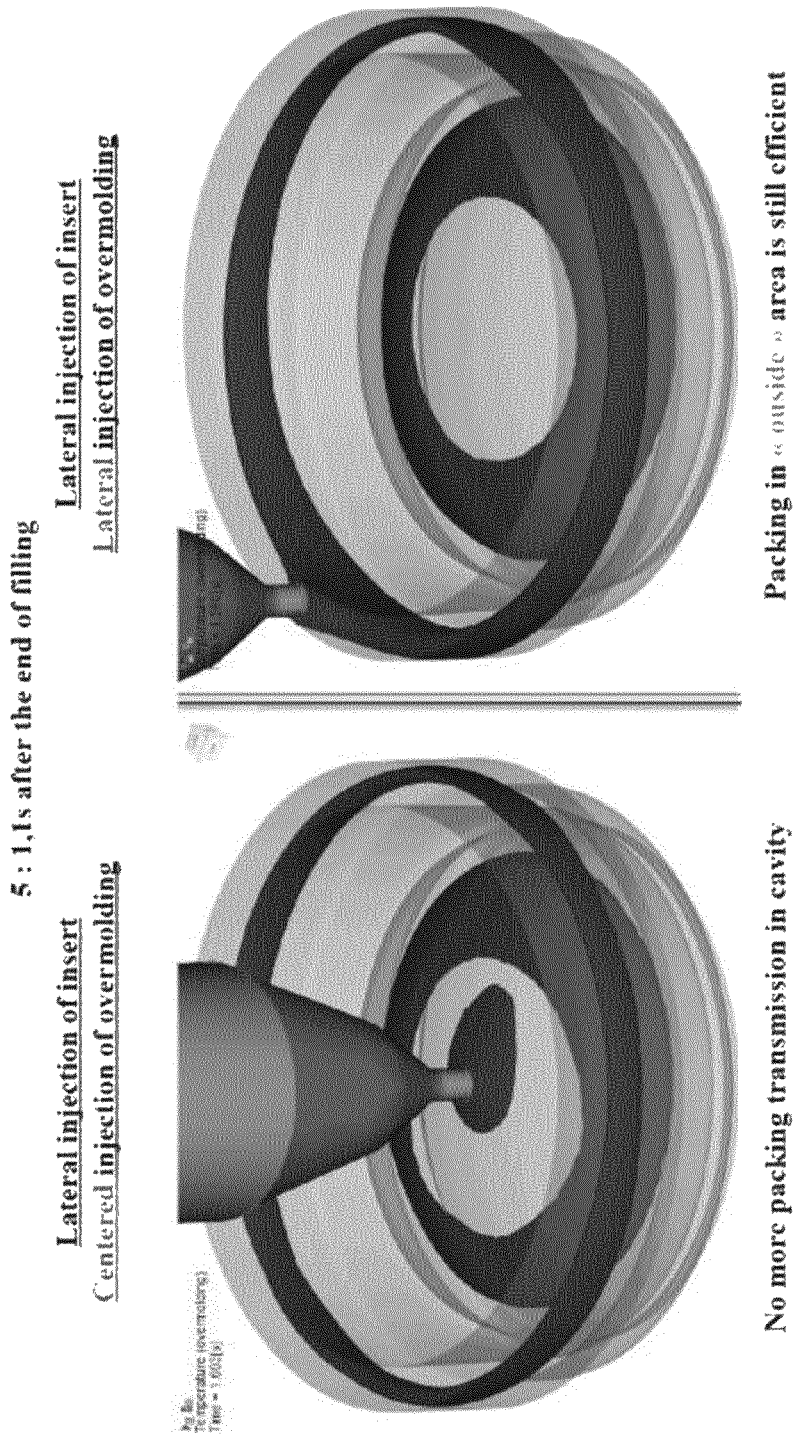
Figure 95:
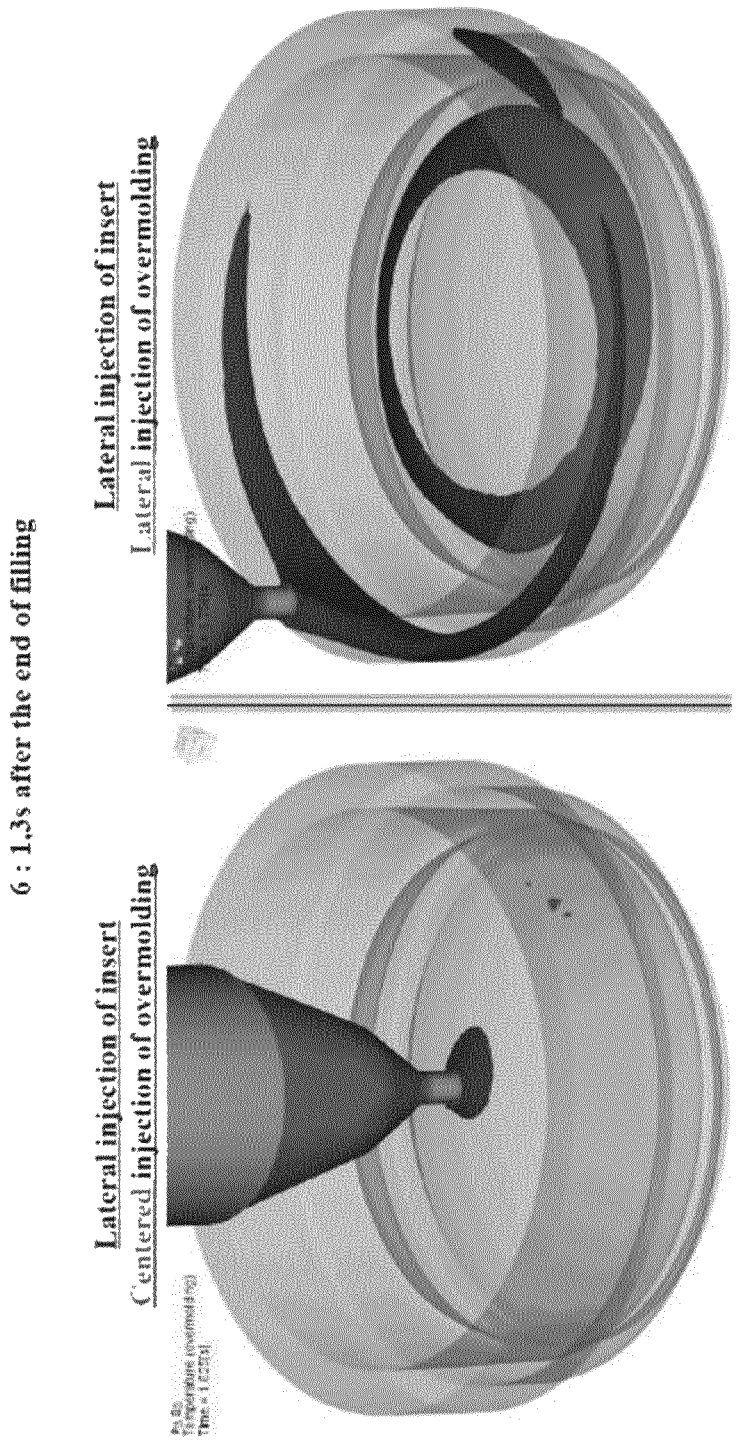
Figure 96:
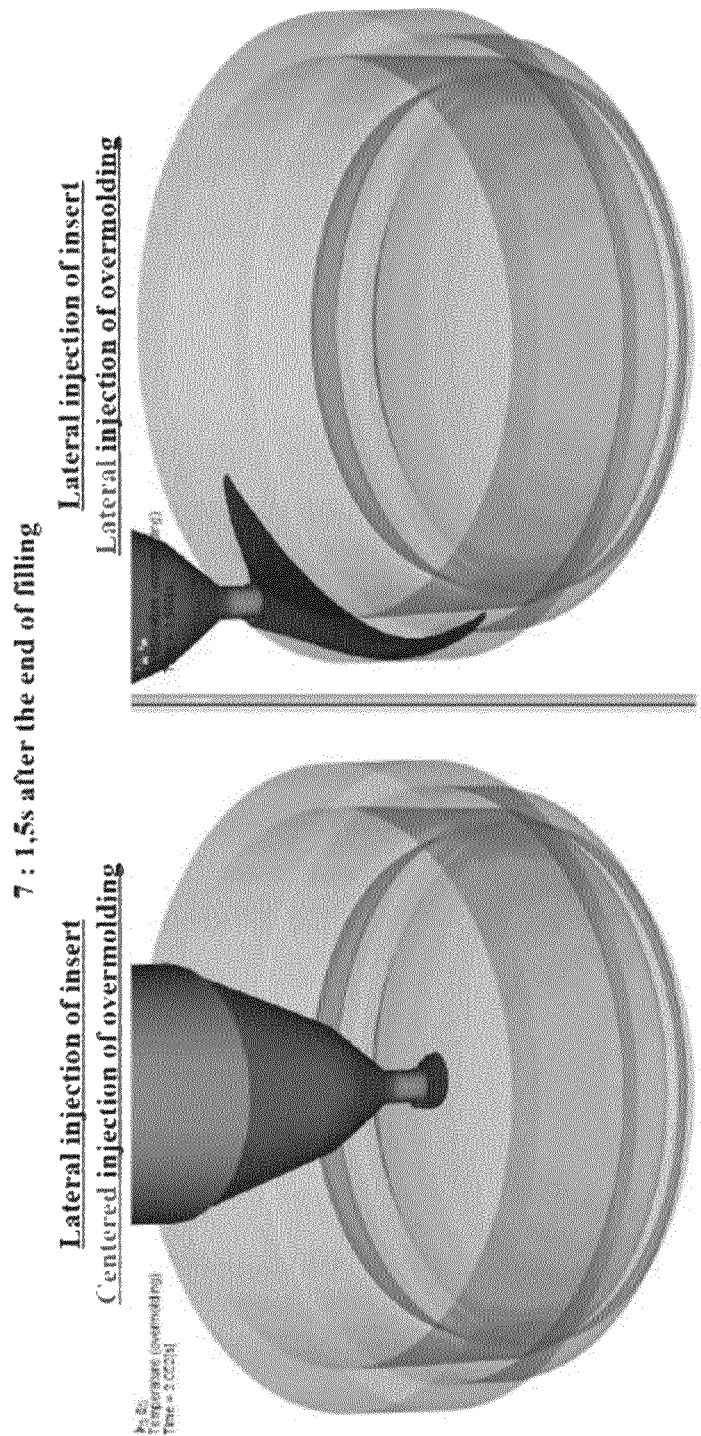
Figure 97:
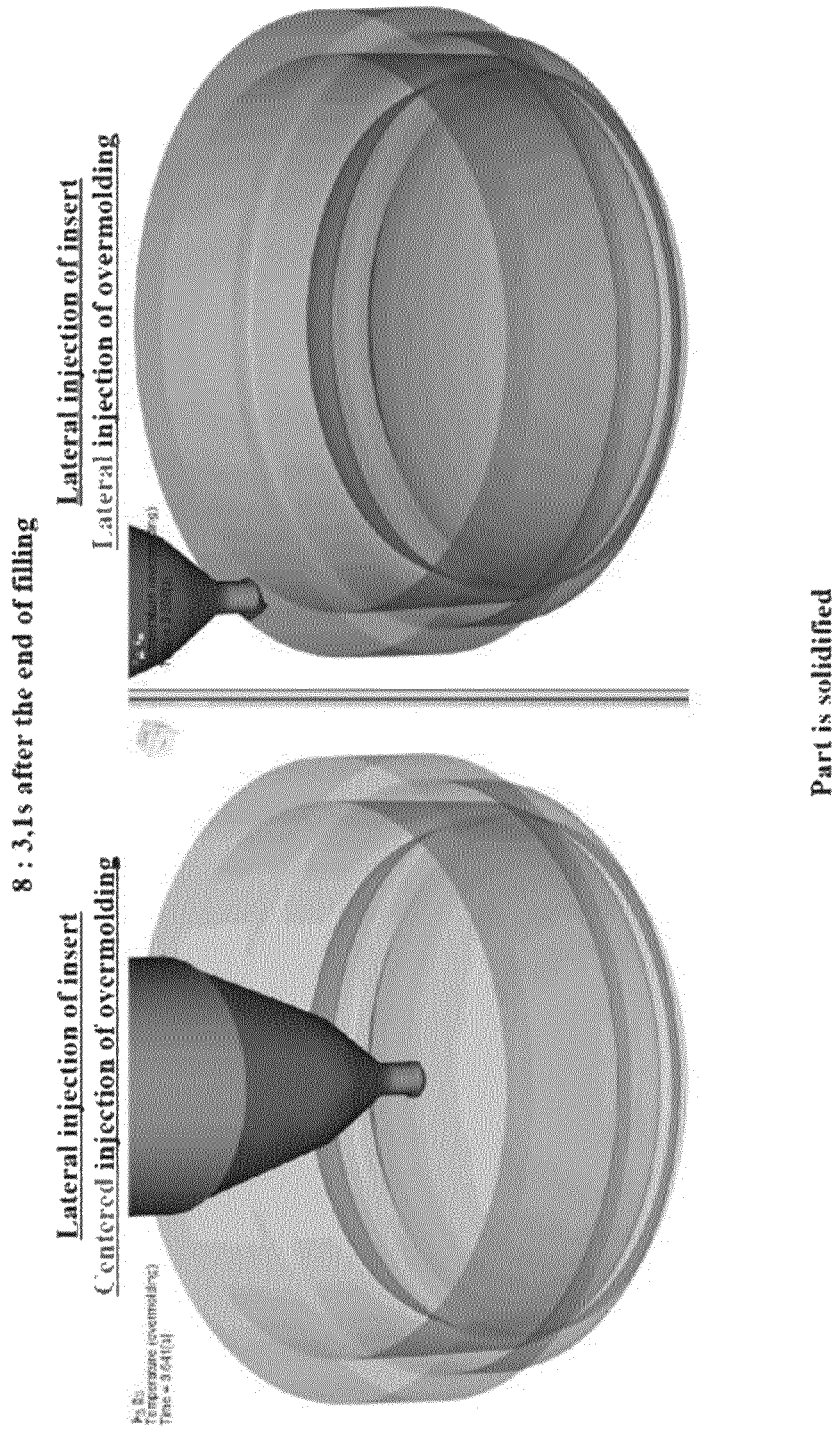
Figure 98:
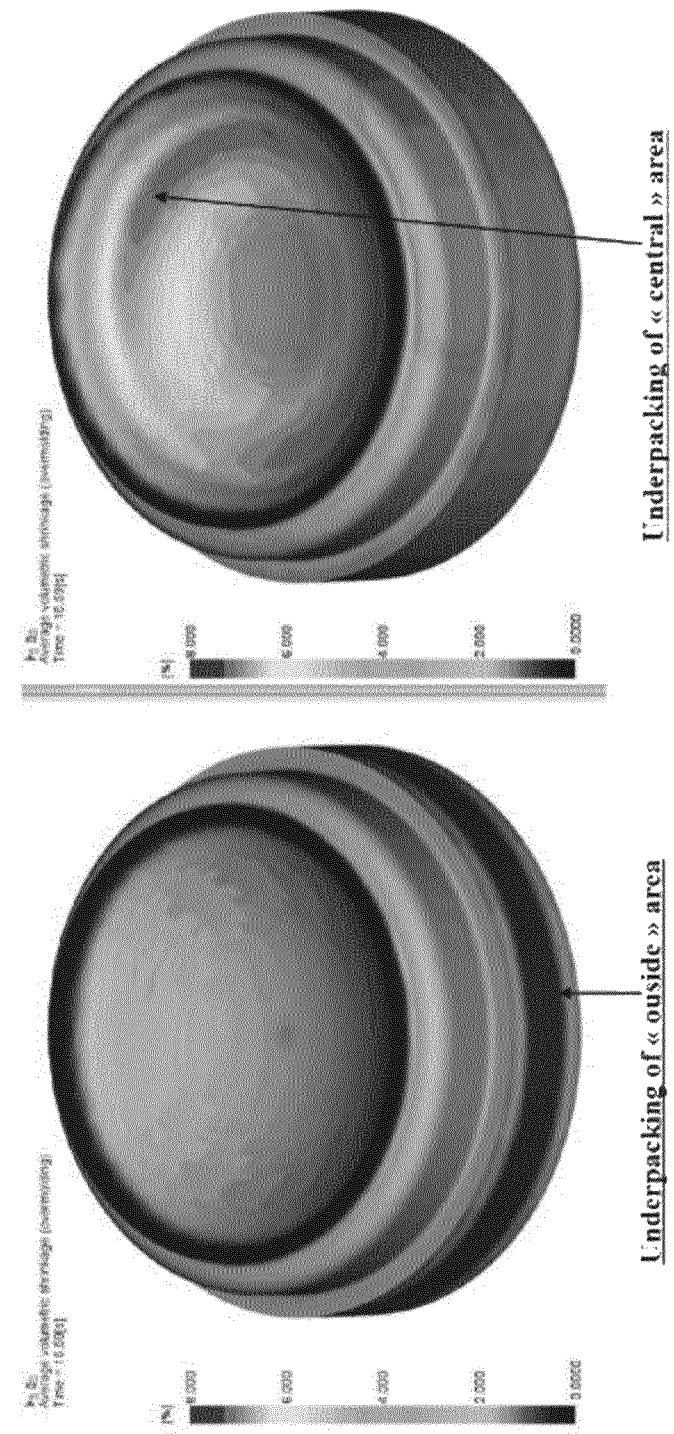
Figure 99:
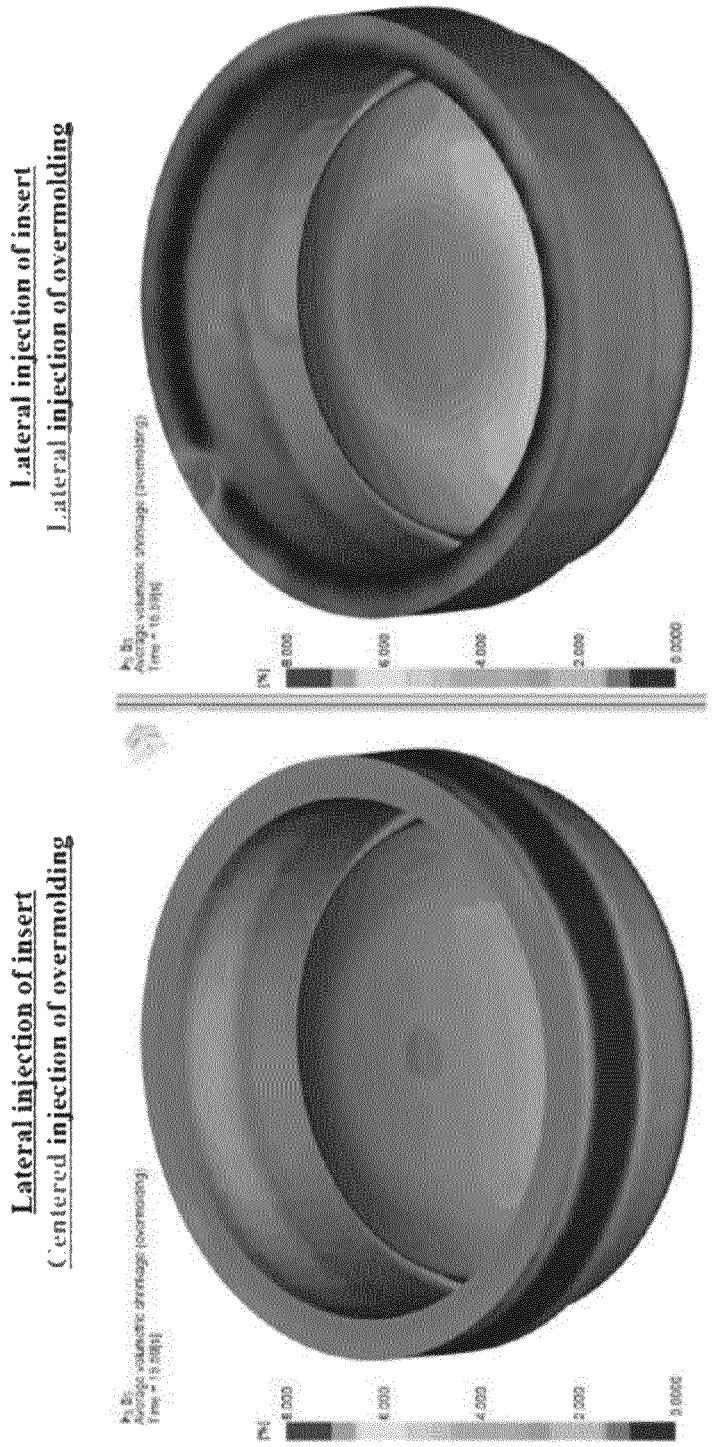
Figure 100:
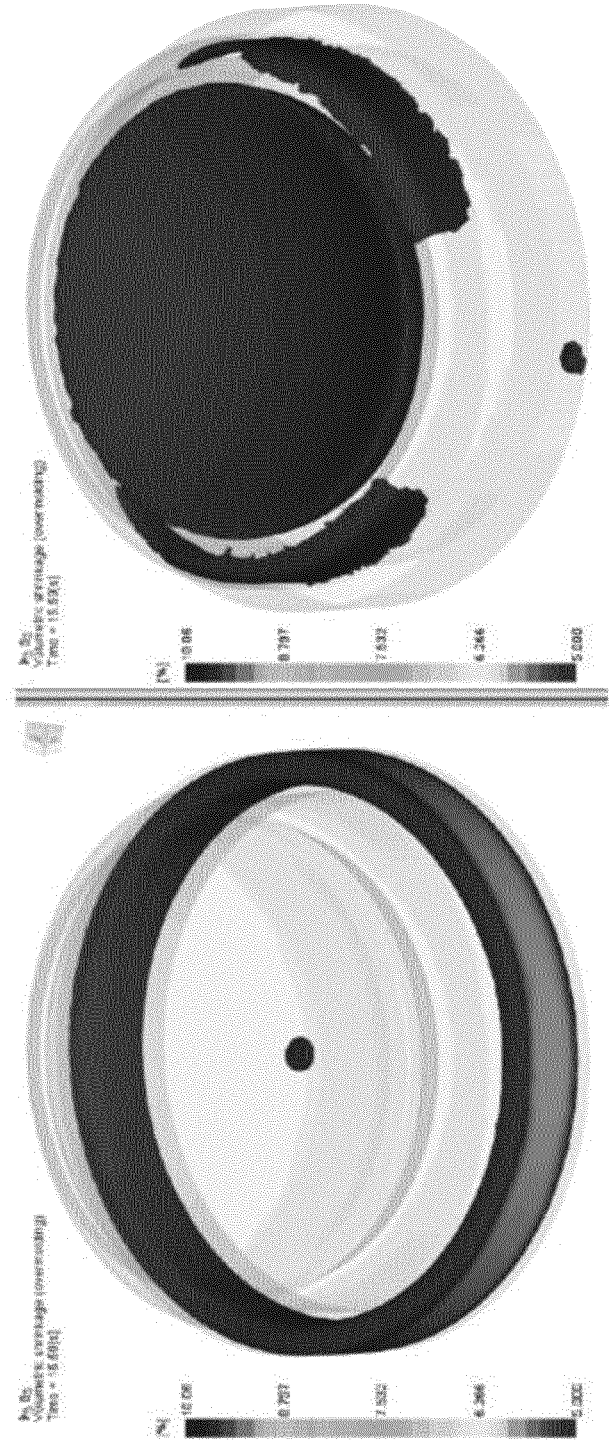
Figure 101:
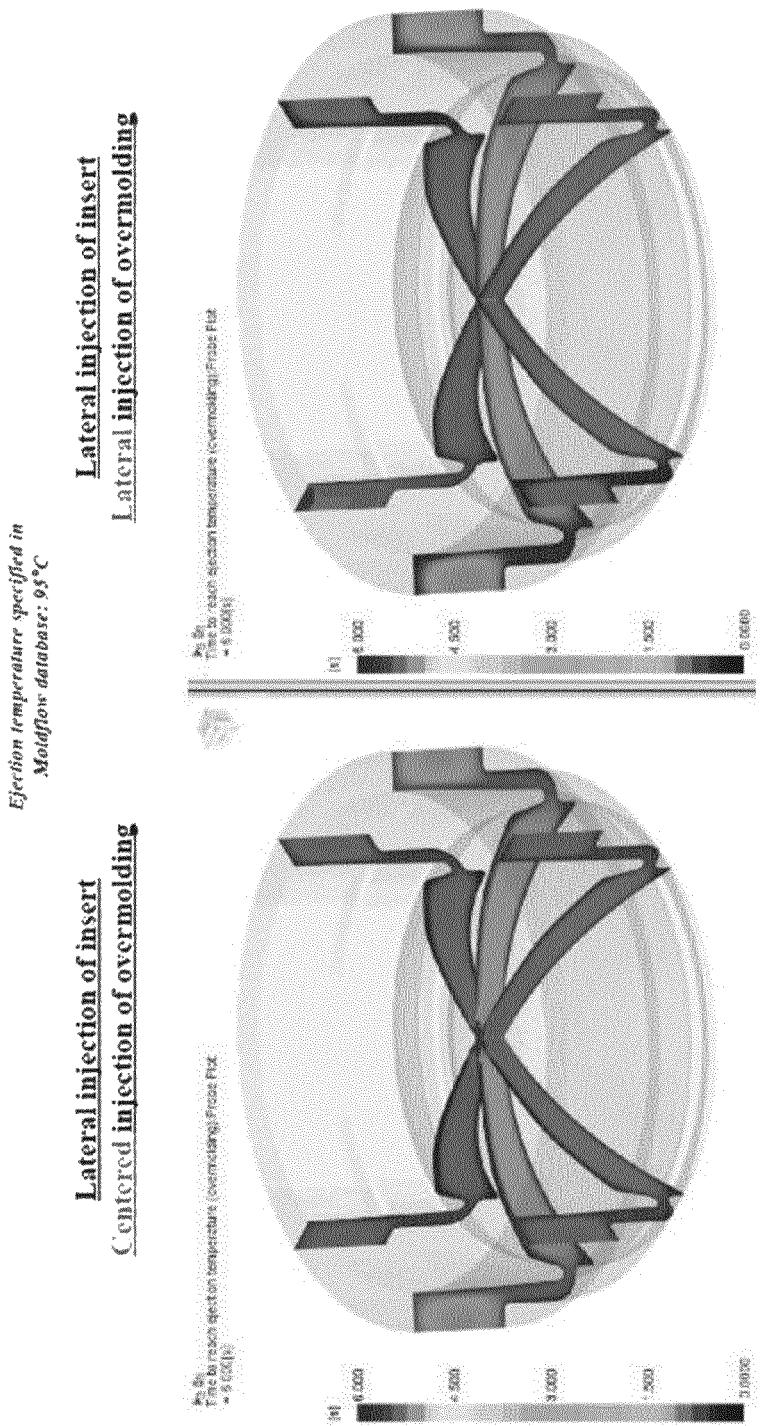
Figure 102:
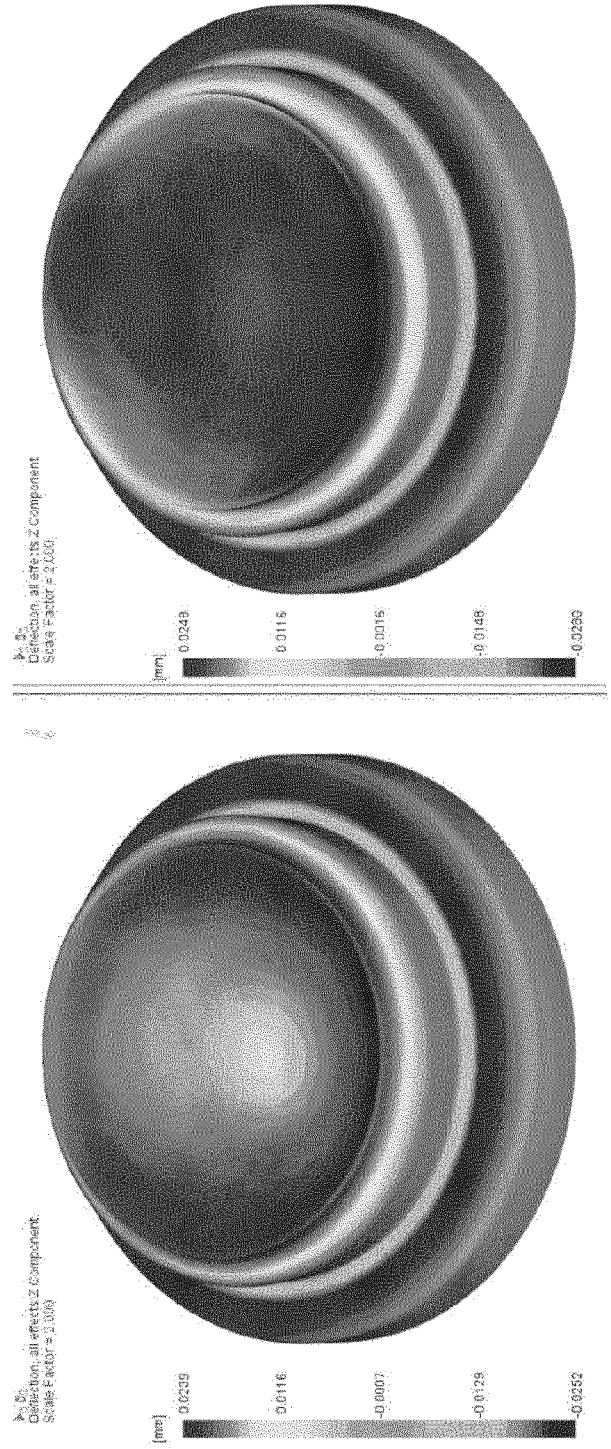
Figure 103:
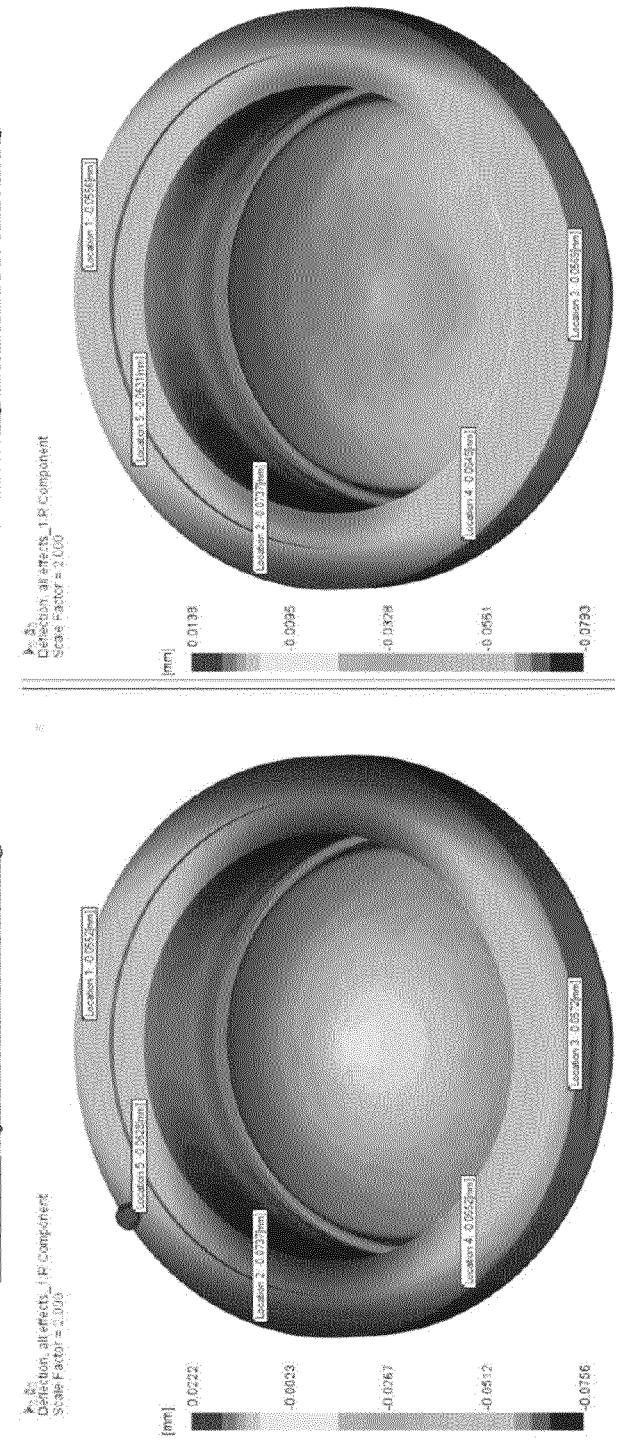
Figure 104:
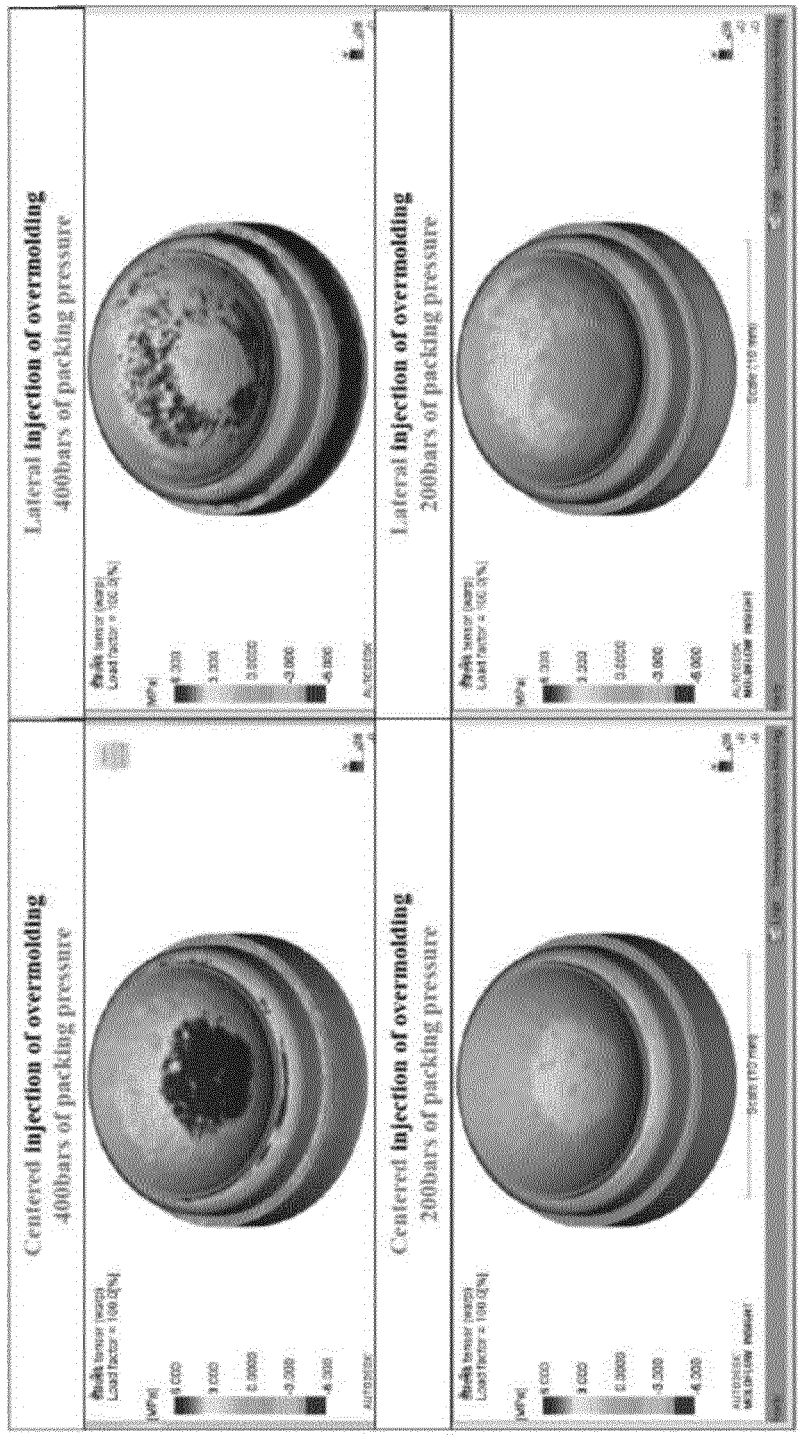
Figure 105:
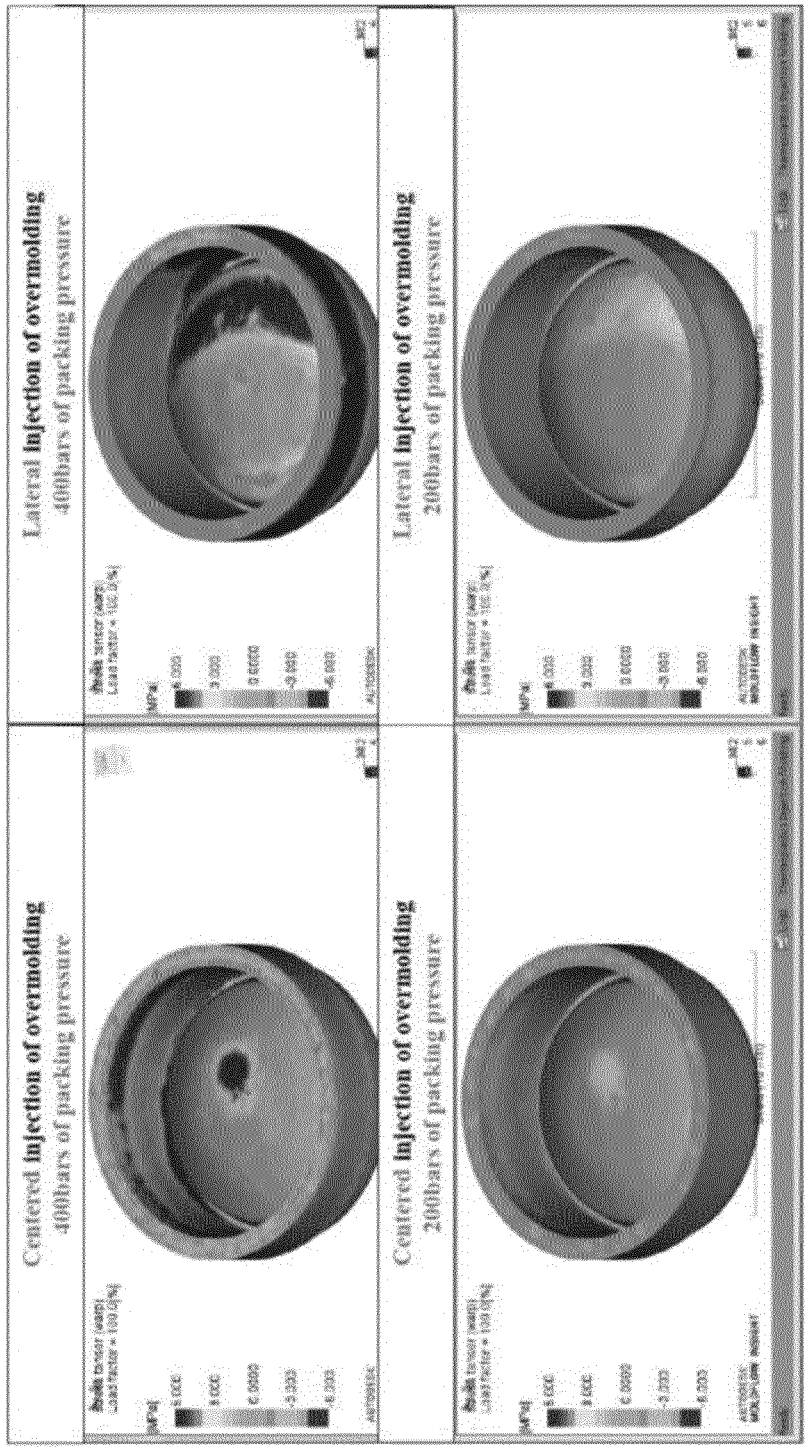
Figure 106:
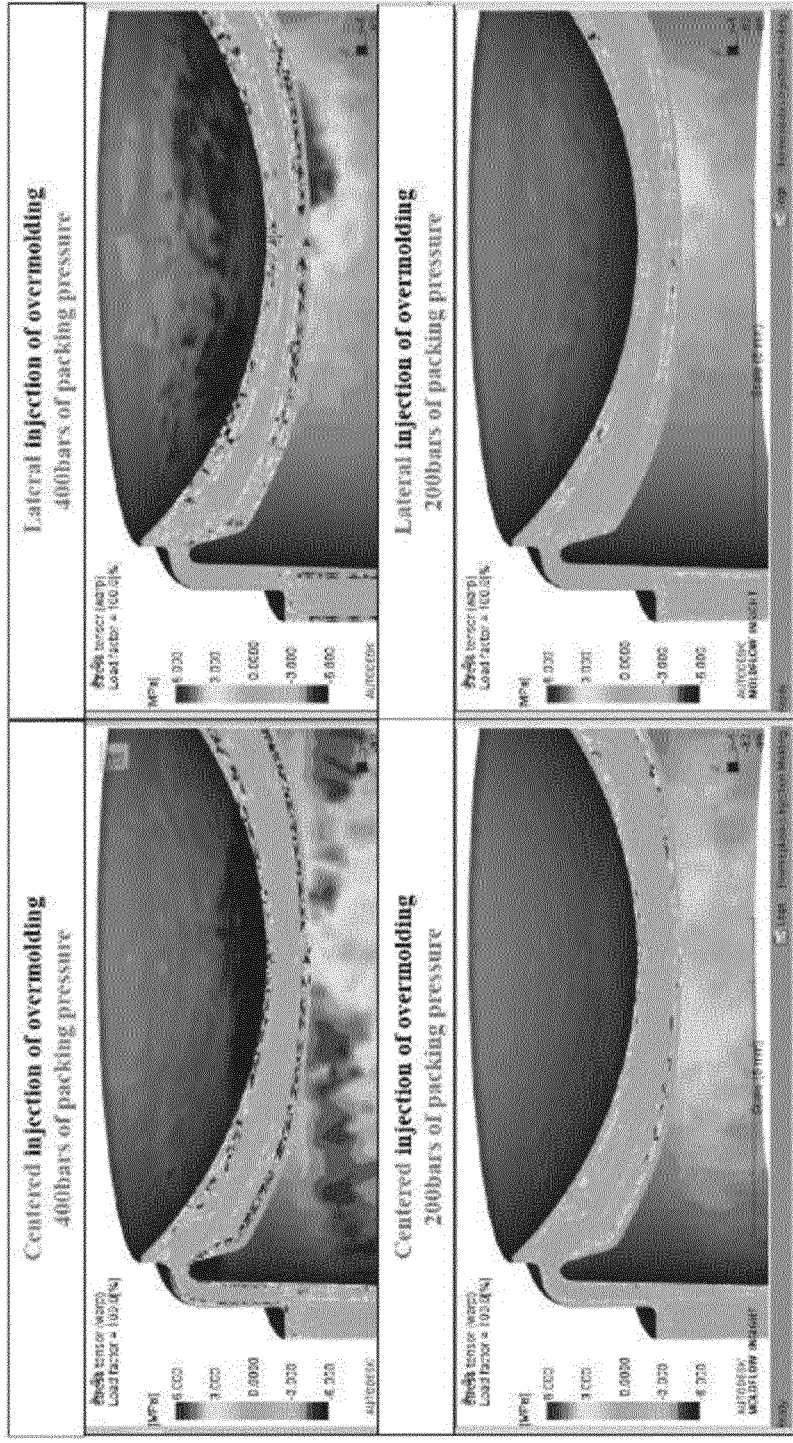
Figure 107:
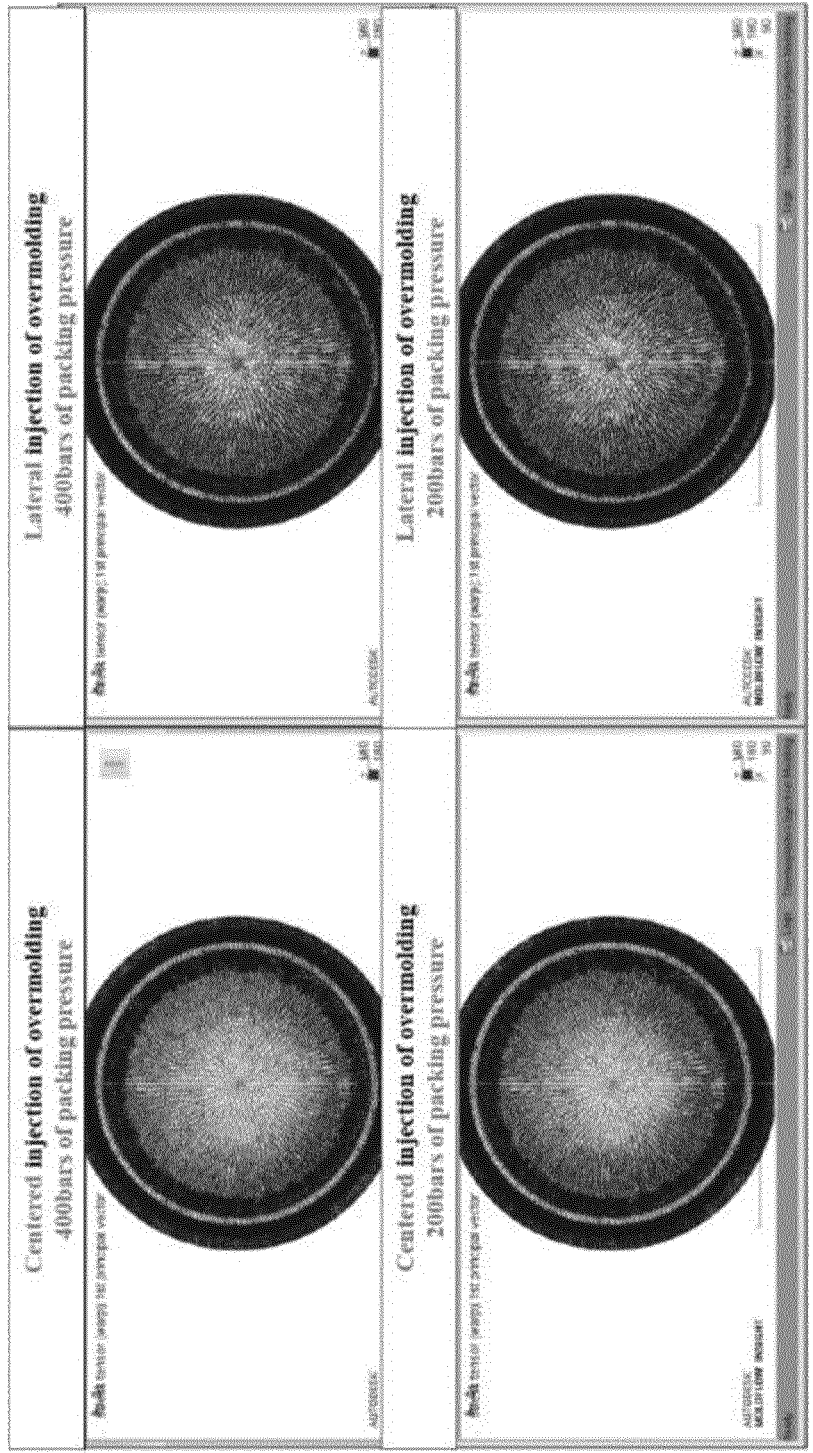
Figure 108:
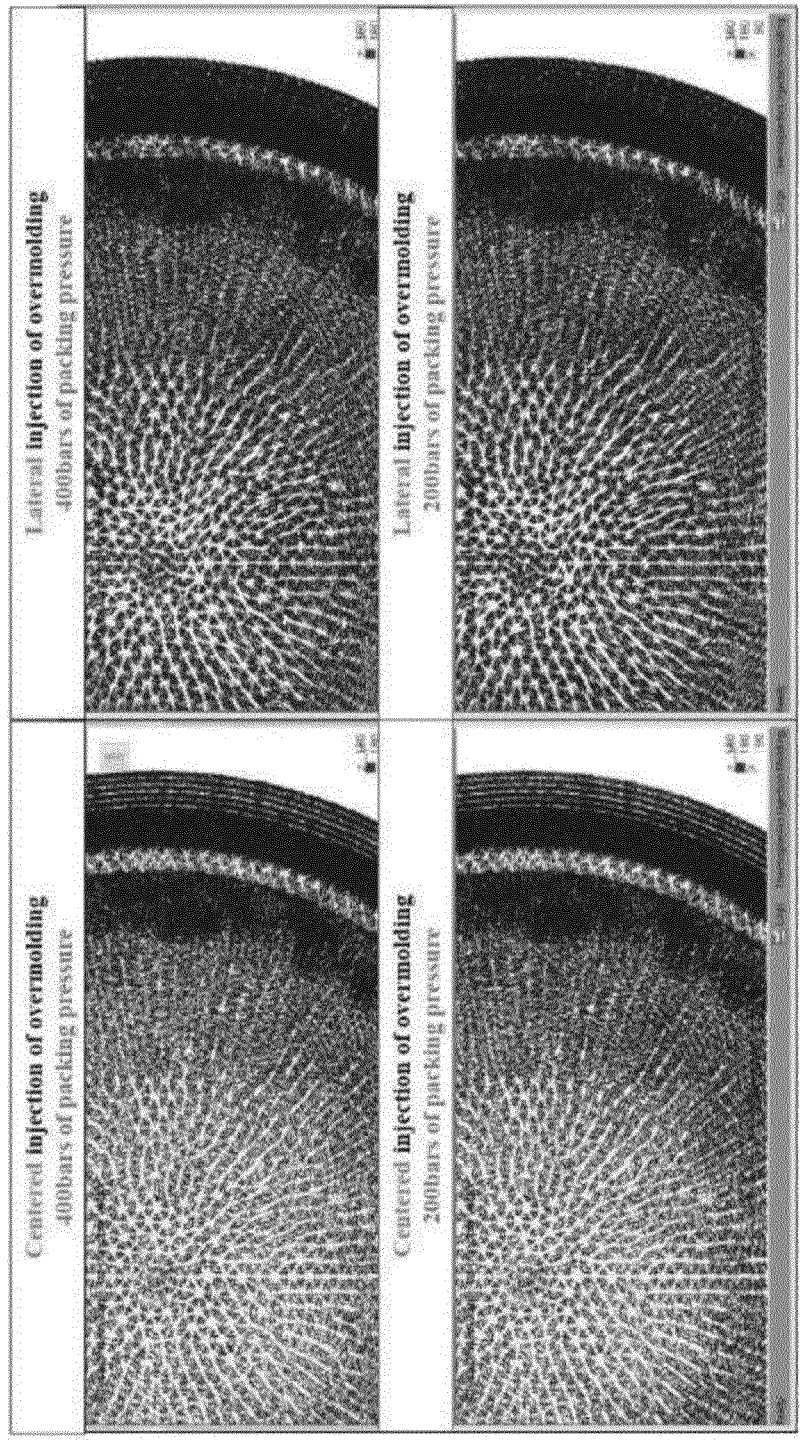
Figure 109:
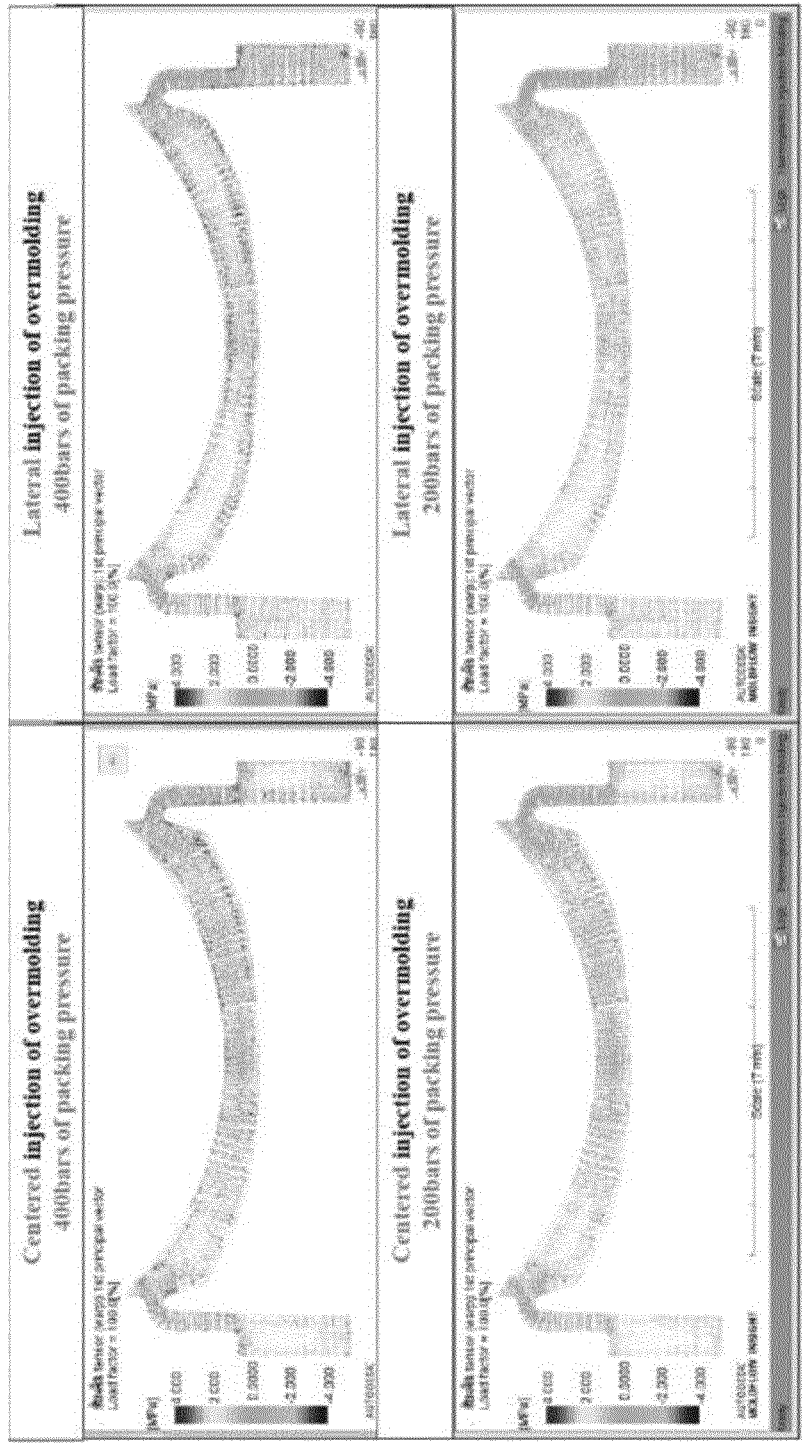
Figure 110:
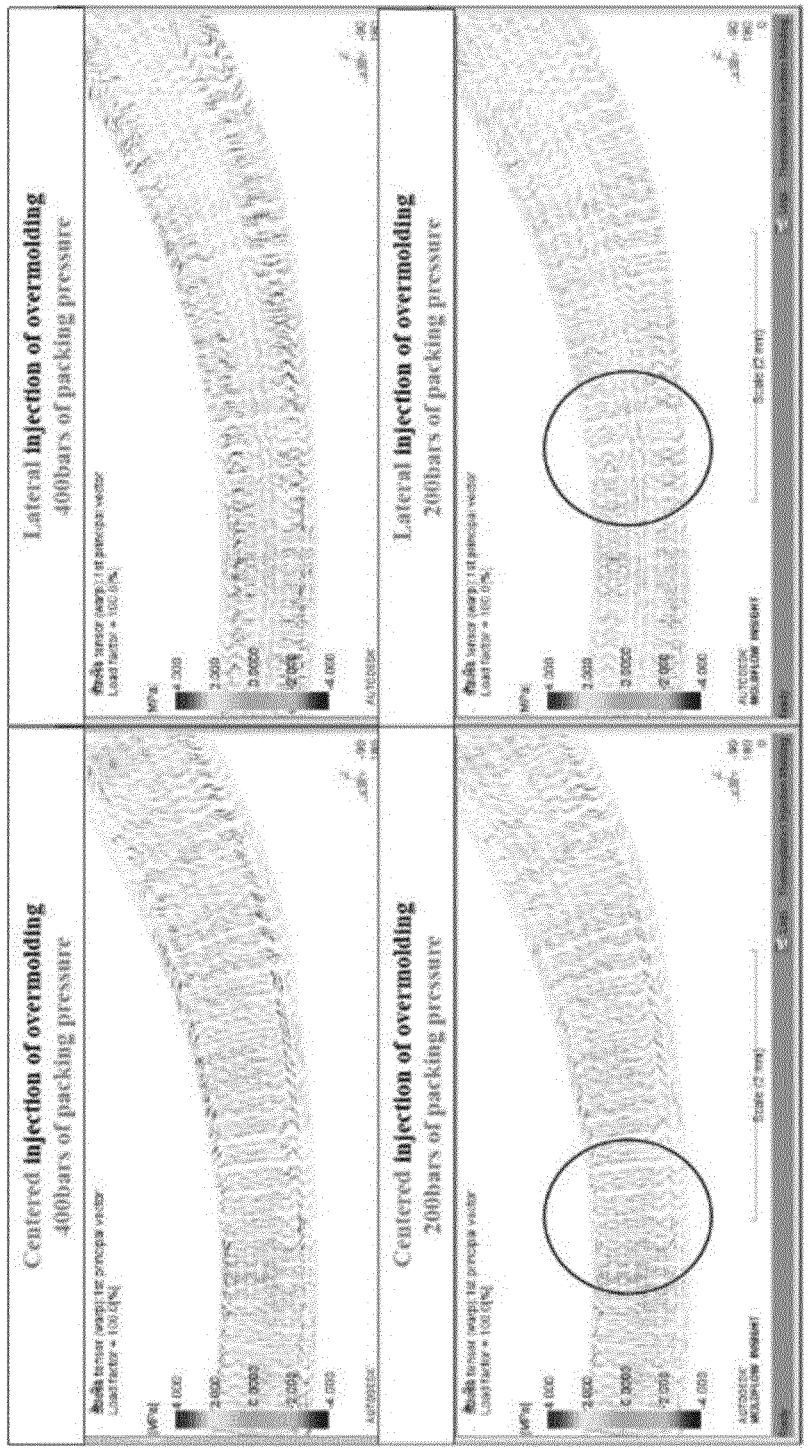
Figure 111:
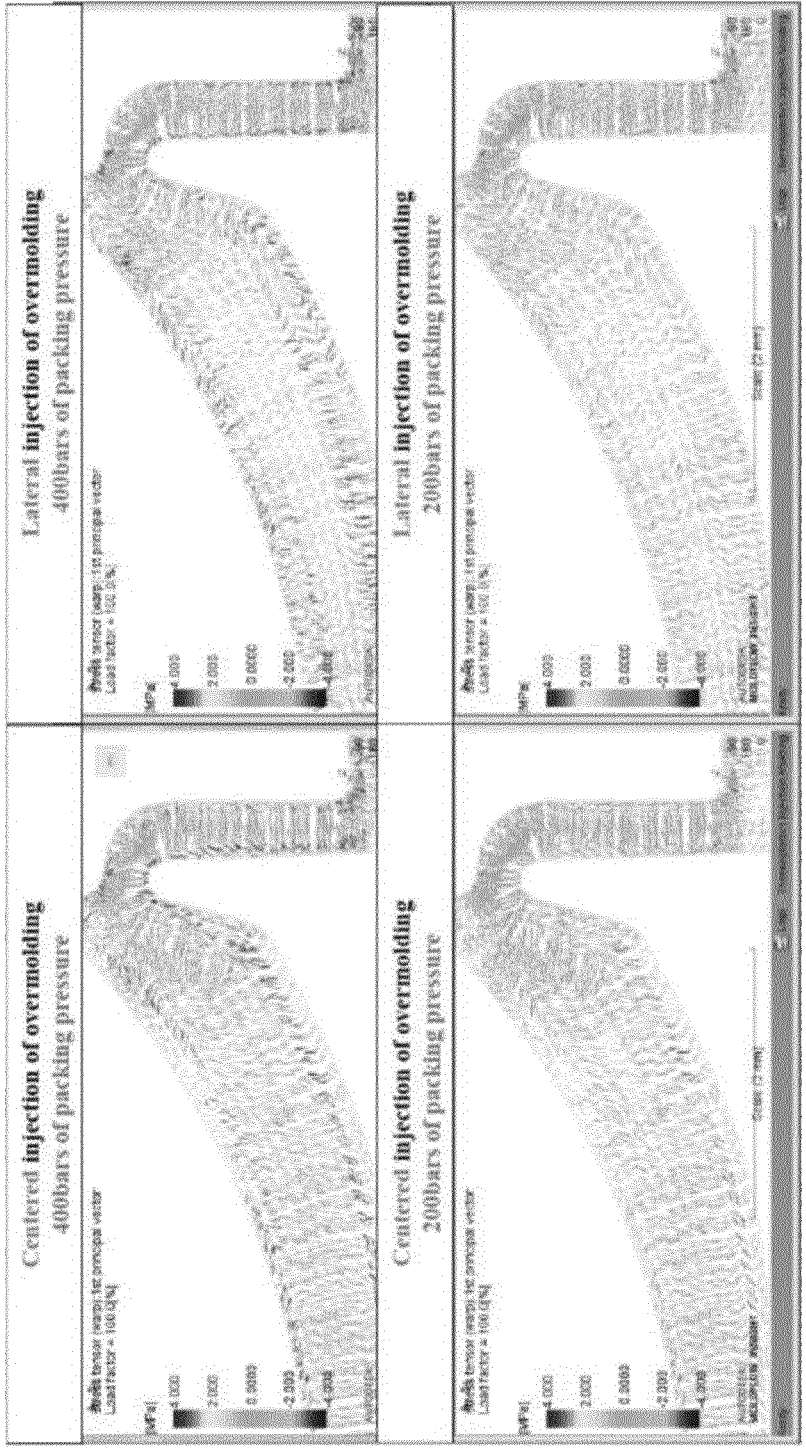
Figure 112:
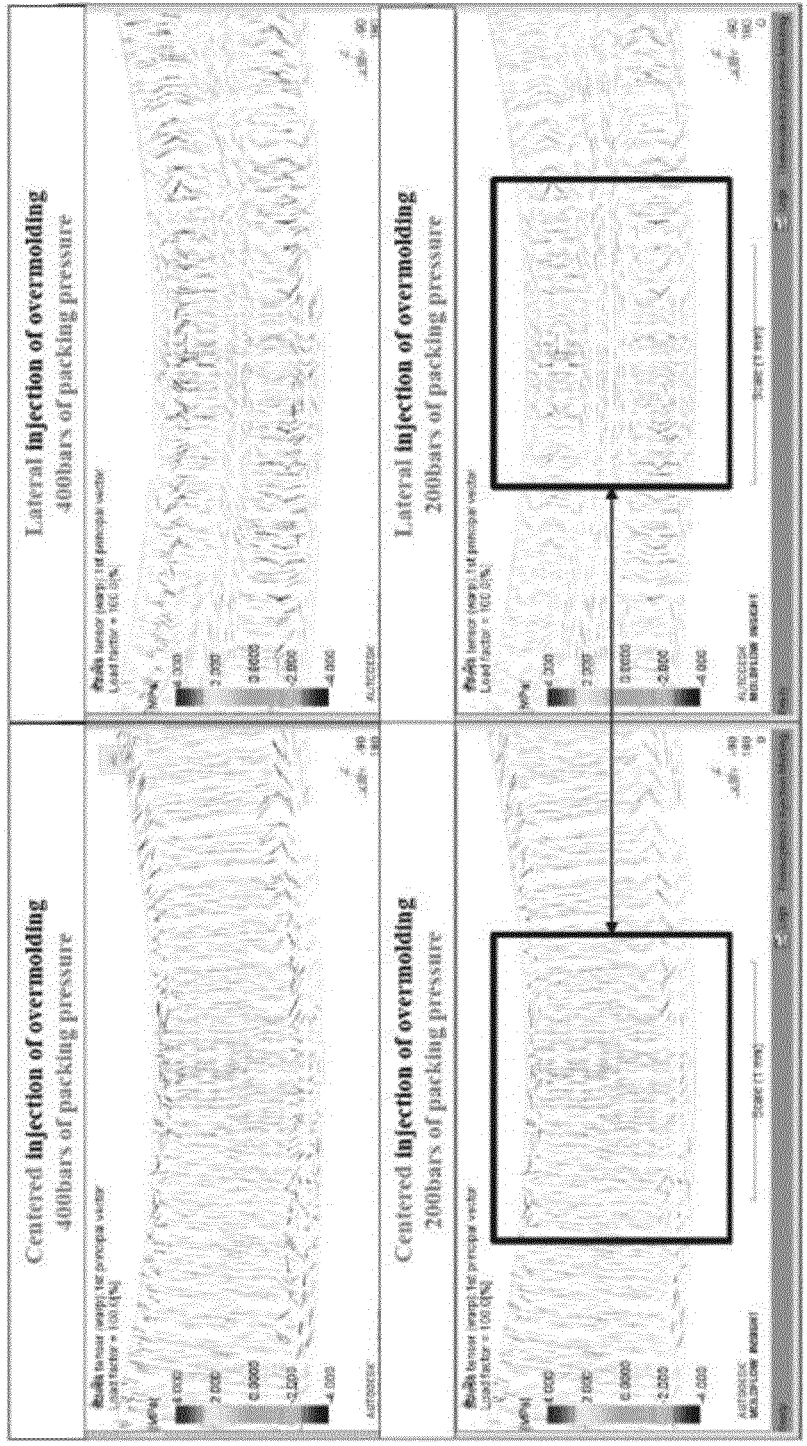

FIG. 1 shows a self-closing valve sub-assembly;
FIG. 2A shows a self-closing valve;
FIG. 2B shows a valve retaining assembly/device;
FIG. 2C shows a device (valve plus ring);
FIGS. 3 and 4 illustrate a valve with a ring inside a closure for use in cosmetic and/or food containers, for example;
FIGS. 5 and 6 illustrate a top plate component separate from a closure;
FIGS. 7 to 57 illustrate results showing an analysis of the injection of a TPE valve overmolded on an insert in PP, with two gate locations tested for the TPE valve and its influence on injection conditions; and
FIGS. 58 to 112 illustrate results to analyse the injection of a TPE valve overmolded on an insert in PP in order to test two gate locations for TPE and its influence.

FIG. 1 shows a self-closing valve sub-assembly, comprising a self-closing valve and an outer retaining ring. The sub-assembly is formed by a bi-injection moulding process.

FIG. 2A shows the self-closing valve, which in this embodiment is formed from a thermoplastic elastomer (TPE) material. The valve includes a peripheral wall and a concave central valve head. The wall and valve head are joined by a connecting wall, which in this embodiment can function as a hinge to allow the valve head to lift and possibly invert during use. Silts (for example two slits in the form of a cross) may be provided generally centrally on the valve head.

FIG. 2B shows the valve retaining assembly/device, which in this embodiment is formed from polypropylene. The device comprises a bead for snap-fitting the device into a closure.

The device (valve plus ring) is shown in FIG. 2C. It is formed separately from a closure and also from a container.

FIGS. 3 and 4 shows a closure showing the valve with ring inside a closure for use in cosmetic and/or food containers, for example. The valve component (valve plus ring) is fitted into a generally disc-like top plate which itself is then received (e.g. clipped/snapped) into the base of a closure.

The top plate component is shown separate from the closure in FIGS. 5 and 6. The underside of the lid of the closure includes a domed projection which is shaped to correspond to the concave shape of the valve head, which ensures a good seal when the lid is closed.

In other embodiments (not shown) the top plate is formed integrally with the closure base.

The closure therefore includes a TPE valve overmoulded on a polypropylene insert. In this embodiment a side gated polypropylene ring and a side gated TPE valve is provided.

This embodiment combines a TPE valve design and a valve sub-assembly (VSA) design, obtained through overmoulding.

The ring and/or outer ring may be combined with the top seal area between valve/closure.

Design features may be included to ensure we do not have a weld line on the valve headplate.

In this embodiment this is combined with a top seal area between valve/closure.

In this embodiment there are no weld lines on the valve headplate.

The insert includes closure retention features and the system relies on two seals working in unison: vertical compression onto TPE; and annual PP interference.

In some embodiments the head sleeve hinge the interference to the closure retention form provides horizontal pressure to aid slit closing, increasing the seal quality.

Results Part 1: FIGS. 7 to 57

The results show an analysis of the injection of a TPE valve overmolded on an insert in PP, with two gate locations tested for the TPE valve and its influence on injection conditions. The calculations are made with an isotherm mould setting. Warpage and stress results are given assuming a perfect PP geometry without shrinkages, because that is the only way to get the stress tensor in TPE part.

Shown in the drawings is the seal element the part in which is the TPE valve built in, by 2K injection.

Overmoulding material: TPE Thermolast K TF3 ATL (Kraiburg TPE GmbH)

Insert Material: PP Moplen HP50IL (Basel) Polyolefins Europe)

The PP insert is injected in 0.2 s, at 230° C. in a mould at 30° C. Lateral injection has been validated. A weld line is created in opposite area to the gate. Specific venting could be needed in ends of fillings. Pressure in cavity is about 70 bars. Most massive area could include a risk of sink marks/void bubbles due to skin solidification before it. The packing pressure can't be transmitted as long as possible in this massive area. Homogenising thicknesses is recommended for some embodiments.

The TPE overmoulding is also injected in 0.2 s, at 200° C. in a mould at 30° C. A lateral and centred injection have been tried and presented in the figures. Shear rate calculated at gate is under the limit preconized in Moldfow database with a gate 00.6 mm and 0.2 s of injection time. Injecting slower could lead to amplify hesitation effects and creates an air trap.

Pressure in cavity at switchover is about 25 to 35 bars depending of gate location used. Injecting in centre area limit the packing transmission all around the part while lateral injection permits to have a better control of packing all around the part but slightly less packing in central area. This could lead to sink marks/void bubbles in most massive areas depending of gate location. Part warpage, in terms of flatness, is quite similar for the values but appears more regular with lateral injection. A better control of packing and shrinkages should be obtained with lateral injection because we have a better control of packing all around the part. Stress tensor analyse doesn't shows significative differences in terms of values and direction.

Results 2: FIGS. 58 to 112

To analyse the injection of a TPE valve overmolded on an insert in PP, in order to test two gate locations for TPE and its influence. The calculations are made with an isotherm mould setting. Warpage & stress results are given assuming a perfect PP geometry without shrinkages, because that's the only way to get the stress tensor in TPE part in calculations with Moldflow software.

Overmoulding material: TPE Thermolast K TF3 ATL (Kraiburg TPE GmbH)

Insert Material: PP Moplen HP501 L (Basel) Polyolefins Europe)

Both PP and TPE are injected in 0.5 s in a mould at 30° C. This injection time has been chosen to limit shear rate at gate and to have an overview of the results with realistic injection (injecting with lower injection time than 0.5 s would imply to know the press injection inertia with precision). Injecting in 0.2 s doesn't modify significatively the flowfront pattern and air trap issue seen with the lateral injection. Pressure in the cavity at switchover is similar with both centred & lateral injection, about 25 to 30 bars in cavity. Cantered injection permits to obtain a balanced filling without weld lines/air trap while lateral injection presents hesitation effects due to part thicknesses and gate location out of part symmetry axis. The air trap created with lateral injection is quite important and lead to different problems such flowfront speed variation, flow acceleration at end of filling on air trap location.

Injecting by part centre permits to have a correct packing of part centre but the part perimeter which is thickest is less packed and could be present sink marks/void bubbles risks. Lateral injection presents the opposite problem with limited packing of part centre, where the cutting operation will be done in the process after injection.

Both injections present globally homogeneous shrinkages excepting massive areas far from the gate. Part warpage calculated is similar in both case with low values (less than 0.05 mm). Seeing the stress results calculated in the part, using low packing pressure is recommended in order to limit stress tensor value in the TPE part.

Comparing both stress tensor direction with each gate location lead to the conclusion that stress tensor main direction is more homogeneous with a central injection than with a lateral one. For some embodiments it may be preferable to inject the part with a central gate to avoid air trap/weld line issue, and to have more homogeneous stress tensor direction. In other embodiments it may be preferable to inject the part with an off-centre gate to avoid the problem of slit line/s coinciding with a gate vestige.

The current plan is to off centre and direct feed the TPE and to side gate the PP. The benefits of side gating over centre gating are shown. With central injection, the maintenance of more massive areas at the periphery is limited.

In some embodiments modifying the part design by thickness homogenization may help to have more homogeneous volumetric shrinkages and less sink marks risks in most massive area on part perimeter with the central injection. A calculation could be done to validate possible geometry optimizations (based on part solidification analyse, meaning thicknesses could be optimize with less differential thicknesses and a thinner perimeter area).

If the thicknesses can be homogenised, compaction may be better.

The comparison between the two threshold positions clearly shows that the exchange is healthier.

The lateral injection may create an air occlusion, differential orientations of the main directions of the stress tensor, a sub-compaction of the centre.

A centre gate may lead to slitting quality issues as you may then be slitting through the gate vestige (which can vary in size and regularity from mould cavity to mould cavity and over time), so side gating can have advantages.

In some embodiment side gating does not generate internal material stresses which would lead to other issues.

Although illustrative embodiments of the invention have been disclosed in detail herein, with reference to the accompanying drawings, it is understood that the invention is not limited to the precise embodiments shown and that various changes and modifications can be effected therein by one skilled in the art without departing from the scope of the invention as defined by the appended claims and their equivalents.

The invention claimed is:

1. A self-closing valve assembly comprising a valve overmoulded on an insert, in which the insert is formed by lateral injection, and in which the overmoulded valve is injected by: generally central injection; off-centre injection; or lateral injection to form a valve injection point, in which the valve includes a valve head in which one or more slit lines are to be formed, and in which the valve injection point is located away from the one or more slit lines.

2. An assembly as claimed in claim 1, in which the insert includes a side wall and the valve injection point is located on one end of the side wall.

3. An assembly as claimed in claim 1, in which the valve includes a side wall and the valve injection point is located on one end of the side wall.

4. An assembly as claimed in claim 1, in which the valve includes a valve head and the valve injection point is located generally centrally on the valve head.

5. An assembly as claimed in claim 1, in which the insert is a retaining ring.

6. An assembly as claimed in claim 1, in which the valve is formed from a TPE material.

7. An assembly as claimed in claim 1, in which the insert is formed from polypropylene.

8. An assembly as claimed in claim 1, comprising a side gated polypropylene ring and a side gated TPE valve.

9. An assembly as claimed in claim 1, comprising a side gated polypropylene ring and a centre gated TPE valve.

10. An assembly as claimed in claim 1, comprising a side gated polypropylene ring and an off-centre gated TPE valve.

11. An assembly as claimed in claim 1, in which the valve comprises an injection moulded body formed from a TPE material, the injection moulded body includes a peripheral sidewall and a central valve head, in which an injection gate for the body is formed away from a centre of the valve head.

12. An assembly as claimed in claim 11, in which the injection gate is formed in the peripheral sidewall.

13. An assembly as claimed in claim 1, comprising a valve sub-assembly, comprising a self-closing valve and an outer retaining ring, formed by a bi-injection moulding process, the ring is injected using a side gated injection process and the valve is injected using a side gated injection process.

14. A method of forming a valve sub-assembly according to claim 1, comprising the steps of injection moulding the insert using a lateral gate and overmoulding the valve using a lateral gate, further comprising the step of slitting the valve to provide one or more slits, in which the one or more slits are formed so as not to coincide with an infection gate vestige thereon.

15. A self-closing valve comprising an injection moulded body formed from a TPE material, the injection moulded body includes a peripheral sidewall and a central valve head, in which an injection gate for the body is formed away from a centre of the valve head wherein the central valve head includes one or more slit lines, and in which the injection gate for the body is located away from the one or more slit lines.

16. A method of forming a self-closing valve according to claim 14, comprising the step of injection moulding the valve with an off-centre injection gate.

17. A method as claimed in claim 16, further comprising the step of slitting the valve, in which the slit/s are formed so as not to coincide with an injection gate vestige thereon.

* * * * *